United States Patent
Sadi et al.

(10) Patent No.: US 10,313,656 B2
(45) Date of Patent: Jun. 4, 2019

(54) IMAGE STITCHING FOR THREE-DIMENSIONAL VIDEO

(71) Applicant: Samsung Electronics Company, Ltd., Suwon, Gyeong gi-Do (KR)

(72) Inventors: Sajid Sadi, San Jose, CA (US); Sergio Perdices-Gonzalez, Santa Clara, CA (US); Rahul Budhiraja, Masaieed (QA); Brian Dongwoo Lee, Gyeonggido (KR); Ayesha Mudassir Khwaja, Stanford, CA (US); Pranav Mistry, Cupertion, CA (US)

(73) Assignee: Samsung Electronics Company Ltd., Suwon (KR)

(*) Notice: Subject to any disclaimer, the term of this patent is extended or adjusted under 35 U.S.C. 154(b) by 25 days.

(21) Appl. No.: 14/856,507

(22) Filed: Sep. 16, 2015

(65) Prior Publication Data
US 2016/0088287 A1 Mar. 24, 2016

Related U.S. Application Data

(60) Provisional application No. 62/053,726, filed on Sep. 22, 2014, provisional application No. 62/053,729, (Continued)

(51) Int. Cl.
*H04N 13/194* (2018.01)
*G02B 27/01* (2006.01)
(Continued)

(52) U.S. Cl.
CPC ......... *H04N 13/194* (2018.05); *G02B 27/017* (2013.01); *G03B 35/08* (2013.01);
(Continued)

(58) Field of Classification Search
CPC .......... H04N 13/0059; H04N 13/0011; H04N 13/0014; H04N 13/0253; H04N 13/0271;
(Continued)

(56) References Cited

U.S. PATENT DOCUMENTS

| 4,751,570 A | 6/1988 | Robinson |
| 6,020,931 A | 2/2000 | Bilbrey et al. |

(Continued)

FOREIGN PATENT DOCUMENTS

| CN | 1666525 A | 9/2005 |
| CN | 1965578 A | 5/2007 |

(Continued)

OTHER PUBLICATIONS

Extended European Search Report for EP Application No. 15186275.2-1972, dated May 25, 2016.
(Continued)

*Primary Examiner* — Joseph Suh
(74) *Attorney, Agent, or Firm* — Baker Botts L.L.P.

(57) ABSTRACT

In one embodiment, a method includes receiving multiple images from multiple cameras, where the multiple cameras include a first camera having a first orientation and a second camera having a second orientation, and the multiple images include a first image from the first camera and a second image from the second camera. The method also includes detecting multiple feature points within the first and second images. The method further includes determining one or more pairs of corresponding feature points located within a region of overlap between the first and second images, where the pairs of corresponding feature points include a respective one of the feature points from each of the first and second images. The method also includes spatially adjusting the first or second image based on a calculated offset between each pair of corresponding feature points.

31 Claims, 40 Drawing Sheets

Related U.S. Application Data filed on Sep. 22, 2014, provisional application No. 62/053,737, filed on Sep. 22, 2014, provisional application No. 62/053,743, filed on Sep. 22, 2014, provisional application No. 62/141,018, filed on Mar. 31, 2015, provisional application No. 62/053,750, filed on Sep. 22, 2014.

(51) Int. Cl.

| | | |
|---|---|---|
| H04N 13/161 | (2018.01) | |
| H04N 13/243 | (2018.01) | |
| H04N 13/261 | (2018.01) | |
| H04N 19/597 | (2014.01) | |
| H04N 19/61 | (2014.01) | |
| H04N 5/232 | (2006.01) | |
| H04N 5/247 | (2006.01) | |
| H04N 5/265 | (2006.01) | |
| H04N 19/54 | (2014.01) | |
| G03B 35/08 | (2006.01) | |
| G03B 37/04 | (2006.01) | |
| H04N 13/254 | (2018.01) | |
| H04N 13/111 | (2018.01) | |
| H04N 13/117 | (2018.01) | |
| H04N 13/271 | (2018.01) | |

(52) U.S. Cl.
CPC ......... *G03B 37/04* (2013.01); *H04N 5/23229* (2013.01); *H04N 5/247* (2013.01); *H04N 5/265* (2013.01); *H04N 13/111* (2018.05); *H04N 13/117* (2018.05); *H04N 13/161* (2018.05); *H04N 13/243* (2018.05); *H04N 13/254* (2018.05); *H04N 13/261* (2018.05); *H04N 13/271* (2018.05); *H04N 19/54* (2014.11); *H04N 19/597* (2014.11); *H04N 19/61* (2014.11); *G02B 2027/0134* (2013.01); *G02B 2027/0138* (2013.01); *G06T 2200/04* (2013.01)

(58) Field of Classification Search
CPC .... H04N 19/54; H04N 13/026; H04N 19/597; H04N 5/265; H04N 13/0048; H04N 19/61; H04N 5/23229; H04N 5/247; H04N 13/0242; H04N 13/194; H04N 13/117; H04N 13/111; H04N 13/254; H04N 13/271; H04N 13/261; H04N 13/161; H04N 13/243; G03B 35/08; G03B 37/04; G02B 27/017; G02B 2027/0138; G02B 2027/0134; G06T 2200/04

See application file for complete search history.

(56) References Cited

U.S. PATENT DOCUMENTS

| | | | |
|---|---|---|---|
| 6,359,617 B1 | 3/2002 | Xiong | |
| 6,552,744 B2 | 4/2003 | Chen | |
| 6,754,379 B2 | 6/2004 | Xiong et al. | |
| 7,064,783 B2 | 6/2006 | Colavin et al. | |
| 7,176,960 B1 | 2/2007 | Nayar et al. | |
| 7,747,067 B2 | 6/2010 | Popescu et al. | |
| 7,837,330 B2 | 11/2010 | Montgomery et al. | |
| 7,956,872 B2 | 6/2011 | Kramer et al. | |
| 8,046,719 B2 | 10/2011 | Skourup et al. | |
| 8,066,378 B2 | 11/2011 | Lalley et al. | |
| 8,106,936 B2 | 1/2012 | Strzempko et al. | |
| 8,111,284 B1 | 2/2012 | Givon | |
| 8,237,775 B2 | 8/2012 | Givon | |
| 8,294,748 B2 | 10/2012 | Stec et al. | |
| 8,355,042 B2 | 1/2013 | Lablans | |
| 8,388,151 B2 | 3/2013 | Huebner | |
| 8,456,467 B1 | 6/2013 | Hickman et al. | |
| 8,462,199 B2 | 6/2013 | Givon | |
| 8,463,071 B2 | 6/2013 | Snavely | |
| 8,500,284 B2 | 8/2013 | Rotschild et al. | |
| 8,503,763 B2 | 8/2013 | Zhang et al. | |
| 8,553,942 B2 | 10/2013 | Lynch | |
| 8,581,961 B2 | 11/2013 | Lee | |
| 8,730,299 B1 | 5/2014 | Kozko | |
| 8,768,049 B2 | 7/2014 | Wang et al. | |
| 8,866,883 B2 | 10/2014 | Rohaly et al. | |
| 8,866,920 B2 | 10/2014 | Venkataraman et al. | |
| 8,878,896 B2 | 11/2014 | Givon | |
| 8,890,977 B2 | 11/2014 | Lablans | |
| 8,988,509 B1 | 3/2015 | Macmillan et al. | |
| 8,994,822 B2 | 3/2015 | Smitherman et al. | |
| 9,342,929 B2 | 5/2016 | Kamuda | |
| 2001/0010546 A1 | 8/2001 | Chen | |
| 2002/0028003 A1* | 3/2002 | Krebs | G06K 9/00348 382/115 |
| 2002/0061131 A1* | 5/2002 | Sawhney | G06T 15/205 382/154 |
| 2002/0064313 A1* | 5/2002 | Cheng | G06T 9/00 382/239 |
| 2002/0075258 A1* | 6/2002 | Park | H04N 5/232 345/419 |
| 2002/0163649 A1* | 11/2002 | Hirose | G01B 11/0625 356/504 |
| 2003/0179308 A1* | 9/2003 | Zamorano | A61B 5/00 348/333.12 |
| 2003/0185340 A1* | 10/2003 | Frantz | G01N 21/8806 378/57 |
| 2004/0027451 A1 | 2/2004 | Baker | |
| 2004/0027452 A1* | 2/2004 | Yun | H04N 7/17336 348/51 |
| 2004/0169663 A1 | 9/2004 | Bernier | |
| 2004/0169870 A1 | 9/2004 | Ahmed | |
| 2004/0189674 A1* | 9/2004 | Zhang | H04N 1/04 345/629 |
| 2004/0246333 A1* | 12/2004 | Steuart, III | G03B 35/08 348/36 |
| 2005/0078880 A1 | 4/2005 | Schroeder | |
| 2005/0160368 A1* | 7/2005 | Liu | G06F 3/0481 715/762 |
| 2005/0226172 A1* | 10/2005 | Richardson | H04L 12/1813 370/260 |
| 2006/0072020 A1* | 4/2006 | McCutchen | G03B 17/02 348/218.1 |
| 2006/0125921 A1 | 6/2006 | Foote | |
| 2006/0136229 A1* | 6/2006 | Kjoerling | G10L 19/008 704/501 |
| 2006/0244826 A1* | 11/2006 | Chew | G01S 3/7865 348/143 |
| 2007/0014347 A1* | 1/2007 | Prechtl | H04N 5/232 375/240.01 |
| 2007/0031062 A1* | 2/2007 | Pal | G06F 17/30843 382/284 |
| 2007/0071247 A1* | 3/2007 | Pang | G10L 19/008 704/501 |
| 2007/0103558 A1* | 5/2007 | Cai | H04N 5/20 348/211.11 |
| 2007/0291857 A1* | 12/2007 | Hussain | H04N 19/44 375/240.29 |
| 2008/0024594 A1 | 1/2008 | Ritchey | |
| 2008/0033814 A1 | 2/2008 | Carignano | |
| 2008/0268731 A1* | 10/2008 | Lahyani | A41D 7/003 441/89 |
| 2009/0022419 A1 | 1/2009 | Molnar | |
| 2009/0022422 A1* | 1/2009 | Sorek | G06T 3/4038 382/284 |
| 2009/0034086 A1* | 2/2009 | Montgomery | G03B 35/10 359/629 |
| 2009/0051778 A1 | 2/2009 | Pan | |
| 2009/0058988 A1 | 3/2009 | Strzempko et al. | |
| 2009/0110291 A1 | 4/2009 | Matsumura | |
| 2009/0163185 A1* | 6/2009 | Lim | H04N 5/23206 455/414.1 |

(56) References Cited

U.S. PATENT DOCUMENTS

| | | |
|---|---|---|
| 2010/0097444 A1 | 4/2010 | Lablans |
| 2010/0231738 A1* | 9/2010 | Border .................. H04N 5/232 348/222.1 |
| 2010/0239172 A1* | 9/2010 | Akiyama ................ G06T 7/33 382/190 |
| 2010/0293584 A1* | 11/2010 | Civanlar .............. G11B 27/105 725/109 |
| 2010/0315539 A1* | 12/2010 | Azuma ............. H04N 5/23232 348/265 |
| 2011/0013018 A1* | 1/2011 | Leblond ............... G06T 17/05 348/143 |
| 2011/0052093 A1 | 3/2011 | Porter |
| 2011/0080496 A1 | 4/2011 | Givon |
| 2011/0128440 A1* | 6/2011 | Koike ..................... G06T 1/00 348/441 |
| 2011/0141225 A1 | 6/2011 | Stec et al. |
| 2011/0141227 A1 | 6/2011 | Bigioi et al. |
| 2011/0141229 A1 | 6/2011 | Stec et al. |
| 2011/0141300 A1 | 6/2011 | Stec et al. |
| 2011/0164111 A1 | 7/2011 | Karaoguz |
| 2011/0187827 A1 | 8/2011 | Porter et al. |
| 2011/0249100 A1* | 10/2011 | Jayaram ............. H04N 5/2253 348/48 |
| 2012/0008103 A1 | 1/2012 | Lalley et al. |
| 2012/0019614 A1 | 1/2012 | Murray et al. |
| 2012/0051665 A1 | 3/2012 | Adams |
| 2012/0054664 A1* | 3/2012 | Dougall ........... H04N 21/23439 715/772 |
| 2012/0086783 A1 | 4/2012 | Sareen |
| 2012/0105574 A1* | 5/2012 | Baker .................... G03B 35/08 348/36 |
| 2012/0155786 A1 | 6/2012 | Zargarpour et al. |
| 2012/0169842 A1* | 7/2012 | Chuang ........... G08B 13/19619 348/39 |
| 2012/0169885 A1* | 7/2012 | Wang .................... G03B 43/00 348/180 |
| 2012/0218376 A1* | 8/2012 | Athan ............... H04N 5/23296 348/36 |
| 2012/0229604 A1 | 9/2012 | Boyce |
| 2012/0274739 A1 | 11/2012 | Li |
| 2012/0274775 A1 | 11/2012 | Reiffel |
| 2012/0293492 A1* | 11/2012 | Kuroume ........... H04N 13/0051 345/419 |
| 2012/0320152 A1 | 12/2012 | Seok |
| 2012/0320154 A1 | 12/2012 | Berger |
| 2013/0057643 A1 | 3/2013 | Cutchin |
| 2013/0063468 A1* | 3/2013 | Hikida ................ G06K 9/4676 345/589 |
| 2013/0071012 A1 | 3/2013 | Leichsenring |
| 2013/0076856 A1 | 3/2013 | Wakabayashi |
| 2013/0083173 A1 | 4/2013 | Geisner |
| 2013/0127850 A1 | 5/2013 | Bindon |
| 2013/0144720 A1 | 6/2013 | Hari et al. |
| 2013/0148851 A1* | 6/2013 | Leung ................. G06K 9/3241 382/103 |
| 2013/0188024 A1 | 7/2013 | Givon |
| 2013/0195182 A1* | 8/2013 | Kung .................... H04N 19/46 375/240.12 |
| 2013/0212538 A1 | 8/2013 | Lemire et al. |
| 2013/0215281 A1 | 8/2013 | Hobby |
| 2013/0222369 A1 | 8/2013 | Huston et al. |
| 2013/0222548 A1* | 8/2013 | Yang ..................... G09G 5/00 348/47 |
| 2013/0226444 A1 | 8/2013 | Johansson et al. |
| 2013/0229482 A1 | 9/2013 | Vilcovsky et al. |
| 2013/0229529 A1 | 9/2013 | Lablans |
| 2013/0250040 A1 | 9/2013 | Vitsnudel |
| 2013/0271572 A1 | 10/2013 | Hsu |
| 2013/0278631 A1 | 10/2013 | Border |
| 2013/0278718 A1* | 10/2013 | Tsukagoshi .......... H04N 13/156 348/43 |
| 2013/0293723 A1 | 11/2013 | Benson |
| 2013/0300637 A1 | 11/2013 | Smits et al. |
| 2013/0321392 A1 | 12/2013 | Van Der et al. |
| 2013/0321393 A1 | 12/2013 | Winder |
| 2013/0321593 A1 | 12/2013 | Kirk |
| 2013/0328928 A1 | 12/2013 | Yamagishi |
| 2014/0002491 A1 | 1/2014 | Lamb et al. |
| 2014/0002495 A1 | 1/2014 | Lamb et al. |
| 2014/0033052 A1 | 1/2014 | Kaufman et al. |
| 2014/0043329 A1 | 2/2014 | Wang et al. |
| 2014/0043436 A1 | 2/2014 | Bell et al. |
| 2014/0085293 A1* | 3/2014 | Konoplev ............... A63F 13/12 345/419 |
| 2014/0089398 A1 | 3/2014 | Zhang |
| 2014/0104378 A1 | 4/2014 | Kauff et al. |
| 2014/0132705 A1* | 5/2014 | Kira ................ H04N 5/23238 348/36 |
| 2014/0152777 A1 | 6/2014 | Galor et al. |
| 2014/0176565 A1 | 6/2014 | Adeyoola et al. |
| 2014/0205203 A1* | 7/2014 | Lackey ................ G06K 9/4642 382/278 |
| 2014/0226000 A1 | 8/2014 | Vilcovsky et al. |
| 2014/0226648 A1 | 8/2014 | Xing et al. |
| 2014/0226900 A1 | 8/2014 | Saban et al. |
| 2014/0240223 A1 | 8/2014 | Lake et al. |
| 2014/0267614 A1* | 9/2014 | Ding ...................... G06T 17/10 348/46 |
| 2014/0267631 A1 | 9/2014 | Powers et al. |
| 2014/0300691 A1 | 10/2014 | Saito et al. |
| 2014/0323194 A1 | 10/2014 | Keilwert |
| 2014/0336848 A1* | 11/2014 | Saund .................... G08G 1/054 701/3 |
| 2014/0362176 A1 | 12/2014 | St. Clair et al. |
| 2015/0002641 A1* | 1/2015 | Kim ........................ G06F 3/013 348/49 |
| 2015/0003532 A1* | 1/2015 | Fang ................... H04N 19/597 375/240.16 |
| 2015/0062000 A1 | 3/2015 | Saito |
| 2015/0080652 A1* | 3/2015 | Staples, II ............ G06F 19/321 600/109 |
| 2015/0094952 A1 | 4/2015 | Moeglein et al. |
| 2015/0105111 A1 | 4/2015 | Rodriguez |
| 2015/0116453 A1* | 4/2015 | Hirata ................ H04N 5/23245 348/38 |
| 2015/0169990 A1* | 6/2015 | McLaughlin ......... G06T 3/4069 382/218 |
| 2015/0215626 A1* | 7/2015 | Kim .................... H04N 19/597 375/240.02 |
| 2015/0233717 A1* | 8/2015 | Satti ........................ G01C 21/00 701/438 |
| 2015/0272547 A1* | 10/2015 | Freiburger ............ A61B 8/485 600/438 |
| 2015/0373266 A1* | 12/2015 | Hsieh .................. H04N 5/23238 348/36 |
| 2016/0019018 A1* | 1/2016 | Xiong ................... G06F 3/1446 345/1.3 |
| 2016/0028950 A1* | 1/2016 | Perazzi ............... H04N 5/23238 348/38 |
| 2016/0037082 A1* | 2/2016 | Wang ................. A61B 1/00009 348/65 |
| 2016/0286137 A1* | 9/2016 | Marks .................... G06T 3/4038 |
| 2017/0116703 A1 | 4/2017 | Sundareson |

FOREIGN PATENT DOCUMENTS

| | | |
|---|---|---|
| CN | 101155267 A | 4/2008 |
| CN | 101300840 A | 11/2008 |
| CN | 102420898 A | 4/2012 |
| CN | 102625121 A | 8/2012 |
| CN | 102667911 A | 9/2012 |
| CN | 102692806 A | 9/2012 |
| CN | 102714739 A | 10/2012 |
| CN | 102714748 A | 10/2012 |
| CN | 102812497 A | 12/2012 |
| CN | 103026700 A | 4/2013 |
| CN | 103109537 A | 5/2013 |
| CN | 103260046 A | 8/2013 |
| CN | 103533326 A | 1/2014 |
| CN | 103534726 A | 1/2014 |

(56) References Cited

FOREIGN PATENT DOCUMENTS

| | | |
|---|---|---|
| CN | 103930817 A | 7/2014 |
| EP | 1519582 A1 | 3/2005 |
| JP | 5564300 | 5/1980 |
| JP | H07182535 | 7/1995 |
| JP | 2006-515128 A | 5/2006 |
| JP | 2011082920 A | 4/2011 |
| JP | 2013-061848 | 4/2013 |
| KR | 10-0790890 B1 | 1/2008 |
| KR | 101055411 B1 | 8/2011 |
| KR | 10-2014-0089146 A | 7/2014 |
| KR | 2015-0001425 | 1/2015 |
| WO | WO 96/31047 | 10/1996 |
| WO | WO 2004/068865 | 8/2004 |
| WO | WO 2009/085961 | 7/2009 |
| WO | WO 2009/094643 | 7/2009 |
| WO | WO 2013/173728 | 11/2013 |
| WO | WO 2016048014 | 3/2016 |

OTHER PUBLICATIONS

CN Office Action for CN Application No. 201580001945.8 (with English translation) dated Dec. 13, 2016.
Partial European Search Report from the European Patent Office for EP Application No. 15186275.2, dated Feb. 26, 2016.
International Search Report and Written Opinion for International Application No. PCT/KR2015/009962, dated Jan. 15, 2016.
International Search Report and Written Opinion for International Application No. PCT/KR2015/009965, dated Jan. 14, 2016.
International Search Report and Written Opinion for International Application No. PCT/KR2015/009966, dated Jan. 6, 2016.
International Search Report and Written Opinion for International Application No. PCT/KR2015/009969, dated Jan. 6, 2016.
Final Office Action for U.S. Appl. No. 14/856,493, dated Jun. 2, 2017.
Non-Final Office Action for U.S. Appl. No. 14/856,500, dated May 5, 2017.
Restriction Requirement for U.S. Appl. No. 14/856,511, dated May 5, 2017.
Non-Final Office Action for U.S. Appl. No. 14/856,504, filed May 8, 2017.
Response to Final Office Action for U.S. Appl. No. 14/856,511, dated May 1, 2018.
Final Office Action for U.S. Appl. No. 14/856,493, dated Jun. 7, 2018.
CN Office Action for Application No. 201580051378.7, dated Jun. 1, 2018.
Final Office Action for KR Application No. 10-2017-7009749 (no English translation, dated Apr. 19, 2018.
Notice of Allowance for KR Application No. 10-2017-7009749 (no English translation, dated Jun. 8, 2018.
Notice of Allowance for KR Application No. 10-2017-7009746 (no English translation, dated Jun. 14, 2018.
Notice of Allowance for KR Application No. 10-2017-7009748 (no English translation, dated Jun. 14, 2018.
Notice of Allowance for KR Application No. 10-2017-7009747 (no English translation, dated Jun. 15, 2015.
CN Office Action for Application No. 201580051015.3, dated Feb. 5, 2018.
CN Office Action for Application No. 201580051097.1, dated Jan. 11, 2018.
KR Office Action for Application No. 10-2017-7009746 (with English translation), dated Jan. 8, 2018.
KR Office Action for Application No. 10-2017-7009747 (with English translation), dated Jan. 8, 2018.
KR Office Action for Application No. 10-2017-7009748 (with English translation), dated Jan. 8, 2018.
KR Office Action for Application No. 10-2017-7009749 (with English translation), dated Nov. 22, 2017.
Extended EP Search Report for Application No. 15844260.8-1972, dated Jan. 4, 2018.
Non-Final Office Action for U.S. Appl. No. 14/856,493, dated Aug. 1, 2016.
Response to Non-Final Office Action for U.S. Appl. No. 14/856,493, dated Feb. 1, 2017.
Response to Restriction Requirement for U.S. Appl. No. 14/856,511, dated Jul. 5, 2017.
Response to Non-Final Office Action for U.S. Appl. No. 14/856,500, dated Aug. 7, 2017.
Response to Non-Final Office Action for U.S. Appl. No. 14/856,504, dated Aug. 8, 2017.
Response to Final Office Action for U.S. Appl. No. 14/856,493, dated Sep. 5, 2017.
Non-Final Office Action for U.S. Appl. No. 14/856,511, dated Sep. 12, 2017.
Non-Final Office Action for U.S. Appl. No. 14/856,493, dated Oct. 13, 2017.
Final Office Action for U.S. Appl. No. 14/856,500, dated Nov. 3, 2017.
Final Office Action for U.S. Appl. No. 14/856,504, dated Nov. 3, 2017.
Response to Non-Final Office Action for U.S. Appl. No. 14/856,511, dated Dec. 12, 2017.
Response to Non-Final Office Action for U.S. Appl. No. 14/856,493, dated Jan. 16, 2018.
Final Office Action for U.S. Appl. No. 14/856,511, dated Feb. 2, 2018.
Response to Final Office Action for U.S. Appl. No. 14/856,504, dated Feb. 5, 2018.
CN Office Action for Application No. 201580001945.8 (with English translation), dated Aug. 10, 2017.
Extended EP Search Report for Application No. 15843162.7-1972, dated Aug. 25, 2017.
Extended EP Search Report for Application No. 15845458.7-1972, dated Aug. 29, 2017.
EP Search Report for Application No. 15844260.8-1972, dated Sep. 7, 2017.
Extended EP Search Report for Application No. 15845272.2-1972, dated Aug. 29, 2017.
CN Rejection Decision for Application No. 201580001945.8 (with English translation), dated Sep. 30, 2018.
CN Office Action for Application No. 201580051015.3 (with English translation), dated Oct. 15, 2018.
Response to Final Office Action for U.S. Appl. No. 14/856,500, dated Mar. 5, 2018.
Non-Final Office Action for U.S. Appl. No. 14/856,504, dated Jul. 5, 2018.
Non-Final Office Action for U.S. Appl. No. 14/856,493, dated Oct. 3, 2018.
Response to Non-Final Office Action for U.S. Appl. No. 14/856,504, dated Oct. 5, 2018.
Non-Final Office Action for U.S. Appl. No. 14/856,511, dated Oct. 19, 2018.
Notice of Allowance for U.S. Appl. No. 14/856,5041, dated Nov. 26, 2018.
CN Office Action for Application No. 201580051097.1 (no English translation), dated Jun. 12, 2018.
CN Office Action for Application No. 201580051378.7 (with English translation), dated Jun. 1, 2018.
International Search Report and Written Opinion for International Application No. PCT/KR2018/009096 dated Nov. 19, 2018.

* cited by examiner

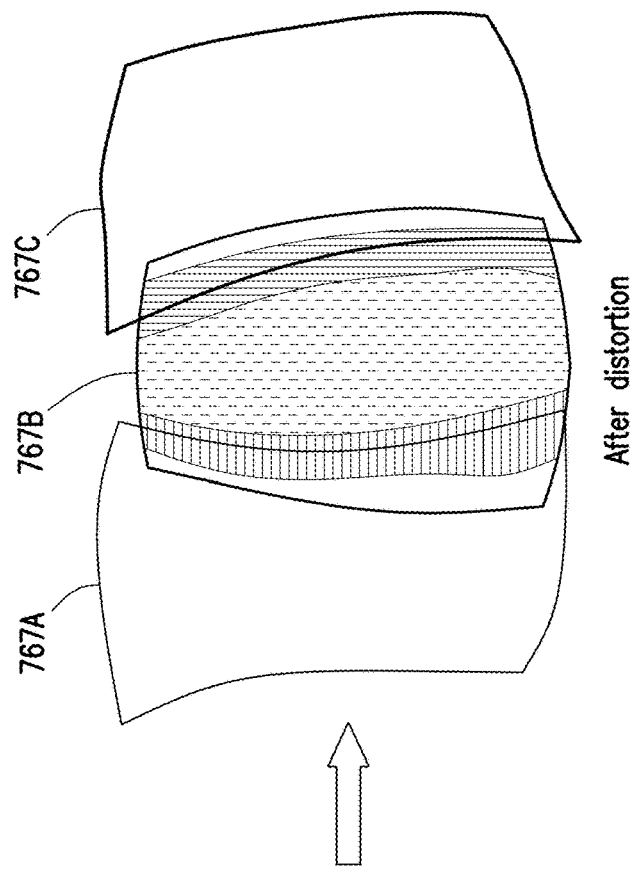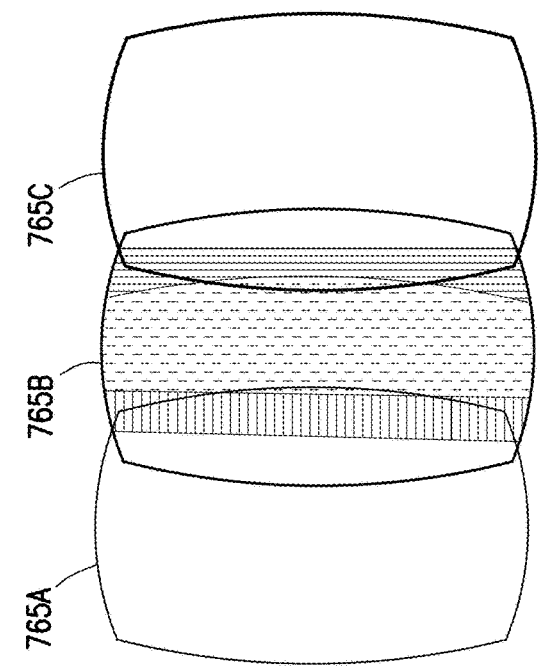
Fig. 29

IMAGE STITCHING FOR THREE-DIMENSIONAL VIDEO

PRIORITY

This application claims the benefit, under 35 U.S.C. § 119(e), of: U.S. Provisional Patent Application No. 62/053,726 filed 22 Sep. 2014; U.S. Provisional Patent Application No. 62/053,729 filed 22 Sep. 2014; U.S. Provisional Patent Application No. 62/053,737 filed 22 Sep. 2014; U.S. Provisional Patent Application No. 62/053,743 filed 22 Sep. 2014; U.S. Provisional Patent Application No. 62/141,018 filed 31 Mar. 2015; and U.S. Provisional Patent Application No. 62/053,750 filed 22 Sep. 2014, all of which are incorporated herein by reference.

TECHNICAL FIELD

This disclosure generally relates to three-dimensional imagery.

BACKGROUND

The human brain perceives three-dimensional (3-D) images based on the differences in images between the eyes. By using two images of the same scene obtained from slightly different angles, it is possible to triangulate the distance to an object with a high degree of accuracy. Each eye views a slightly different angle of an object seen by the left and right eyes. The use of 3-D imagery allows the viewer to be immersed in another environment and in some cases allows a viewer to view events, such as for example sports events or concerts, from different vantage points.

Some image-capture systems are based on capturing stereoscopic 2-D images. As an example, 3-D images may be constructed using 2-D images captured using a pair of spatially separated parallel cameras. As another example, a single camera may be physically moved to create the spatial offset when capturing the second of the stereoscopic images. In many cases, the image-capture systems are limited to capturing 3-D imagery within a defined angle.

3-D displays often provide the perception of depth to 2-D images by presenting two offset images separately to the left and right eye of the viewer. These 2-D images are then combined in the brain to give the perception of 3-D depth. Other example methods of displaying "offsetting" 2-D images to provide the perception of depth include using chromatically opposite filters (e.g., red and cyan), different polarizations, or shuttering of lenses over the eyes of the viewer.

BRIEF DESCRIPTION OF THE DRAWINGS

FIG. 29 illustrates an example set of monocular images before and after a distortion operation is applied to the images.

DESCRIPTION OF EXAMPLE EMBODIMENTS

The capability to capture and reconstruct 3-D video plays a significant role in fully utilizing the 3-D capabilities of gaming systems, televisions, or mobile devices. By closely modeling various aspects of human visual perception, a resulting 3-D video may be nearly indistinguishable from the natural view through one's own eyes, thereby creating a natural 3-D viewing experience.

Figure 1:
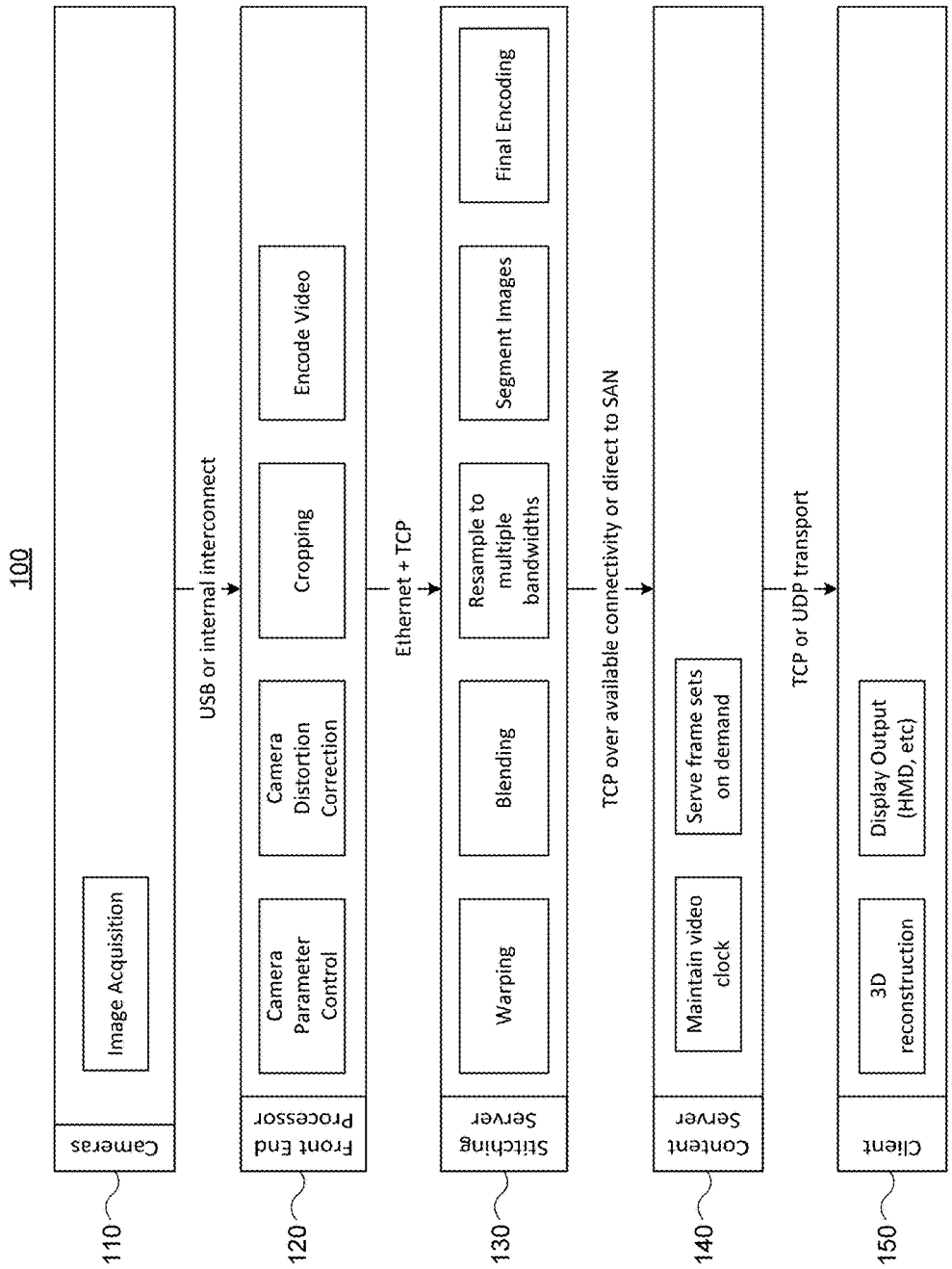
FIG. 1 illustrates an example 3-D imagery system architecture.

FIG. 1 illustrates an example 3-D imagery system architecture. In particular embodiments, a system architecture 100 for capturing, encoding, and rendering 360° 3-D video may include camera system 110, front-end processors 120, stitching server 130, content server 140, and client system 150. Although this disclosure describes and illustrates a particular 3-D imagery system composed of particular systems, this disclosure contemplates any suitable 3-D imagery system composed of any suitable systems.

Camera system 110 may include a number of pairs of cameras 112 that are configured to digitally capture images. As an example and not by way of limitation, the captured images may correspond to 360° 3-D video that is captured and processed in real-time. Cameras 112 of camera system 110 may be connected (e.g., through universal serial bus (USB)) to a front-end processor 120. Front-end processor 120 may provide initial control of cameras 112 by synchronizing the starting and stopping of the images from the various cameras 112. Front-end processors 120 may also determine or set camera parameters, such as shutter speed or exposure time. Front-end processor 120 may normalize, correct distortion, compress or encode the incoming videos from camera system 110. In particular embodiments, the number of front-end processors 120 may be based on the number of cameras 112 of camera system 110 as well as the size of the incoming images (e.g., frame rate or frame size). The image data from front-end processors 120 may be transferred (e.g., through a transmission-control protocol (TCP) network) to a stitching server 130 that perform the stitching of the discrete images captured by camera system 110.

As described below, stitching server 130 may stitch together the discrete images from the various cameras to generate complete frames of 3-D video. In particular embodiments, stitching server 130 may compute image alignment of the discrete images and segment complete frames into vertical strips. Stitching server 130 may recompress strips at different sizes and bit rates for variable bit-rate control. A single stitching server 130 may be used when real-time performance is not needed, or up to tens or even hundreds of stitching servers 130 may be used when real-time performance on high-resolution, high-frame-rate, 3-D video is being consumed. The frames of 3-D video may be stored or transmitted to a content server 140.

Content Server 140 may act as content distribution network for client systems 150 and communicate with client systems 150 to stream the appropriate parts of the requested 3-D video to the viewer. Content server 140 may transmit requested 3-D video to client systems 150 on a per-frame basis. In particular embodiments, the number of content servers 140 may be proportional to the number of client systems 150 receiving the 3-D video.

Client systems 150 may function as a device for users to view the 3-D video transmitted by content servers 140. Furthermore, input from client systems 150 to content servers 140 may modify portions of the 3-D video transmitted to client systems 150. As an example, the 3-D video may be adjusted based on data from client system 150 indicating that a user's viewing angle has changed. In particular embodiments, client system 150 may request frames that correspond to the straight-on view plus additional frames on either side. In particular embodiments, client system 150 may request low-resolution, full-frame images and reconstruct 3-D for the viewer.

Figure 2:
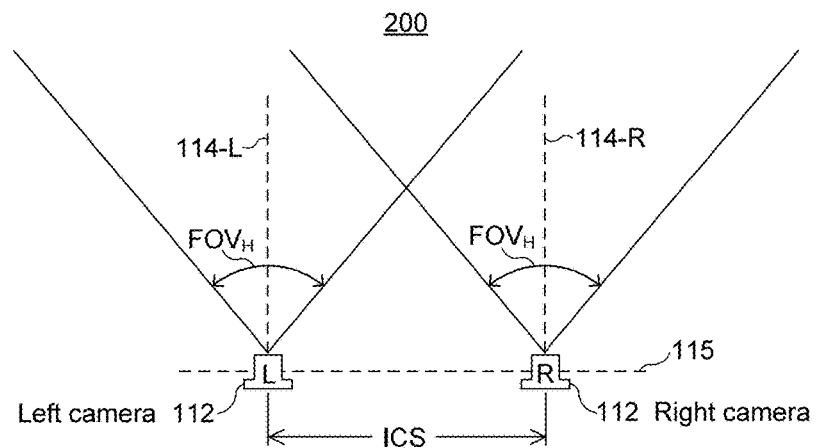
FIG. 2 illustrates an example stereoscopic pair of cameras.

FIG. 2 illustrates an example stereoscopic pair 200 of cameras 112. In particular embodiments, stereoscopic pair 200 may include two cameras 112 referred to respectively as left camera L and right camera R. Left camera L and right camera R may capture images that correspond to a person's left and right eyes, respectively, and video images captured by cameras L and R may be played back to a viewer as a 3-D video. In particular embodiments, stereoscopic pair 200 may be referred to as a pair, a stereo pair, a camera pair, or a stereo pair of cameras. As described below, camera system 110 may capture 3-D images using a number of pairs 200 of digital cameras ("cameras") 112, where camera system 110 may use integrated digital cameras or an interface to one or more external digital cameras. In particular embodiments, a digital camera may refer to a device that captures or stores images or videos in a digital format. Herein, the term "camera" may refer to a digital camera, and the term "video" may refer to digital video, or video recorded or stored in a digital format.

In particular embodiments, camera 112 may include an image sensor that is configured to capture individual photo images or a series of images as a video. As an example and not by way of limitation, camera 112 may include a charge-coupled device (CCD) image sensor or a complementary metal-oxide-semiconductor (CMOS) active-pixel image sensor. In particular embodiments, an image sensor of camera 112 may have an aspect ratio (e.g., a ratio of the sensor's width to height) of approximately 16:9, 4:3, 3:2, or any suitable aspect ratio. In particular embodiments, an image-sensor width of camera 112 may be greater than an image-sensor height. In particular embodiments, a width and height of an image sensor may be expressed in terms of a number of pixels along two axes of the image sensor, and the image sensor width may represent the longer dimension of the image sensor. As an example and not by way of limitation, an image sensor may have a width or height of between 500 and 8,000 pixels. As another example and not by way of limitation, an image sensor with a width of 1,920 pixels and a height of 1,080 pixels may be referred to as an image sensor with a 16:9 aspect ratio. In particular embodiments, camera 112 may include a lens or lens assembly to collect and focus incoming light onto the focal area of the image sensor. As an example and not by way of limitation, camera 112 may include a fisheye lens, ultra wide-angle lens, wide-angle lens, or normal lens to focus light onto the image sensor. Although this disclosure describes and illustrates particular cameras having particular image sensors and particular lenses, this disclosure contemplates any suitable cameras having any suitable image sensors and any suitable lenses.

In particular embodiments, camera 112 may have a field of view (FOV) that depends at least in part on a position, focal length, or magnification of a lens assembly of camera 112 and a position or size of an image sensor of camera 112. In particular embodiments, a FOV of camera 112 may refer to a horizontal, vertical, or diagonal extent of a particular scene that is visible through camera 112. Objects within a FOV of camera 112 may be captured by an image sensor of camera 112, and objects outside the FOV may not appear on the image sensor. In particular embodiments, FOV may be referred to as an angle of view (AOV), and FOV or AOV may refer to an angular extent of a particular scene that may be captured or imaged by camera 112. As an example and not by way of limitation, camera 112 may have a FOV between 30° and 200°. As another example and not by way of limitation, camera 112 having a 100° FOV may indicate that camera 112 may capture images of objects located within ±50° of a direction or orientation 114 in which camera 112 is pointing.

In particular embodiments, camera 112 may have two particular FOVs, such as for example a horizontal field of view ($FOV_H$) and a vertical field of view ($FOV_V$), where the two FOVs are oriented approximately orthogonal to one another. As an example and not by way of limitation, camera 112 may have a $FOV_H$ in a range of between 30° and 100° and a $FOV_V$ in a range of between 90° and 200°. In the example of FIG. 2, camera 112 has a $FOV_H$ of approximately 80°. In particular embodiments, camera 112 may have a $FOV_V$ that is wider than its $FOV_H$. As an example and not by way of limitation, camera 112 may have a $FOV_H$ of approximately 45° and a $FOV_V$ of approximately 150°. In particular embodiments, camera 112 having two unequal FOVs may be due at least in part to camera 112 having an image sensor with a rectangular shape (e.g., camera 112 may have an image sensor with a 16:9 aspect ratio). In particular embodiments, camera 112 may be positioned so that its $FOV_V$ is aligned with or corresponds to the width of camera 112's image sensor and its $FOV_H$ is aligned with the height of the image sensor. As an example and not by way of limitation, an image-sensor may have a height and width, where the width represents the longer of the two image-sensor dimensions, and camera 112 may be oriented so that the width axis of its image sensor corresponds to $FOV_V$. Although this disclosure describes and illustrates particular cameras having particular fields of view, this disclosure contemplates any suitable cameras having any suitable fields of view.

In particular embodiments, camera 112 may have an orientation 114 that represents an angle or a direction in which camera 112 is pointing. In particular embodiments, orientation 114 may be represented by a line or ray directed along a center of a FOV of camera 112. In particular embodiments, orientation line 114 of camera 112 may be directed approximately along a longitudinal axis of camera 112, approximately orthogonal to a surface of the camera's lens assembly or image sensor, or approximately orthogonal to axis 115, where axis 115 represents a line between cameras L and R of stereoscopic pair 200. In the example of FIG. 2, orientation 114-L and orientation 114-R are each approximately orthogonal to axis 115, and orientations 114-L and 114-R are each directed approximately along a respective center of $FOV_H$ of camera 112. In particular embodiments, each camera 112 of a stereoscopic pair 200 may have a particular orientation 114 with respect to one another. In particular embodiments, a left and right camera 112 of stereoscopic pair 200 may each point in approximately the same direction, and orientations 114 of the left and right cameras may be approximately parallel (e.g., angle between orientations 114 may be approximately 0°). In the example of FIG. 2, left camera orientation 114-L is approximately parallel to right camera orientation 114-R, which indicates that cameras L and R are pointing in approximately the same direction. Left and right cameras 112 with parallel orientations 114 may represent cameras pointing in the same direction, and cameras L and R may be referred to as having the same orientation. In particular embodiments, left camera L and right camera R having a same orientation may refer to orientations 114-L and 114-R, respectively, that are parallel to one another to within ±0.1°, ±0.5°, ±1°, ±2°, ±3°, or to within any suitable angular value. In particular embodiments, an orientation of stereoscopic pair 200 may be represented by an orientation 114 of parallel left and right cameras 112. As an example and not by way of limitation, a first stereoscopic pair 200 may be referred to as having a 30° degree orientation with respect to a second stereoscopic pair 200 when each camera of the first pair is oriented at 30° degrees with respect to the cameras of the second camera pair.

In particular embodiments, left camera L and right camera R may have orientations 114-L and 114-R with a particular nonzero angle between them. As an example and not by way of limitation, the two cameras of stereoscopic pair 200 may be oriented slightly toward or away from one another with an angle between their orientations of approximately 0.5°, 1°, 2°, or any suitable angular value. In particular embodiments, an orientation of stereoscopic pair 200 may be represented by an average of orientations 114-L and 114-R. Although this disclosure describes and illustrates particular cameras having particular orientations, this disclosure contemplates any suitable cameras having any suitable orientations.

In particular embodiments, an inter-camera spacing (ICS) between cameras 112 of a pair of cameras (e.g., L and R) may represent a distance by which the two cameras are separated from each other. In particular embodiments, stereoscopic pair 200 may have cameras 112 with an ICS between 6 and 11 cm, where ICS may be measured between two corresponding points or features of two cameras 112. As an example and not by way of limitation, ICS may correspond to a distance between middle points of two cameras 112, a distance between longitudinal axes of two cameras 112, or a distance between orientation lines 114 of two cameras 112. In particular embodiments, cameras L and R of stereoscopic pair 200 may be separated by an ICS distance along axis 115, where axis 115 represents a line connecting cameras L and R, and camera orientations 114-L and 114-R are approximately orthogonal to axis 115. In the example of FIG. 2, ICS is a distance between cameras L and R as measured along separation axis 115. In particular embodiments, an ICS may correspond to an approximate or average distance between the pupils, or the inter-pupillary distance (IPD), of a person's eyes. As an example and not by way of limitation, an ICS may be between 6 and 7 cm, where 6.5 cm corresponds to an approximate average IPD value for humans. In particular embodiments, stereoscopic pair 200 may have an ICS value that is higher than an average IPD value (e.g., ICS may be 7-11 cm), and this higher ICS value may provide a scene that appears to have enhanced 3-D characteristics when played back to a viewer. Although this disclosure describes and illustrates particular camera pairs having particular inter-camera spacings, this disclosure contemplates any suitable camera pairs having any suitable inter-camera spacings.

Figure 3:
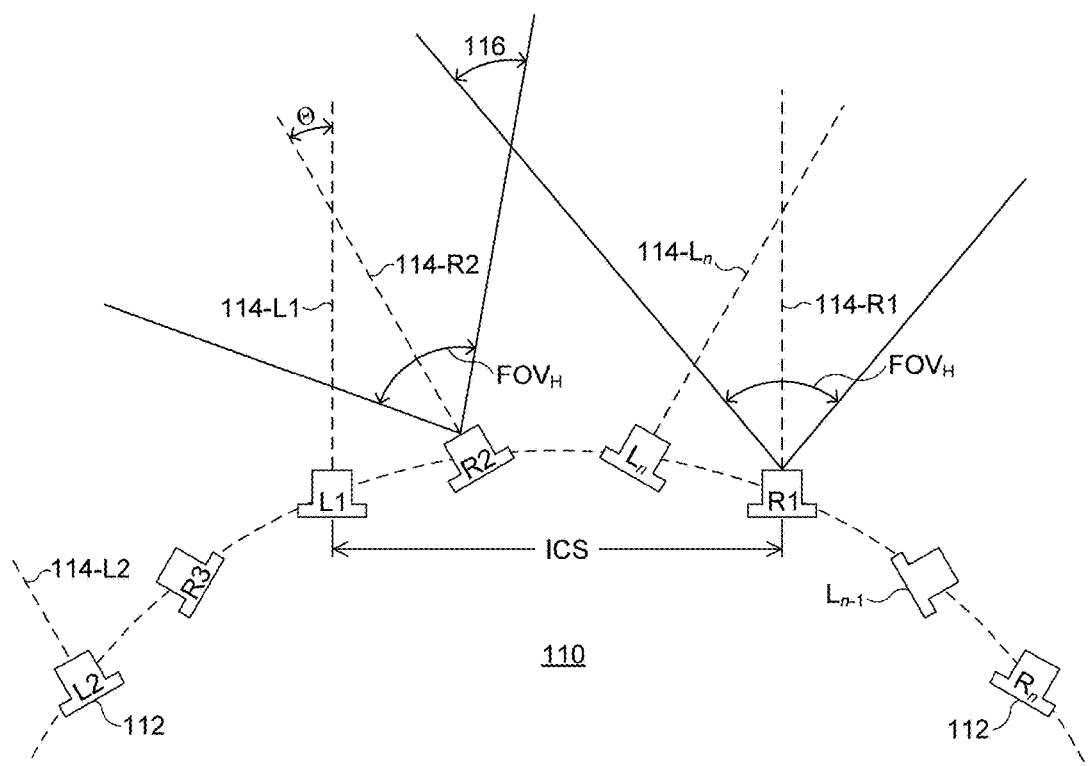
FIG. 3 illustrates a partial plan view of an example camera configuration of a camera system.

FIG. 3 illustrates a partial plan view of an example camera configuration of camera system 110. In the example of FIG. 3, camera system 110 includes a first camera pair 200 formed by L1 and R1, a second camera pair 200 formed by L2 and R2, and an n-th camera pair 200 formed by $L_n$ and $R_n$. In particular embodiments, camera system 110 may also include additional camera pairs, such as for example camera pair L3-R3 (where camera L3 is not shown in FIG. 3) or camera pair $L_{n-1}$-$R_{n-1}$ (where camera $R_{n-1}$ is not shown in FIG. 3). Although this disclosure describes and illustrates particular camera systems having particular numbers of camera pairs, this disclosure contemplates any suitable camera systems having any suitable numbers of camera pairs.

In particular embodiments, cameras 112 of camera system 110 may be arranged along a straight line, a curve, an ellipse (or a portion of an ellipse), a circle (or a portion of a circle), or along any other suitable shape or portion of any suitable shape. Camera system 110 with cameras 112 arranged along a circle may be configured to record images over a 360° panoramic view. In the example of FIG. 3, cameras 112 are arranged along a portion of a circle as represented by the circular dashed line in FIG. 3. Camera system 110 illustrated in FIG. 3 may record images over a half circle and provide approximately 180° of angular viewing. In particular embodiments, cameras 112 of camera system 110 may each be located in the same plane. As an example and not by way of limitation, each camera 112 of camera system 110 may be located in a horizontal plane, and each camera 112 may have its $FOV_H$ oriented along the horizontal plane and its $FOV_V$ oriented orthogonal to the horizontal plane. In the example of FIG. 3, cameras 112 are each located in the same plane, and the $FOV_H$ of each camera 112 is also oriented in that plane. In particular embodiments, cameras 112 of camera system 110 may each be located in the same plane, and orientation 114 of each camera 112 may also be located in that same plane. In the example of FIG. 3, cameras 112 are each located in the same plane, and camera orientations (e.g., 114-L1, 114-L2, 114-R1, and 114-R2) are also located in that same plane so that each camera points along a direction that lies in the plane. In particular embodiments, camera 112 may be positioned with the height dimension of camera 112's image sensor oriented along the horizontal plane so that the image-sensor height is aligned with and corresponds to $FOV_H$. Additionally, camera 112 may be positioned with the width dimension of camera 112's image sensor oriented orthogonal to the horizontal plane so that the image-sensor width corresponds to $FOV_V$. In particular embodiments, camera 112 may capture an image having an aspect ratio such that a vertical extent of the image is larger than a horizontal extent of the image.

In particular embodiments, camera system 110 may include a number of pairs 200 of cameras 112, where the camera pairs 200 are interleaved with one another. In particular embodiments, camera pairs 200 being interleaved may refer to a camera configuration where a first camera pair has one camera located between the cameras of an adjacent second camera pair. Additionally, the second camera pair may also have one camera located between the cameras of the first camera pair. In particular embodiments, an adjacent or adjoining camera pair 200 may refer to camera pairs 200 located next to one another or arranged such that a camera of one camera pair 200 is located between the two cameras of another camera pair 200. In particular embodiments, interleaved camera pairs 200 may refer to a camera configuration with first and second camera pairs, where the second pair of cameras are separated from each other by at least a camera of the first camera pair. Additionally, the first pair of cameras may also be separated from each other by at least a camera of the second camera pair. In the example of FIG. 3, camera pair L2-R2 is interleaved with camera pair L1-R1 and vice versa. Camera pairs L1-R1 and L2-R2 are interleaved such that camera R2 is located between cameras L1 and R1, and camera L1 is located between cameras L2 and R2. Similarly, camera pairs L1-R1 and $L_n$-$R_n$ are also interleaved with one another. Camera pairs L1-R1 and $L_n$-$R_n$ are interleaved such that cameras L1 and R1 are separated by at least camera $L_n$, and cameras $L_n$-$R_n$ are separated by at least camera R1. In the example of FIG. 3, camera pair L1-R1 is interleaved with two adjoining camera pairs, camera pair L2-R2 and camera pair $L_n$-$R_n$.

In particular embodiments, camera system 110 may include a first pair 200 of cameras 112, where the cameras of the first pair are separated from each other by at least one camera 112 of a second pair 200 of cameras 112. In the example of FIG. 3, cameras L1 and R1 of camera pair L1-R1 are separated from each other by camera R2 of camera pair L2-R2. Additionally, the first pair of cameras may have an orientation 114 that is different from an orientation 114 of the second pair of cameras. In the example of FIG. 3, the orientation of camera pair L1-R1 (which may be represented by orientation 114-L1 or 114-R1) is different from the orientation of camera pair L2-R2 (which may be represented by orientation 114-L2 or 114-R2). In particular embodiments, camera system 110 may also include a third pair of cameras (e.g., $L_n$-$R_n$ in FIG. 3), and the cameras of the first pair (e.g., L1-R1) may also be separated from each other by a camera (e.g., camera $L_n$) of the third pair of cameras (e.g., $L_n$-$R_n$). Additionally, the third pair of cameras may have an orientation 114 that is different from the orientations 114 of the first and second camera pairs. Although this disclosure describes and illustrates particular camera systems having particular cameras arranged in particular configurations, this disclosure contemplates any suitable camera systems having any suitable cameras arranged in any suitable configurations.

In particular embodiments, camera system 110 may include multiple interleaved camera pairs 200, where each camera pair 200 has a particular orientation 114. In particular embodiments, cameras 112 of each camera pair 200 may be arranged uniformly such that each camera pair 200 is oriented at an angle Θ with respect to one or more adjacent camera pairs 200. In particular embodiments, angle Θ may correspond to an angular spacing or a difference in orientations 114 between adjacent pairs 200 of cameras 112. In the example of FIG. 3, cameras L1 and R1 are pointing in the same direction as represented by their approximately parallel respective orientations 114-L1 and 114-R1. Similarly, cameras L2 and R2 are each pointing along a direction, as represented by their approximately parallel respective orientations 114-L2 and 114-R2, that is different from the orientation of camera pair L1-R1. In particular embodiments, angle Θ between adjacent camera pairs 200 may be approximately the same for each camera pair 200 of camera system 110 so that camera pairs 200 are arranged with a uniform difference between their respective orientations 114. As an example and not by way of limitation, adjacent camera pairs 200 of camera system 110 may each be oriented at an angle of approximately 26°, 30°, 36°, 45°, 60°, 90°, or any suitable angle with respect to one another. In the example of FIG. 3, camera pair L2-R2 is oriented at angle Θ≈30° with respect to camera pair L1-R1. In particular embodiments, for camera system 110 with n uniformly spaced camera pairs 200 (where n is a positive integer) arranged along a circle, angle Θ between each adjacent camera pair may be expressed as Θ≈360°/n. As an example and not by way of limitation, for camera system 110 with n=12 pairs of cameras distributed in a uniformly spaced circular configuration, angle Θ between each adjacent camera pair is approximately 360°/12=30°. As another example and not by way of limitation, for camera system 110 with n=8 pairs of cameras distributed in a uniformly spaced circular configuration, angle Θ between each adjacent camera pair is approximately 360°/8=45°.

In particular embodiments, a first and second camera pair 200 may be interleaved such that a right camera 112 of the second pair of cameras is adjacent to a left camera 112 of the first pair of cameras, and a center of a $FOV_H$ of the right camera 112 of the second pair of cameras intersects a center of a $FOV_H$ of the left camera 112 of the first pair of cameras. In the example of FIG. 3, first camera pair L1-R1 is interleaved with second camera pair L2-R2 such that right camera R2 is adjacent to left camera L1, and the center of the $FOV_H$ of camera R2 (as represented by orientation 114-R2) intersects the center of the $FOV_H$ of camera L1 (as represented by orientation 114-L1). In particular embodiments, a first and third camera pair 200 may be interleaved such that a left camera 112 of the third pair of cameras is adjacent to a right camera 112 of the first pair of cameras, and a center of a $FOV_H$ of the left camera 112 of the third pair of cameras intersects a center of a $FOV_H$ of the right camera 112 of the first pair of cameras. In the example of FIG. 3, first camera pair L1-R1 is interleaved with n-th camera pair $L_n$-$R_n$ such that left camera $L_n$ is adjacent to right camera $R_n$, and the center of the $FOV_H$ of camera $L_n$ (as represented by orientation 114-$L_n$) intersects the center of the $FOV_H$ of camera R1 (as represented by orientation 114-R1). Although this disclosure describes and illustrates particular camera pairs interleaved in particular manners, this disclosure contemplates any suitable camera pairs interleaved in any suitable manners.

In particular embodiments, angle Θ between adjacent camera pairs 200 may be different for one or more camera pairs 200 of camera system 110 so that camera pairs 200 may have a nonuniform angular spacing. As an example and not by way of limitation, the angular spacing or distribution of camera pairs 200 in camera system 110 may be varied based at least in part on the $FOV_H$ of each camera 112. For example, some camera pairs 200 of camera system 110 with a narrower $FOV_H$ may have an angular spacing of 30° while other camera pairs 200 with a wider $FOV_H$ have an angular spacing of 50°. Although this disclosure describes and illustrates particular camera systems having particular camera pairs with particular angular spacings, this disclosure contemplates any suitable camera systems having any suitable camera pairs with any suitable angular spacings.

In particular embodiments, each $FOV_H$ of a set of left cameras (e.g., cameras L1, L2, etc., which correspond to a person's left eye) or a set of right cameras (e.g., cameras R1, R2, R3, etc., which correspond to a person's right eye) may have an angular overlap 116 with neighboring cameras in the set. In the example of FIG. 3, angular overlap 116 represents a shared portion or an overlap between images captured by neighboring cameras R1 and R2. In FIG. 3, cameras R2 and R3, cameras $R_n$ and R1, cameras L1 and L2, and cameras $L_n$ and $L_{n-1}$ may also share similar angular overlaps. In particular embodiments, neighboring cameras 112 with an angular overlap 116 may have an overlap of their horizontal FOVs of between 10% and 30%. As an example and not by way of limitation, neighboring cameras with horizontal FOVs that overlap by 10-30% may each capture images that overlap by between 10% and 30%. As another example and not by way of limitation, neighboring cameras each with a $FOV_H \approx 50°$ and an angular overlap 116 of approximately 10° may be referred to as having an angular overlap or an image overlap of approximately 20% (=10°/50°). In particular embodiments, and as described below, angular overlap 116 may be used to identify image features and create a stitched image that seamlessly shows an entire view as captured by camera system 110. Although this disclosure describes and illustrates particular cameras having particular angular overlaps, this disclosure contemplates any suitable cameras having any suitable angular overlaps.

Figure 4:
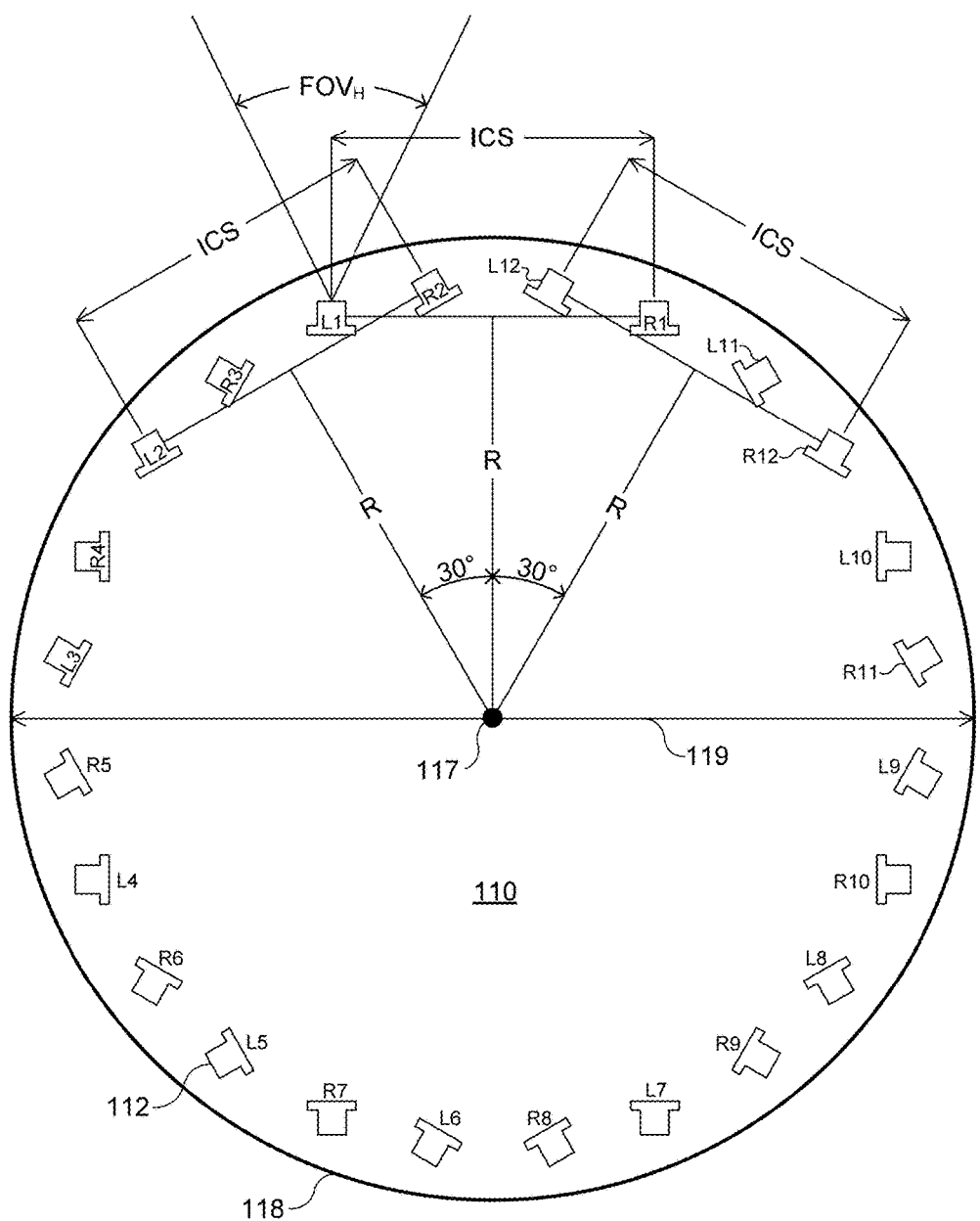
FIG. 4 illustrates a plan view of an example camera system.

FIG. 4 illustrates a plan view of an example camera system 110. As described below, camera system 110 may include a spatial arrangement of stereoscopic pairs 200 of cameras 112 configured to capture images and record or stream real-time video in 360 degrees and in stereoscopic 3-D format. In particular embodiments, camera system 110 may include 2n cameras 112 that form n camera pairs 200, where n is a positive integer. In particular embodiments, camera system 110 may include n=1, 2, 3, 4, 6, 8, 10, 12, 14, 16, or any suitable number of camera pairs 200. As examples and not by way of limitation, camera system 110 may include 8 cameras 112 that form n=4 camera pairs 200, or camera system 110 may include 16 cameras 112 that form n=8 camera pairs 200. In the example of FIG. 4, n equals 12, and camera system 110 includes 24 cameras 112 that form 12 camera pairs 200 (e.g., camera pair L1-R1 through camera pair L12-R12). As discussed above, camera pairs 200 of camera system 110 may be uniformly arranged so that adjacent camera pairs 200 are oriented at an angle of Θ≈360°/n with respect to one another. In the example of FIG. 4, n equals 12, and camera pairs 200 are oriented at approximately 30° (=360°/12) with respect to one another as represented by the 30° angles between radial lines R drawn from the center of camera system 110 to camera pairs 200.

In particular embodiments, cameras 112 of camera system 110 may be configured so that the horizontal FOVs of neighboring left cameras are overlapped and, similarly, the horizontal FOVs of neighboring right cameras are overlapped. In the example of FIG. 4, each pair of neighboring left cameras (e.g., cameras L1 and L2, cameras L2 and L3, etc.) may have an overlap of their horizontal FOVs of between 10% and 30%. Similarly, each pair of neighboring right cameras (e.g., cameras R1 and R2, cameras R2 and R3, etc.) may have an overlap of their horizontal FOVs of between 10% and 30%. In particular embodiments, each set of left cameras (e.g., cameras L1-L12 in FIG. 4) may be oriented to capture a corresponding set of left images that covers a full 360° view around camera system 110. Similarly, each set of right cameras (e.g., cameras R1-R12 in FIG. 4) may be oriented to capture a corresponding set of right images that covers a full 360° view around camera system 110.

In particular embodiments, cameras 112 of camera system 110 may be arranged in an approximately circular configuration with cameras 112 located at or near an outer edge or circumference of camera body 118. In particular embodiments, camera body 118 may represent a mechanical structure, enclosure, or casing that holds, contains, or encloses cameras 112 of camera system 110, as well as other devices that are part of camera system 110, such as for example, one or more power supplies or processors. In the example of FIG. 4, the 24 cameras 112 of camera system 110 are arranged in a circular configuration near an outer edge of camera body 118, which has a circular shape. In particular embodiments, each camera pair 200 of camera system 110 may be aligned so its orientation 114 is directed away from, or radially outward from, a common center point 117. In the example of FIG. 4, center point 117 represents a center of body 118 of camera system 110, and the orientation of each camera pair, as represented by radial line R, is directed radially outward from center point 117. In particular embodiments, camera body 118 of camera system 110 may have a size, width, or diameter 119 of approximately 10 cm, 15 cm, 20 cm, 25 cm, 30 cm, or any suitable size. In the example of FIG. 4, camera body 118 may have an outer edge with a diameter 119 of approximately 20 cm. In particular embodiments, camera system 110 may have a size comparable to that of a human head as it turns. As an example and not by way of limitation, camera body 118 may have a diameter of approximately 20 cm, and camera pairs 200 may be positioned to correspond to the location of a person's eyes as the person rotates their head. Although this disclosure describes and illustrates particular camera systems having particular sizes, widths, or diameters, this disclosure contemplates any suitable camera systems having any suitable sizes, widths or diameters.

In particular embodiments, two or more cameras 112 of camera system 110 may be referred to as being adjacent to one another. In particular embodiments, two cameras 112 that are adjacent to one another may refer to two cameras located next to or nearby one another with no other camera located between the two cameras. In the example of FIG. 4, cameras L1 and R3 are adjacent to one another, and cameras L2 and R3 are adjacent to one another. In FIG. 4, camera R1 is adjacent to camera L11 and camera L12. In particular embodiments, adjacent cameras may be identified within a particular set of cameras without regard to other cameras which are not part of the set. As an example and not by way of limitation, two cameras within a set of left cameras may be identified as being adjacent to one another even though there may be a right camera located near or between the two cameras. In FIG. 4, for the set of left cameras (cameras L1 through L12), camera L1 is adjacent to cameras L2 and L12, and for the set of right cameras (cameras R1 through R12), cameras R1 and R2 are adjacent.

Figure 5:
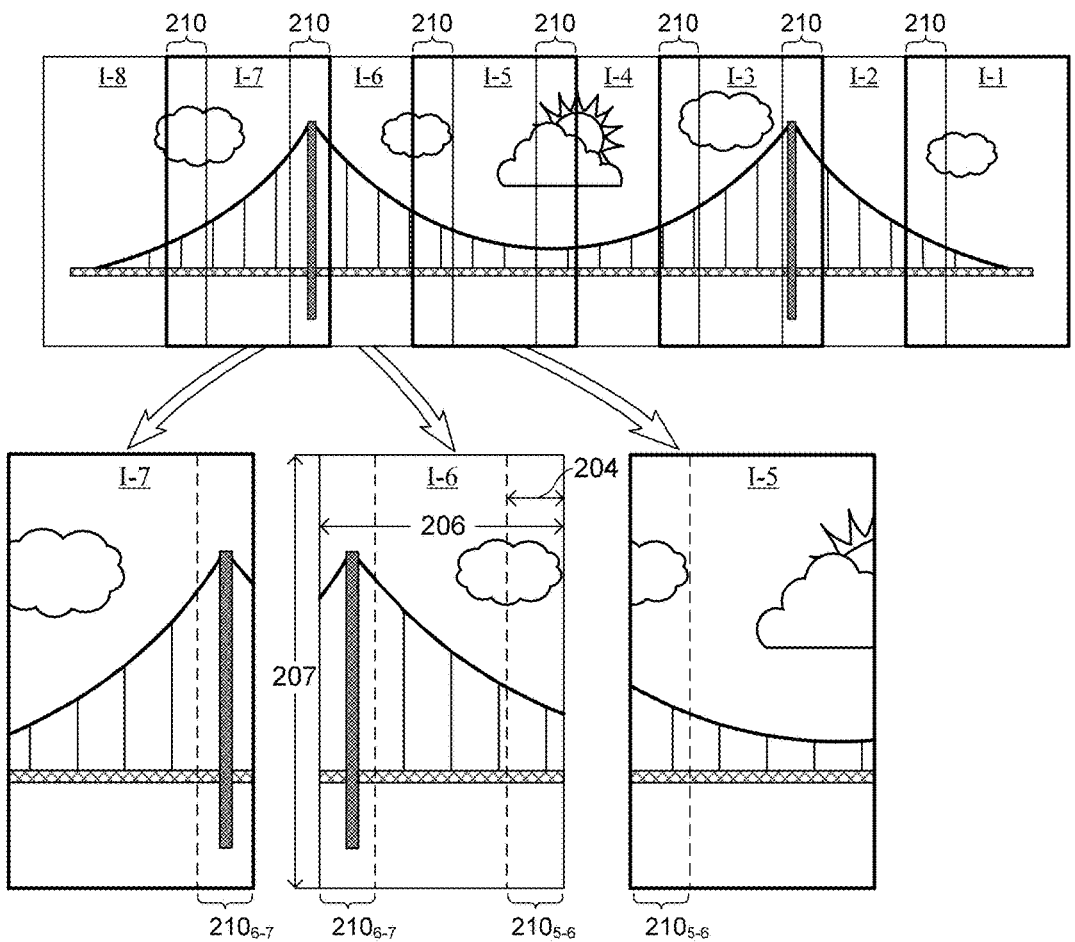
FIG. 5 illustrates an example set of images captured by cameras of a camera system.

FIG. 5 illustrates an example set of images (I-1 through I-8) captured by cameras 112 of a camera system 110. As an example and not by way of limitation, images I-1 through I-8 may correspond to images captured by left cameras L-1 through L-8, respectively, of camera system 110. Images I-1 through I-8 may represent images captured using a camera system 110 similar to that illustrated in FIG. 3 or FIG. 4. In particular embodiments, a set of images captured by a set of left or right cameras 112 of camera system 110 may have overlap areas 210 between neighboring images, where overlap areas 210 represent portions or regions of neighboring images that correspond to approximately the same scene. In the example of FIG. 5, overlap area $210_{5-6}$ represents an overlap between neighboring images I-5 and I-6, and the captured scene in overlap area $210_{5-6}$ includes a right portion of a cloud and part of a bridge. Similarly, overlap area $210_{6-7}$ represents an overlap between neighboring images I-6 and I-7, and the captured scene in overlap area $210_{6-7}$ includes a bridge tower.

In particular embodiments, overlap area 210 may correspond to an overlap of horizontal FOVs of neighboring cameras 112. In particular embodiments, neighboring images captured by left or right cameras 112 of camera system 110 may have an overlap of between 10% and 30%. In particular embodiments, an amount or a percentage of overlap corresponds to a ratio of a height, width, or area of overlap area 210 to a height, width, or area of a corresponding image. In the example of FIG. 5, an amount of overlap between images I-5 and I-6 is equal to width 204 of overlap area $210_{5-6}$ divided by width 206 of image I-5 or I-6. In particular embodiments, a dimension of overlap area 210 or a dimension of an image may be expressed in terms of a distance (e.g., in units of mm or cm) or in terms of a number of pixels. In the example of FIG. 5, if overlap-area width 204 is 162 pixels and image width 206 is 1,080 pixels, then the overlap between images I-5 and I-6 is 15% (=162/1080). Although this disclosure describes and illustrates particular images with particular overlap areas or overlap amounts, this disclosure contemplates any suitable images with any suitable overlap areas or overlap amounts.

In particular embodiments, camera 112 may be positioned to capture an image having an aspect ratio such that vertical extent 207 of the image is larger than horizontal extent 206 of the image. As an example and not by way of limitation, camera 112 may capture an image with vertical extent 207 of 1,920 pixels and horizontal extent 206 of 1,080 pixels. In the example of FIG. 5, image I-6 has vertical extent 207 that is larger than horizontal extent 206.

In particular embodiments, adjacent images or neighboring images may refer to images located next to one another that share a common overlap area 210. In the example of FIG. 5, images I-2 and I-3 are adjacent, and image I-6 is adjacent to images I-5 and I-7. In particular embodiments, adjacent images may correspond to images captured by respective adjacent cameras. In the example of FIG. 5, images I-1 through I-8 may correspond to images captured by left cameras L1 through L8, respectively, such as for example, left cameras L1 through L8 of FIG. 4. Images I-1 and I-2 are adjacent images, and these images may be captured by adjacent left cameras L1 and L2, respectively.

Figure 6:
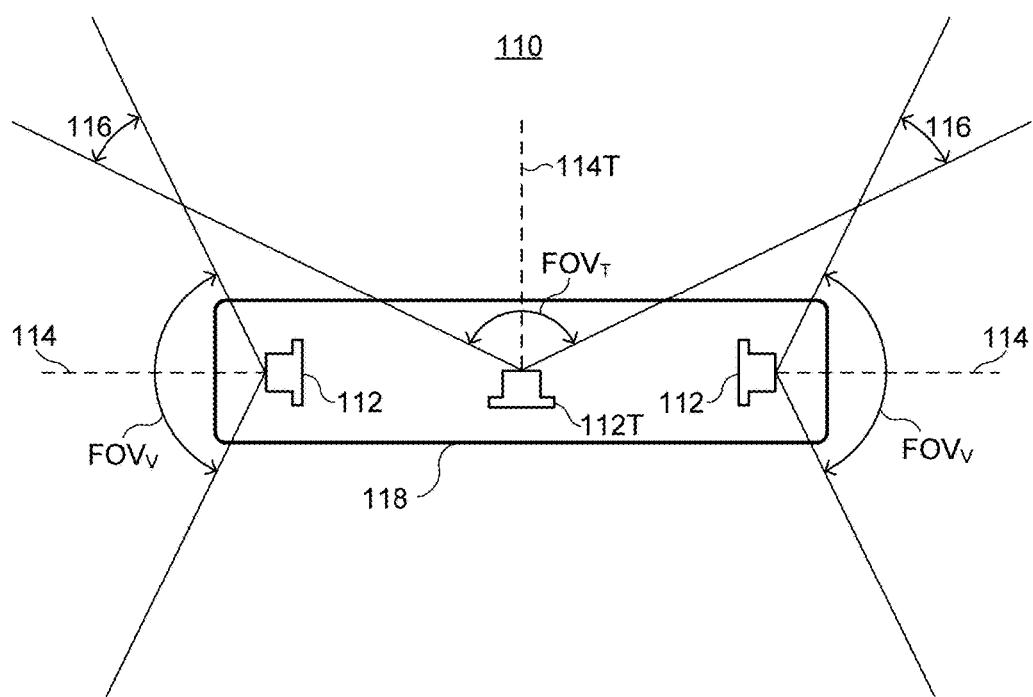
FIG. 6 illustrates a side view of an example camera system.

FIG. 6 illustrates a side view of an example camera system 110. In particular embodiments, camera system 110 may include one or more top cameras 112T which create a "roof" over an otherwise cylindrical side view captured by side cameras 112 arranged along a periphery of camera system 110. In particular embodiments, side cameras 112 may refer to cameras 112 arranged in a planar configuration with their respective orientations 114 located within the same plane, such as for example cameras 112 illustrated in FIG. 3 or FIG. 4. In particular embodiments, top camera 112T may provide an upward view that may be combined with images from side cameras 112 so that a user can look up (as well as looking to their left or right, or down within the downward extent of $FOV_V$) when viewing a 3-D video. In particular embodiments, camera system 110 may include one or more top cameras 112T pointing up as well as one or more bottom cameras (not illustrated in FIG. 6) pointing down. As an example and not by way of limitation, images from side cameras 112 may be combined with images from top camera 112T and a bottom camera so that a user can look in any direction (e.g., left, right, up, or down) when viewing a 3-D video. In particular embodiments, camera system 110 may include two or more top cameras 112T (e.g., a top-left camera and a top-right camera which may form a stereoscopic pair), and images from top cameras 112T may be combined to enhance a user's 3-D perception while viewing a 3-D video and looking upwards. Although this disclosure describes and illustrates particular camera systems having particular top or bottom cameras, this disclosure contemplates any suitable camera systems having any suitable top or bottom cameras.

In particular embodiments, top camera 112T may have a field of view $FOV_T$ that overlaps a vertical field of view $FOV_V$ of one or more side cameras 112. As an example and not by way of limitation, an outer edge portion of an image from top camera 112T may overlap an upper portion of images from cameras 112 by 10-30%. In the example of FIG. 6, angular overlap 116 represents an overlap between $FOV_T$ of top camera 112T and $FOV_V$ of a side camera 112. In particular embodiments, top camera 112T may have a relatively high $FOV_T$. As an example and not by way of limitation, top camera 112T may include a fisheye lens and $FOV_T$ of top camera 112T may be in the range of 140° to 185°. In particular embodiments, camera system 110 may include a set of side cameras 112 and may not include a top camera 112T. As an example and not by way of limitation, camera system 110 may include side cameras 112 having a $FOV_V$ in the range of 140° to 185°, and side cameras 112 may be configured to capture all or most of a full 360° view without use of a top camera. In particular embodiments and as illustrated in FIG. 6, camera system 110 may include a set of side cameras 112 as well as top camera 112T. In particular embodiments, camera system 110 having top camera 112T may allow side cameras 112 to have a reduced $FOV_V$ with respect to a camera system 110 without a top camera. As an example and not by way of limitation, camera system 110 may include side cameras 112 having a $FOV_V$ in the range of 100° to 160°, where $FOV_V$ overlaps with $FOV_T$ of top camera 112T.

In particular embodiments, top camera 112T may be located near a top surface of camera system 110 or, as illustrated in FIG. 6, top camera 112T may be recessed or indented with respect to a top surface of camera system 110. As an example and not by way of limitation, top camera 112T may be located in a recessed position which may provide for a larger amount of overlap with side cameras 112. In particular embodiments, side cameras 112 of camera system 110 may each have an orientation 114 that lies in a horizontal plane of camera system 110, and orientation 114T of top camera 112T may be approximately orthogonal to orientations 114. In the example of FIG. 6, side cameras 112 are oriented horizontally, and top camera 112T has a vertical orientation 114T. Although this disclosure describes and illustrates particular camera systems with particular edge cameras and particular top cameras having particular arrangements, orientations, or fields of view, this disclosure contemplates any suitable camera systems with any suitable edge cameras and any suitable top cameras having any suitable arrangements, orientations, or fields of view.

Figure 7:
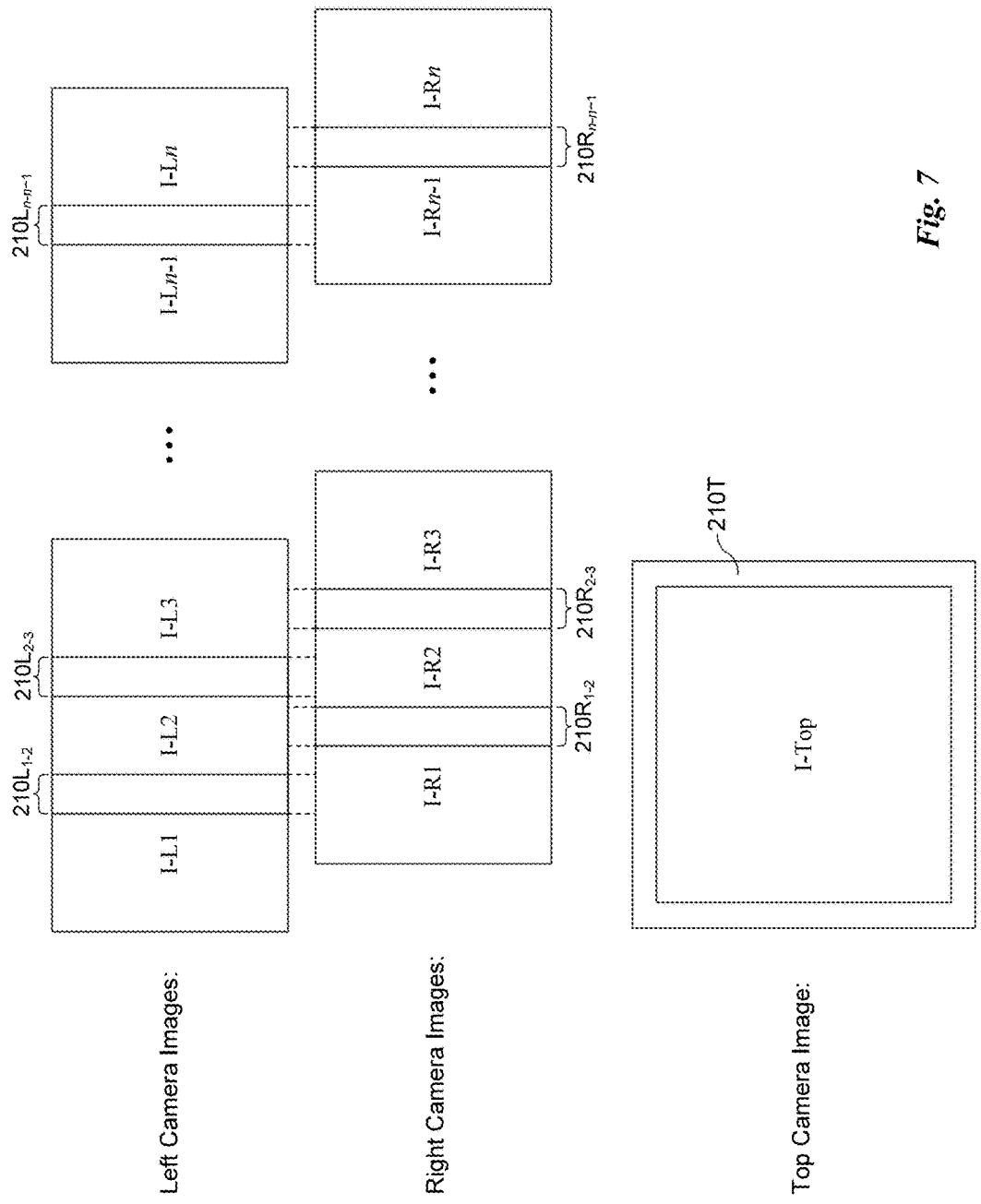
FIG. 7 illustrates an example set of overlapping images captured by cameras of a camera system.

FIG. 7 illustrates an example set of overlapping images captured by cameras 112 of a camera system 110. In particular embodiments, a camera system 110 with n camera pairs 200 and one top camera 112T may capture 2n+1 images for each frame of video. The images illustrated in FIG. 7 may be captured using 2n side cameras 112 and top camera 112T of camera system 110 similar to that illustrated in FIG. 6. In particular embodiments, n left cameras 112 and n right cameras 112 may be arranged in pairs and interleaved as described above so that left-camera images I-L1 through I-$L_n$ are overlapped and right-camera images I-R1 through I-$R_n$ are overlapped. In the example of FIG. 7, overlap areas 210L represent overlapping portions of images of neighboring left cameras, and overlap areas 210R represent overlapping portions of images of neighboring right cameras. As an example and not by way of limitation, neighboring left cameras 2 and 3 may capture images I-L2 and I-L3, respectively, with corresponding overlap area $210L_{2-3}$. In the example of FIG. 7, image I-Top represents an image captured by top camera 112T, and overlap area 210T represents an outer edge portion of image I-Top that overlaps with upper portions of the images from side cameras 112. In particular embodiments, overlap area 210T may be used to stitch top image I-Top with images from one or more side cameras 112.

In particular embodiments, left and right cameras 112 may be arranged so that each left-camera overlap area 210L is captured within a single image of a corresponding right camera 112 and each right-camera overlap area 210R is captured within a single image of a corresponding left camera 112. In the example of FIG. 7, overlap area $210L_{1-2}$ of images I-L1 and I-L2 corresponds to image I-R1 so that the overlap between left cameras L1 and L2 is captured by right camera R1. Similarly, overlap area $210R_{2-3}$ of images I-R2 and I-R3 corresponds to image I-L3 so that the overlap between cameras R2 and R3 is contained within a field of view of camera L3. In particular embodiments, and as described below, overlap area 210 between two images may be used to identify image features and create a stitched image. Additionally, an overlap area 210 as captured by another camera may also be used in a stitching process. In the example of FIG. 7, images I-R1 and I-R2 may be stitched together based at least in part on features located in overlap area $210R_{1-2}$ of the two images. Additionally, since image I-L2 captures the same overlap area, image I-L2 may also be used in a stitching process or to verify the accuracy of a stitching process applied to images I-R1 and I-R2. Although this disclosure describes and illustrates particular camera systems configured to capture particular images having particular overlap areas, this disclosure contemplates any suitable camera systems configured to capture any suitable images having any suitable overlap areas.

In particular embodiments, camera system 110 may include one or more depth sensors for obtaining depth information about objects in an image. As an example and not by way of limitation, one or more depth sensors may be located between or near cameras 112 of camera system 110. In particular embodiments, a depth sensor may be used to determine depth or distance information about objects located within a FOV of cameras 112. As an example and not by way of limitation, a depth sensor may be used to determine that a person within a FOV of camera 112 is located approximately 1.5 meters from camera system 110 while an object in the background is located approximately 4 meters away. In particular embodiments, depth information may be determined based on a triangulation technique. As an example and not by way of limitation, two or more images captured by two or more respective cameras 112 may be analyzed using triangulation to determine a distance from camera system 110 of an object in the images. In particular embodiments, camera system 110 may include a depth sensor that operates based on a structured-light scanning technique. As an example and not by way of limitation, a structured-light 3-D scanner may illuminate a scene with a projected light pattern (e.g., a sheet of light or parallel stripes of light from an infrared light source, such as a laser or a light-emitting diode), and an image of reflected or scattered light from the projected light pattern may be captured (e.g., by a camera that is part of the depth sensor) and used to determine distances of objects in the scene. In particular embodiments, camera system 110 may include a depth sensor that operates based on a time-of-flight technique where a distance to an object is determined from the time required for a pulse of light to travel to and from the object. Although this disclosure describes particular depth sensors which operate in particular manners, this disclosure contemplates any suitable depth sensors which operate in any suitable manners.

In particular embodiments, a depth sensor may provide depth information about objects located near camera system 110 (e.g., within 0.1-10 meters of camera system 110), and the depth information may be used to enhance a stitching process. As described below, a stitching process may use correspondence between overlapped images from adjacent cameras to calculate the geometry of the scene. By using a depth sensor, the relative depth or distance of items within a FOV of one or more cameras 112 may be determined rather than assuming a single overall depth. In particular embodiments, depth-sensor information may allow near portions of an image to be stitched separately from far portions. As an example and not by way of limitation, segmentation of a scene such that near and far objects are stitched separately and then combined may provide improved stitching results by taking into account the distance between camera system 110 and objects in an image. In particular embodiments, a depth sensor may provide the ability to stretch, compress, or warp portions of an image of an object located close to camera system 110, resulting in an improved rendering of the object in a stitched image. As an example and not by way of limitation, when an object is close to camera system 110 (e.g., a person passes within 0.5 meters of camera system 110), accounting for the object's distance may result in a stitched image with a reduced amount of distortion. In particular embodiments, a depth sensor may provide the ability to exclude objects from view that are within a threshold distance of camera system 110. As an example and not by way of limitation, an object that is determined to be very close to camera system 110 (e.g., a person's hand within 0.1 meters of camera system 110) may be removed during image processing so that the object does not block the view of a scene.

In particular embodiments, camera system 110 may include one or more infrared (IR) cameras, where an IR camera may refer to a camera that is sensitive to IR light (e.g., light with a wavelength between approximately 0.8 μm and 14 μm). In particular embodiments, an IR camera may be sensitive to thermal radiation or may provide an ability to image a scene in low-light situations (e.g., a darkened room or outdoors at nighttime) where a visible camera (e.g., camera 112) may have reduced sensitivity. As an example and not by way of limitation, in addition to cameras 112 (which may be optimized for visible-light sensing), camera system 110 may also include one or more IR cameras, and information or images from cameras 112 and the IR cameras may be combined to improve image capture or rendering in low-light situations. As another example and not by way of limitation, camera system 110 may include a set of IR cameras arranged to capture images over a 360° panoramic view around camera system 110. As yet another example and not by way of limitation, cameras 112 of camera system 110 may be configured to have sensitivity to visible light as well as infrared light. Although this disclosure describes and illustrates particular camera systems having particular visible or infrared cameras, this disclosure contemplates any suitable camera systems having any suitable visible or infrared cameras.

In particular embodiments, camera system 110 may include one or more auxiliary cameras configured to image a scene with a wider FOV or with a different view than cameras 112. As an example and not by way of limitation, camera system 110 may include a set of cameras 112 as described above, and camera system may also include one or more fisheye cameras or stereoscopic cameras with a FOV that is wider than FOV of cameras 112. In particular embodiments, auxiliary cameras with a wider FOV may allow captured images from cameras 112 to be successfully stitched even when viewing a large expanse of uniform color or texture (e.g., a wall). In particular embodiments, cameras 112 may be configured to have a high resolution (which may result in a relatively narrow FOV), and auxiliary cameras with a wider FOV may provide a wide-field reference that allows high-resolution images from cameras 112 to be successfully aligned and stitched together.

In particular embodiments, cameras 112 may capture a vertical field of view greater than or approximately equal to 180 degrees. As an example and not by way of limitation, camera system 110 may include cameras 112 with $FOV_V$ of approximately 185°. In particular embodiments, camera system 110 may include a set of cameras 112 with $FOV_V$ greater than or equal to 180°, and camera system 110 may not include top camera 112T, since full viewing coverage may be provided by cameras 112.

In particular embodiments, camera system 110 may include one or more fisheye cameras, where a fisheye camera may refer to a camera with a wide FOV (e.g., a FOV of greater than or equal to 180 degrees). As an example and not by way of limitation, camera system 110 may include 2, 3, or 4 fisheye cameras located near a center of camera body 118. As another example and not by way of limitation, camera system 110 may include one or more pairs of fisheye cameras (e.g., four fisheye cameras configured as two pairs of fisheye cameras). A pair of fisheye cameras may be configured to capture 3-D images and may include two fisheye cameras separated by an ICS distance corresponding to an IPD. In particular embodiments, camera system 110 with fisheye cameras may be configured to simulate 3-D stereopsis (e.g., a perception of depth or 3-D structure) and may correspond to one or more virtual cameras located inside an image sphere.

In particular embodiments, camera system 110 may include cameras 112 having a relatively high $FOV_V$ and low $FOV_H$. As an example and not by way of limitation, cameras 112 may have a lens (e.g., an astigmatic lens) that provides a wider field of view vertically than horizontally. As another example and not by way of limitation, cameras 112 may have a $FOV_V$ of approximately 180°, and a $FOV_H$ of approximately 30°. In particular embodiments, a relatively narrow horizontal FOV may provide for a captured image that has relatively low distortion in the horizontal direction. In particular embodiments, distortion in the vertical direction associated with a relatively wide $FOV_V$ may be reversed by post-capture processing based at least in part on lens-calibration information. In particular embodiments, removing distortion in the vertical direction may be a more efficient process than removing distortion along both the horizontal and vertical directions. As an example and not by way of limitation, camera 112 having a relatively low $FOV_H$ may provide an improvement in distortion removal since the image distortion is primarily along one axis (e.g., a vertical axis).

In particular embodiments, camera system 110 may include two or more sets of moderate-FOV cameras 112. As an example and not by way of limitation, cameras 112 may have a vertical and horizontal FOV of 30 to 90 degrees. In particular embodiments, camera system 110 may include two or more sets of cameras 112 with the sets arranged in rows (e.g., one set or ring of cameras 112 located above another set). Each set of cameras 112 may be configured to capture a ring of images, each ring covering a 360-degree panorama in the horizontal direction and a moderate FOV (e.g., 60 degrees) in the vertical direction. As an example and not by way of limitation, camera system 110 may include three sets of cameras 112, each camera having a $FOV_V$ of approximately 65 degrees that overlaps adjacent sets by approximately 15 degrees. Each set of cameras 112 may capture images at high resolution and with relatively low distortion, and the images from each ring may be combined to produce high-resolution, low-distortion images that cover a full panorama.

In particular embodiments, camera system 110 may include multiple cameras 112 where the cameras 112 may not being combined into stereoscopic pairs. As an example and not by way of limitation, camera system 110 may include 12 cameras arranged with overlapping horizontal FOVs so that the cameras capture a 360-degree panorama. In particular embodiments, cameras 112 may be aligned so their orientations 114 are directed away from, or radially outward from, a common center point 117 (e.g., a center of body 118 of camera system 110). In particular embodiments, cameras 112 may not capture 3-D images, and a 3-D effect may be produced after image capture during a stitching or reconstruction process. As an example and not by way of limitation, post-capture processing may be applied to images to simulate stereopsis.

In particular embodiments, a calibration procedure may be applied to cameras 112 or camera system 110. As an example and not by way of limitation, camera 112, camera pair 200, or camera system 110 may have a positioning or alignment error resulting from production tolerances, and a calibration procedure may be used to correct or compensate for these errors and allow for improved stitching of images. In particular embodiments, a calibration procedure may be used to determine that a camera 112 or camera pair 200 has a position or orientation error or offset, and a corresponding error or offset in captured images may be corrected during image capture or during a post-capture process. As an example and not by way of limitation, camera pairs 200 may be manufactured to have an ICS of 6.5 mm, and from a calibration procedure, it may be determined that a camera pair 200 has an ICS of 7.0 mm. The 0.5-mm discrepancy between the ICS of camera pair 200 and a target ICS may be corrected for during image capture or with a post-capture correction process (e.g., an offset corresponding to 0.5 mm may be applied to images captured by one of the cameras 112). As another example and not by way of limitation, camera pairs 200 may be manufactured to have a uniform 30° angular spacing between adjacent camera pairs 200, and from a calibration procedure, it may be determined that a camera pair 200 has a 29° angular spacing with respect to an adjacent camera pair 200. The 1° angular error between camera pairs 200 may be corrected for while images are captured or during a post-capture correction process (e.g., an offset corresponding to a 1° rotation may be applied to captured images from one or more cameras 112).

In particular embodiments, a calibration procedure may be applied to camera system 110 after camera system 110 is manufactured, prior to camera system 110 being used, at periodic intervals (e.g., every month months), or at any suitable time or interval of time. As an example and not by way of limitation, camera system 110 may apply a calibration procedure prior to capturing a scene, which may ensure that positions and orientations of cameras 112 are known during image capture to ensure a successful stitching process. As another example and not by way of limitation, a calibration procedure may be applied to camera system 110 to correct for a misalignment of cameras 112 that may result from a temperature change, aging of camera system 110, or a mechanical shock (e.g., if camera system 110 is dropped during transport). In particular embodiments, once a calibration procedure is performed, data regarding calibration of cameras 112 or camera pairs 200 may be stored in a non-volatile memory of camera system 110. Although this disclosure describes particular calibration procedures performed in particular manners and at particular times, this disclosure contemplates any suitable calibration procedures performed in any suitable manners and at any suitable times.

In particular embodiments, cameras 112 of camera system 110 may be calibrated using projected light. In particular embodiments, projected-light calibration may be implemented using a wide angle projector, a mask in front of a lamp, or a laser scanner or reflector that projects an optical calibration pattern onto nearby surfaces. As an example and not by way of limitation, a laser beam may be reflected by a diffraction grating or a motorized mirror to produce a calibration pattern that is projected onto nearby surfaces. A projected laser pattern may be imaged by cameras 112 to determine camera calibration parameters. In particular embodiments, an optical assembly (e.g., a laser, mirror, or grating) for generating and projecting a calibration pattern may be mechanized to retract into or underneath camera-system body 118 when not in use. In particular embodiments, an optical-calibration assembly may be configured to rotate to project a calibration pattern in different directions so that different cameras 112 of camera system 110 may be calibrated. In particular embodiments, camera system 110 may be placed inside a controlled room or a spherical surface to provide an improved accuracy of calibration. Although this disclosure describes particular projected-light calibration systems, this disclosure contemplates any suitable project-light calibration systems.

In particular embodiments, cameras 112 of camera system 110 may be calibrated using a physical or mechanical process or structure. As an example and not by way of limitation, a mechanical calibration structure, such as for example a fan- or umbrella-like device, may be stored between cameras 112 or underneath or inside camera-system body 118. During calibration, these physical calibrators may be mechanically deployed at a known location relative to camera system 100. The physical calibrators may be imaged by cameras 112, and the captured images may be compared to a known geometry to determine calibration parameters. In particular embodiments, a mechanical calibration device may be a physical device separate from camera system 110. As an example and not by way of limitation, an external calibration device may have internal spokes that extend inward from a spherical outer body to allow camera system 110 to be held in a precise position that is known relative to the calibration device. As another example and not by way of limitation, an external calibration device may include optical sensors that allow camera system 110 to be precisely located relative to the calibration device. In particular embodiments, an interior surface of a calibration device may have calibration markings that are imaged by cameras 112, and calibration parameters for cameras 112 or camera pairs 200 may be determined based on captured images of the calibration markings. In particular embodiments, camera system 110 may include an optical assembly that projects a calibration pattern onto an interior surface of a calibration device. Although this disclosure describes particular physical calibration systems, this disclosure contemplates any suitable physical calibration systems.

In particular embodiments, camera system 110 may include one or more processors integrated as part of camera system 110, or camera system 110 may be coupled to one or more processors located external to camera system 110. As an example and not by way of limitation, camera system 110 may include one or more front-end processors 120 located inside body 118 of camera system 110. As another example and not by way of limitation, cameras 112 may be connected over USB to a set of one or more front-end processor machines 120. In particular embodiments, front-end processors 120 may carry out initial control of cameras 112, camera distortion correction, cropping of images, encoding of videos, compression of image data, or transmission of videos. As an example and not by way of limitation, camera system 110 may include independent front-end processors 120 connected to cameras 112 that carry out initial image adjustments, camera parameter control, or initial encoding of camera data to reduce the video payload for transport. In particular embodiments, the number of front-end processors associated with camera system 110 may depend at least in part on a number of cameras 112 in camera system 110 as well as a size or frame rate of video captured by cameras 112. As an example and not by way of limitation, each camera 112 may be connected to one or more dedicated processors 120. Although this disclosure describes and illustrates particular camera systems coupled to particular processors in particular manners, this disclosure contemplates any suitable camera systems coupled to any suitable processors in any suitable manners.

In particular embodiments, camera parameters (e.g., brightness, contrast, gain, exposure, white balance, saturation, focus, or aperture setting) may be calibrated, controlled, or mapped by one or more processors 120. In particular embodiments, a white balance setting for each camera 112 may be set or controlled independent of other cameras, since each camera 112 may see a scene differently. As an example and not by way of limitation, a camera 112 positioned next to a window may see a bluish scene while an adjacent camera 112 may see reddish indoor lighting, and the two cameras may have different white balance settings. In particular embodiments, one or more camera parameters may be controlled globally to ensure that settings for adjacent cameras (e.g., adjacent left cameras 112 or adjacent right cameras 112) do not deviate too widely. As an example and not by way of limitation, settings for exposure or gain for a camera 112 may be based at least in part on settings for one or more adjacent cameras 112. As another example and not by way of limitation, if exposure or gain settings are adjusted, processor 120 may ensure that settings for adjacent cameras for the same eye (e.g., adjacent left cameras 112 or adjacent right cameras 112) do not deviate too widely to minimize image banding or unacceptable stitching performance. In particular embodiments, a focus setting of cameras 112 may be maintained at infinity to minimize stitching errors that may result from a variation of camera focus. In particular embodiments, cameras 112 may be set to have a reduced aperture to provide a larger depth of field, which may result in a reduction in stitching errors. Although this disclosure describes particular camera parameters controlled in particular manners, this disclosure contemplates any suitable camera parameters controlled in any suitable manners.

In particular embodiments, an encoding process may involve one front-end processor 120 per camera 110, or a single processor 120 (with a single core or multiple processor cores) may be shared by multiple cameras 110. A front-end processor 120 may use accelerators, application-specific integrated-circuits (ASICs), or subprocessors to handle parts of a task of capturing, modifying, compressing, storing, or transmitting video data. Each processor 120 may run a general-purpose operating system, or may be an ASIC itself operating in complete- or near-lockstep with a central control processor. In particular embodiments, a central-control processor may act as a distributor or central control point for talking to front-end image-capture processors 120. In particular embodiments, central processors may be implemented as parts of a single large ASIC, with duplicated resources to connect to and control each camera 112. In such a case, multiple threads or copies of the same code or hardware-based algorithm may run to parallelize the process of capture. In particular embodiments, front-end processors 120 may use a processor-local storage system or may immediately stream data to one or more shared storage resources. In particular embodiments, decentralized storage may be utilized, and processor-local storage may be used as a buffer to the stitching system to achieve system load distribution.

In particular embodiments, front-end processors 120 may use a bus or network for transmission of data. The data transmission may use any suitable data-transmission format. In particular embodiments, transmission methods that guarantee receipt or otherwise notify the recipient of packet loss may be utilized. In particular embodiments, a sending component may retransmit damaged packets or may allow a receiver to insert a flag into a stored data stream indicating that packet corruption took place. In particular embodiments, a stitching system may then compensate for such damaged or lost packets as needed.

In particular embodiments, cameras 112 may have some lens distortion as well as some deviation relative to a target position or orientation 114. In particular embodiments, corrections for these effects may be static, and they may be pre-calibrated and corrected using lookup tables in the front end. As an example and not by way of limitation, panorama leveling, vignette correction, lens distortion correcting, white balance correction, exposure correction and matching, or viewpoint adjustment may be applied directly to an image. In this manner, an image may be operated on before any compression-induced color or feature shifts take place, which may reduce the occurrence of visible correction artifacts. Additionally, color correction may be applied to enhance edge sharpness, overall exposure, or white balance. In particular embodiments, noise reduction may be applied to a scene in order to reduce the compressed size of an image. In particular embodiments, front-end processors 120 may downsample an image after one or more image correction or enhancement steps are applied. As an example and not by way of limitation, rather than using a processor-intensive subsampling process, an output image may be downsampled. In particular embodiments, images may be captured at a higher resolution than that used for subsequent stitching, and this high-resolution image capture may help mitigate aliasing or artifacts that may be associated with correction or enhancement steps.

In particular embodiments, one or more stitching servers 130 may receive images encoded by one or more front-end processors 120 of camera system 110. As described above, the images may correspond to 360° 3-D video captured by camera system 110 in real-time. In the example of FIG. 1, images are sent from front-end processors 120 to stitching servers 130 over an Ethernet network using TCP. In particular embodiments, images may be received from front-end processors 120 in any suitable order or stored in any suitable order. As an example and not by way of limitation, prior to being transferred to one or more stitching servers 130, images (e.g., images I-L1 through I-Ln illustrated in FIG. 7) may be arranged in an order corresponding to their spatial order. In particular embodiments, a stitching system may include a single stitching server 130 (or two or more stitching servers 130) when real-time performance is not required, such as for example when images are being processed for transmission or viewing at a later time. In particular embodiments, a stitching system may include tens to hundreds of stitching servers 130 when real-time performance is needed (e.g., when stitching high-resolution, high-frame-rate video for transmission or viewing in real time). Although this disclosure describes and illustrates particular stitching systems that include particular numbers of stitching servers, this disclosure contemplates any suitable stitching systems that include any suitable number of stitching servers.

In particular embodiments, one or more stitching servers 130 may receive a set of discrete images from one or more front-end processors 120, and stitching servers 130 may "stitch" the discrete images together and produce a single 3-D frame for transmission or display. As an example and not by way of limitation, stitching server 130 may receive a set of left images from left cameras 112 of camera system 110, and stitching server 130 may stitch or combine the images to produce a left frame of a 3-D image in real-time. Similarly, stitching server 130 may stitch a set of right images from right cameras 112 to produce, in real-time, a right frame of a 3-D image, and the left and right frames together may represent a single, real-time 3-D frame. In particular embodiments, a stitching process may create a substantially seamless image by warping, distorting, or aligning multiple discrete images to ensure that corresponding points of overlapped images match. As an example and not by way of limitation, a stitching process may use correspondence between discrete images from adjacent cameras to calculate the geometry of a scene captured by the stitched image. As another example and not by way of limitation, a stitching process may warp, distort, or align the discrete images such that the corresponding points of a set of overlapped images are matched up and extra portions of the overlapped images are discarded. A stitching process may then blend a collection of aligned images into a merged seamless image. In particular embodiments, images corresponding to a person's left and right eyes may be manipulated to ensure that the two eyes see corresponding parts of a scene in order to reduce eye strain.

In particular embodiments, one or more stitching servers 130 may perform a stitching process on video captured by cameras 112. As an example and not by way of limitation, a single stitching server 130 (or multiple stitching servers 130 operating in parallel) may perform stitching on a series of images captured by cameras 112. In a multi-camera system, such as for example, camera system 110 illustrated in the example of FIG. 4, time-code alignment of captured images may be performed during a stitching process. In particular embodiments, a series of images of a video may be captured or stitched in lockstep to maintain time coherence between images. As an example and not by way of limitation, front-end processors 120 may store a time-code or timestamp (e.g., an absolute local time, or a value of a relative time counter) on each image captured by each camera 112. For example, images IL-1 through IL-12 captured by cameras L1 through L12, respectively, may each include a timestamp corresponding to a time when the image was captured. In particular embodiments, an image captured by camera 112 may include a timestamp corresponding to a time when it was captured, and, for each frame of a three-dimensional video, stitching server 130 may stitch together images that were captured within a particular range of time. For example, stitching server 130 may require that images to be stitched together have timestamps that agree to within 10 ms, 20 ms, 30 ms, or within any suitable interval of time. As another example, stitching server 130 may require that images to be stitched together have timestamps that are the same within a particular amount of frame periods, where a frame period is the reciprocal of the frame rate. For example, a video may have a frame rate of 25 frames per second (FPS), corresponding to a frame period of 40 ms, and stitching server 130 may require that images to be stitched together have timestamps that are the same within one frame period (e.g., within 40 ms), within one-half frame period (e.g., within 20 ms), or within any suitable portion of a frame period. In particular embodiments, if a gap or error in timestamps of a set of images is detected or if an image frame is flagged as damaged, then stitching server 130 may drop the entire set of images, and a previous stitched image may be reused. As an example and not by way of limitation, if one or more images of a set of images have timestamps that are more than one frame period from an average or target timestamp, then the set of images may be discarded, and a previous stitched image may be reused in place of the discarded images.

In particular embodiments, camera system 110 may accommodate independent shutters between cameras 112. As an example and not by way of limitation, a time required to send an instruction to capture an image (e.g., an instruction sent from a controller to front-end processor 120 or camera 112) may be measured and stored. As another example and not by way of limitation, each front-end processor may receive an instruction to begin image capture at a future time that is adjusted based on a delay to the particular front-end processor, thereby ensuring that each image stream begins at the same time. In particular embodiments, stitching servers 130 may determine a time of an initial frame and subsequent frame time differentials may be calculated from this initial point in time, where the time of the initial frame is considered to be "time zero."

In particular embodiments, stitching server 130 may determine a vertical alignment and a horizontal alignment of discrete images (e.g., images I-L1 through I-Ln) being stitched together. In particular embodiments, images from multiple cameras may be compared, such that all left images are compared to other left images (e.g., I-L1 through I-Ln), and all right images are compared to other right images (e.g., I-R1 through I-Rn). In the example of FIG. 5, image I-6 may be compared to adjacent images I-5 and I-7. Additionally, left images may be compared to right images (e.g., I-L1 and I-R1) to make sure they are correctly aligned relative to each other. As an example and not by way of limitation, images I-L1 through I-L12 may correspond to images captured by left cameras L1 through L12, respectively, of camera system 110 illustrated in the example of FIG. 4. As described above, the FOV of the cameras corresponding to each eye (e.g., L6) has an overlap with its neighbors (e.g., L5 and L7), such that spatially aligning the images results in an overlap area 210 between adjacent images (e.g., I-6 and I-7). As described below, overlap area 210 of adjacent images may be used to identify image features for creating a stitched image 200. In particular embodiments, assumptions may be made when performing some of the stitch parameter calculations due to the known geometry of the camera system.

Figure 8:
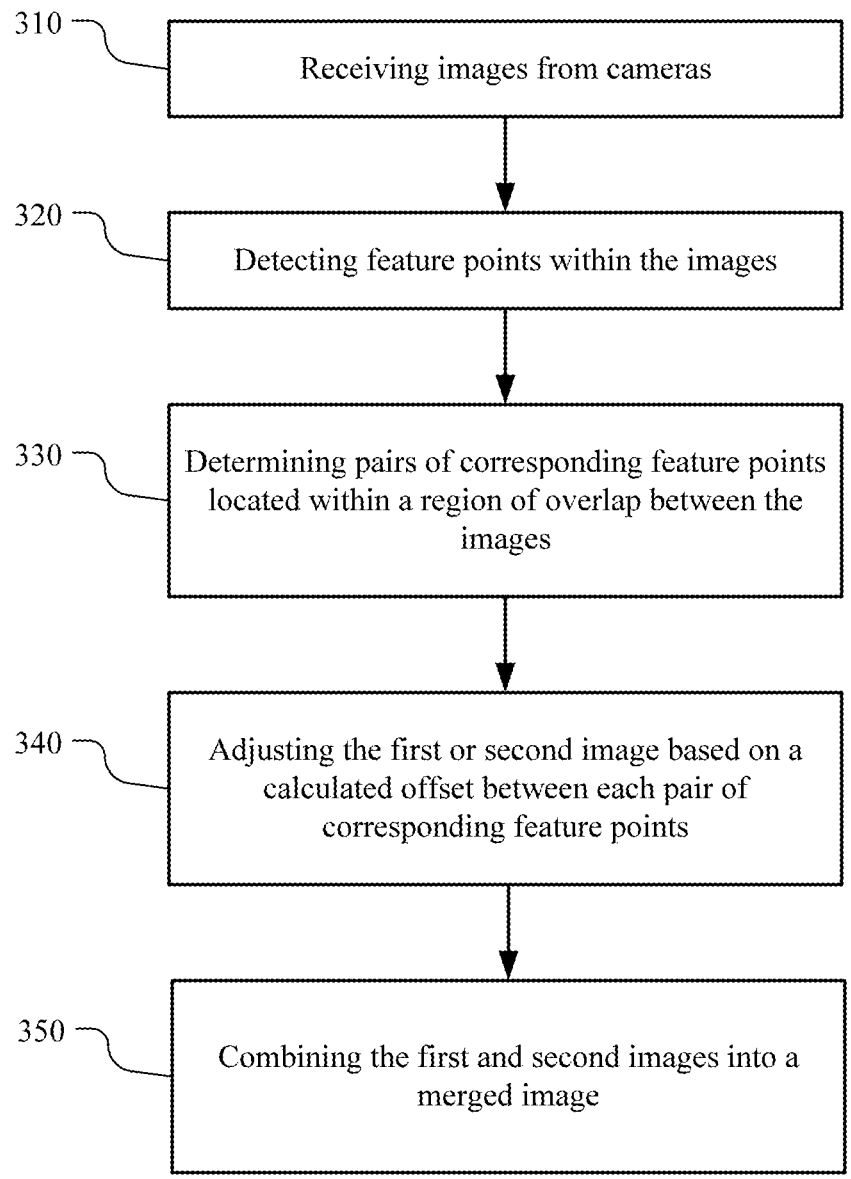
FIG. 8 illustrates an example method for stitching discrete images.

FIG. 8 illustrates an example method for stitching discrete images. The method 300 may begin at step 310, where a number of images are received from a number of cameras 112. In particular embodiments, the cameras may include a first camera 112 having a first orientation 114 and a second camera 112 having a second orientation 114. In particular embodiments, the images may include a first image from the first camera 112 and a second image from the second camera 112. At step 320, a number of feature points are detected within the first and second images. At step 330, one or more pairs of corresponding feature points located within an area of overlap between the first and second images are determined. In particular embodiments, the pairs of corresponding feature points include a respective one of the feature points from each of the first and second images. At step 340, the first or second image is spatially adjusted based on a calculated offset between each pair of corresponding feature points. At step 350, the first and second images are combined into a merged or stitched image based on the spatial adjustment. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for stitching discrete images including the particular steps of the method of FIG. 8, this disclosure contemplates any suitable method for stitching discrete images including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
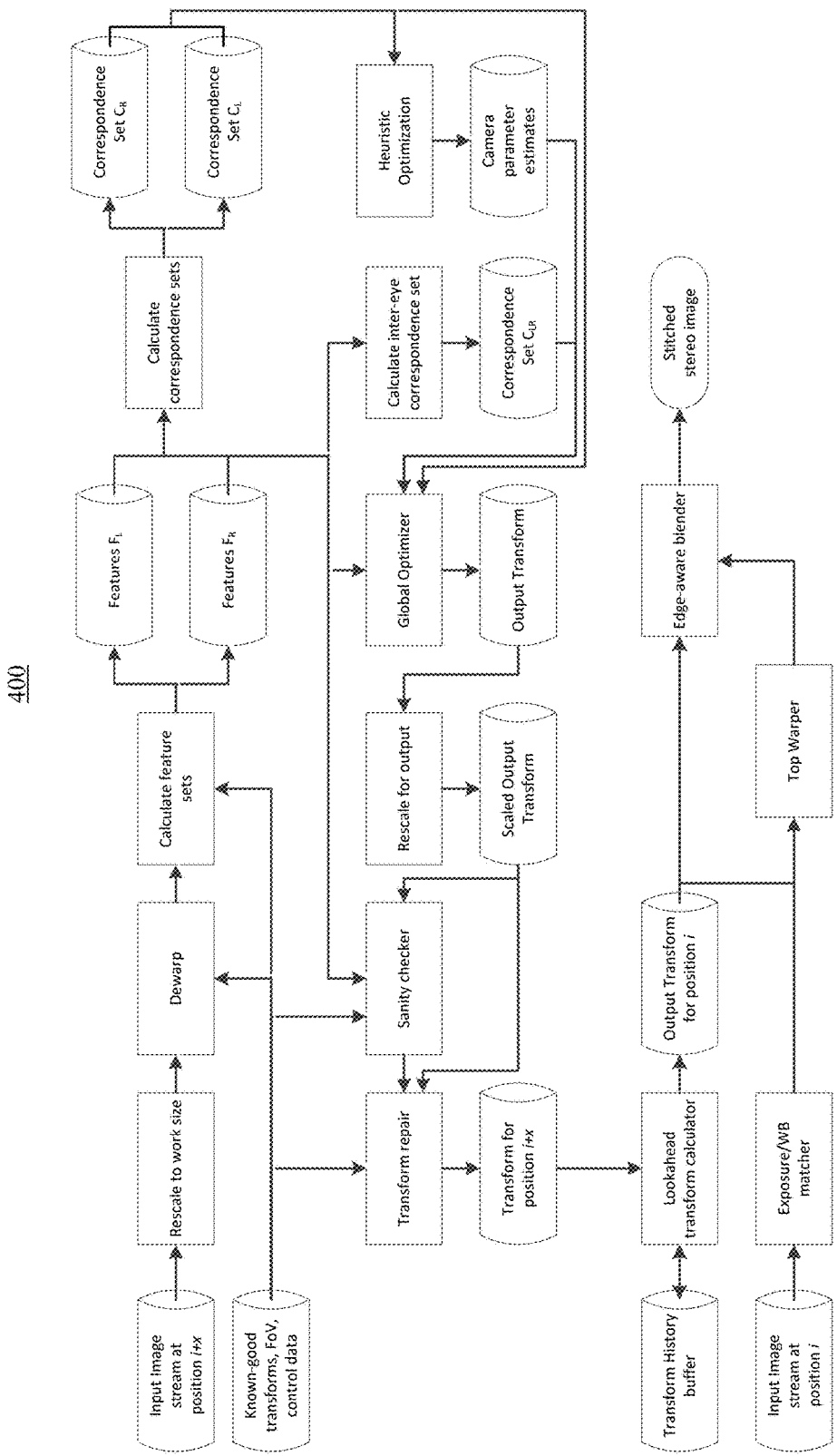
FIGS. 9 and 10 illustrate other example methods for stitching discrete images.
Figure 10:
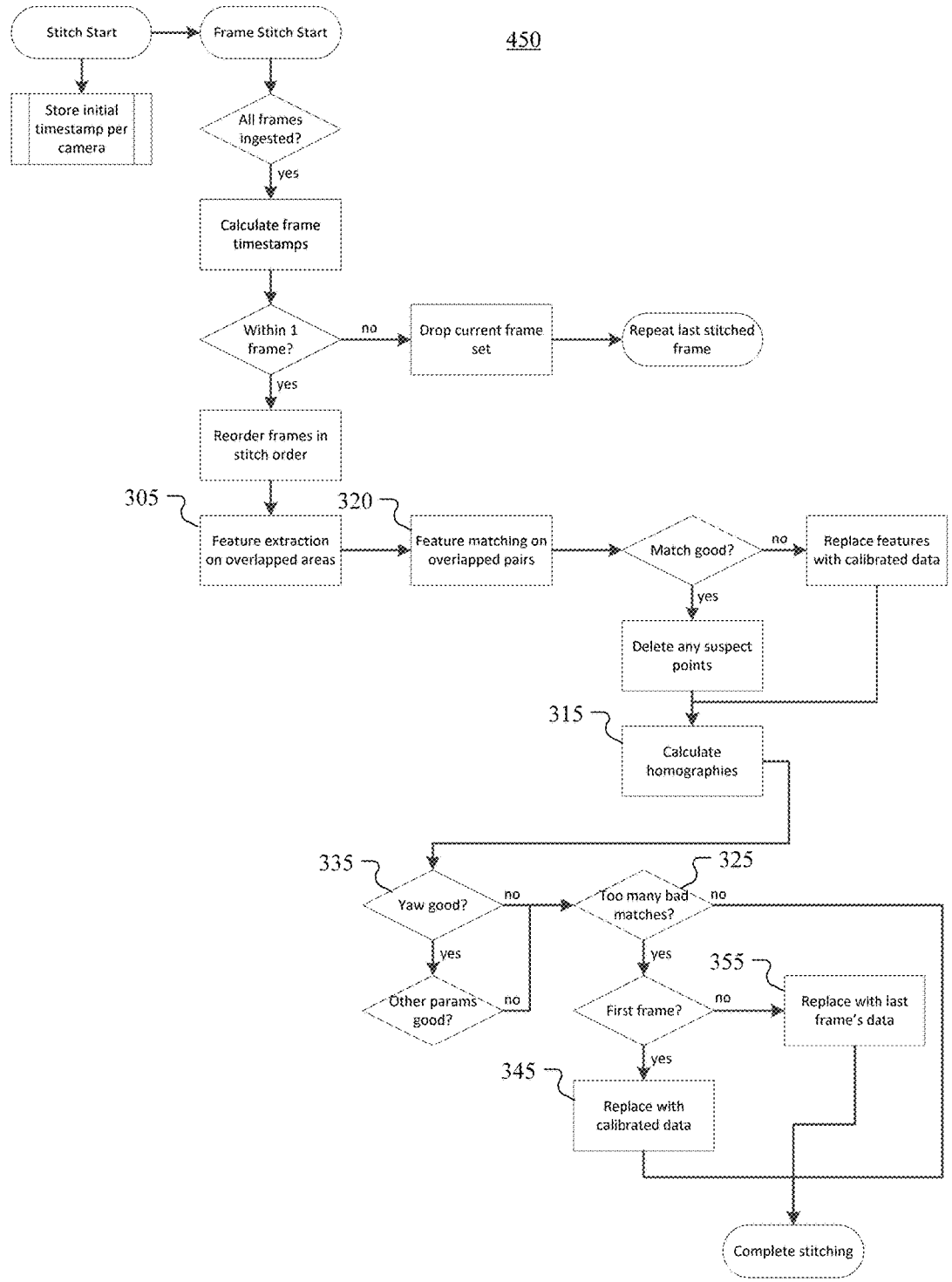

FIGS. 9 and 10 illustrate other example methods 400 and 450, respectively, for stitching discrete images. In particular embodiments, a method for stitching images, such as for example the methods 400 and 450, illustrated in FIG. 9 or FIG. 10, respectively, may provide a process for stitching images that preserves 3-D perception and is performed automatically (e.g., the process requires little or no human intervention). Although this disclosure describes and illustrates a particular flow performing particular steps in a particular order to stitch images, this disclosure contemplates any suitable flow that performs any suitable steps in a suitable order.

In particular embodiments, images received from front-end processors 120 of camera system 110 may be resized prior to stitching. Decreasing the resolution of the images while determining pairs of corresponding feature points, described below, may speed up the stitching process. Additionally, reduction of resolution may improve resilience to noise in low-light conditions, as well as increase overall sensitivity to small-scale textures for feature detection, described below. As an example and not by way of limitation, 2-8 megapixel (MP) images may be resized to a lower resolution that is easier to manage for a real-time 3-D stitching process. As another example and not by way of limitation, 8 MP images captured by cameras 112 may be resized to 2 MP, and the resized 2-MP images may be used as inputs to a stitching process. In particular embodiments, a resized image may be constrained to have a minimum size (e.g., 1 MP, 2 MP, or any suitable minimum size). As an example and not by way of limitation, 4 MP and 2 MP images may both be resized to 1 MP. In particular embodiments, resizing the received images may reduce noise in the images that may affect feature detection using local contrast enhancement. As an example and not by way of limitation, a scaling kernel, such as for example a Lanczos kernel, may be used to minimize kernel artifacts that may cause errors in feature detection. In particular embodiments, stitching parameters may be determined from images that are resized to a lower resolution than original images. As an example and not by way of limitation, after using a set of resized images (e.g., 2 MP images) to determine stitching parameters, a set of original, high-resolution images (e.g., 8 MP images) captured by cameras 112 may be stitched together using the determined stitching parameters.

In particular embodiments, images received from camera system 110 may be dewarped to stitch the images onto a rectangular plane. As an example and not by way of limitation, the received images may be super-sampled to reduce the amount of artifacts that may hinder feature detection, described below. In particular embodiments, a dewarping procedure may be combined with a scaling procedure, which may reduce the need for super-sampling. As an example and not by way of limitation, received images may undergo a combined dewarping and scaling procedure, and the combination of dewarping and scaling may reduce artifacts in the images. Alternately, the dewarping of received images may be used as a global transform as a function of position, and access to pixel data of the received images may go through a transform and super-sampling to produce suitable values. In particular embodiments, a dewarp transformation of an image may be approximated by equation (1):

$$\text{Image dewarp:} \begin{bmatrix} x \\ y \end{bmatrix} \begin{bmatrix} \text{scale}' \\ \text{translate}' \\ a \ldots e \end{bmatrix} \rightarrow \begin{bmatrix} x' \\ y' \end{bmatrix}, \quad (1)$$

where x is a position along a latitude of a projected 3-D space, y is a position along a longitude of the projected 3-D space, a . . . e are camera dewarp parameters, scale' is a scaling factor of the image, translate' is a horizontal or vertical spatial translation parameter, and x' and y' are the latitude and longitude positions, respectively, after the dewarp transformation. In particular embodiments, a dewarping process may be performed using an estimated scaling factor based on the characteristics of one or more of the cameras of the camera system. In particular embodiments, a dewarp process may be performed on one or more sets of initial images, and a simplified version of the dewarp process may be applied to later images using an abstraction of the dewarp process. As an example and not by way of limitation, access to points and images may be abstracted to provide for a faster dewarping process.

At step 305, features in received images that form a scene may be detected, as illustrated in the example of FIG. 10. In particular embodiments, feature detection and matching may be performed on grayscale versions of image I-6, and a particular contrast may be applied to images I-6 in a separate operation or through a look-up table (LUT). In particular embodiments, feature detection may be performed globally on image I-6 using local contrast enhancement. Local contrast enhancement increases "local" contrast, while at the same time preventing an increase in "global" contrast, thereby protecting large-scale shadow/highlight detail. As an example and not by way of limitation, local contrast gradients may be indicative of an edge, corner, or "blob" that corresponds to a feature. Features of image I-6 may be detected using a feature detection algorithm such as for example scale-invariant feature transform (SIFT), speeded up robust features (SURF), or oriented FAST and Rotated BRIEF (ORB), where FAST stands for "features from accelerated segment test" and BRIEF stands for "binary robust independent elementary features." In particular embodiments, a feature detection process may detect one or more feature points 214. As an example and not by way of limitation, feature points 214 may be detected by taking a difference of multiple Gaussian smoothing operations. Furthermore, the position (e.g., within the grid or within search region 212) of feature points 214 and the contrast values of each feature point 214 for each search region 212 may be stored.

Figure 11:
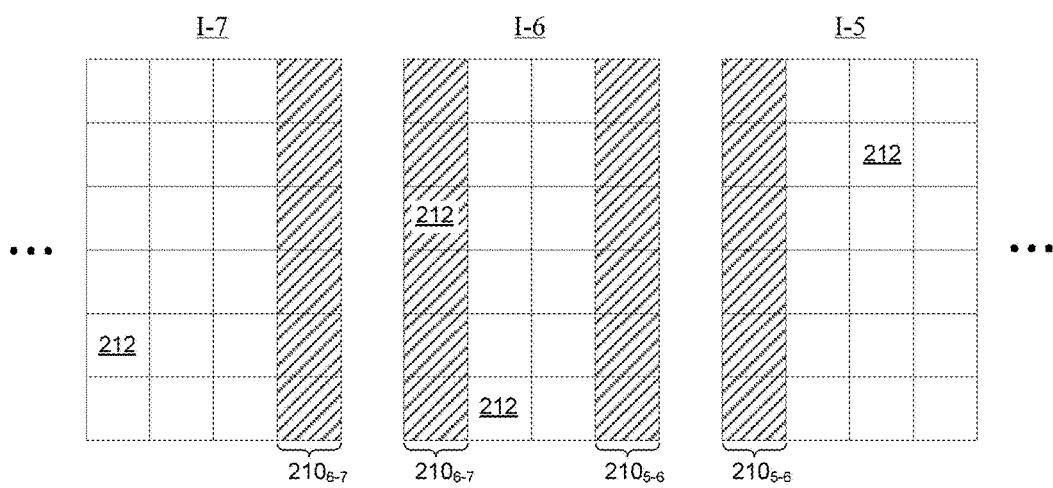
FIG. 11 illustrates example partitioning of an image.

FIG. 11 illustrates example partitioning of an image. In particular embodiments, received images (e.g., images I-7 through I-5) may be partitioned into a number of search regions 212. As example and not by way of limitation, images I-7 through I-5 may correspond to images corresponding to a particular eye (e.g., all left or right images), as illustrated in the example of FIG. 7. In particular embodiments, the received images (e.g., I-7 through I-5) may be partitioned into 24 search regions arranged in a 4×6 rectangular grid, as illustrated in the example of FIG. 11. As described above, images (e.g., I-7 through I-5) from adjacent cameras corresponding to a particular eye (e.g., all left cameras) have overlap areas $210_{6-7}$ and $210_{5-6}$ that are proportional to angular overlap 116 between the FOV of the respective cameras. In particular embodiments, overlap areas $210_{6-7}$ and $210_{5-6}$ of the images (e.g., I-7 through I-5) may correspond to the right and left edges of the received images (e.g., I-7 through I-5). In particular embodiments, feature-point detection or matching may be limited to overlap areas of adjacent images. In the example of FIG. 11, for adjacent images I-6 and I-7, feature-point detection may only be applied in overlap area $210_{6-7}$. Regions outside of overlap area 210 may not be considered, which may ensure that irrelevant or unnecessary points located outside an overlap area do not affect a stitching process.

Figure 12:
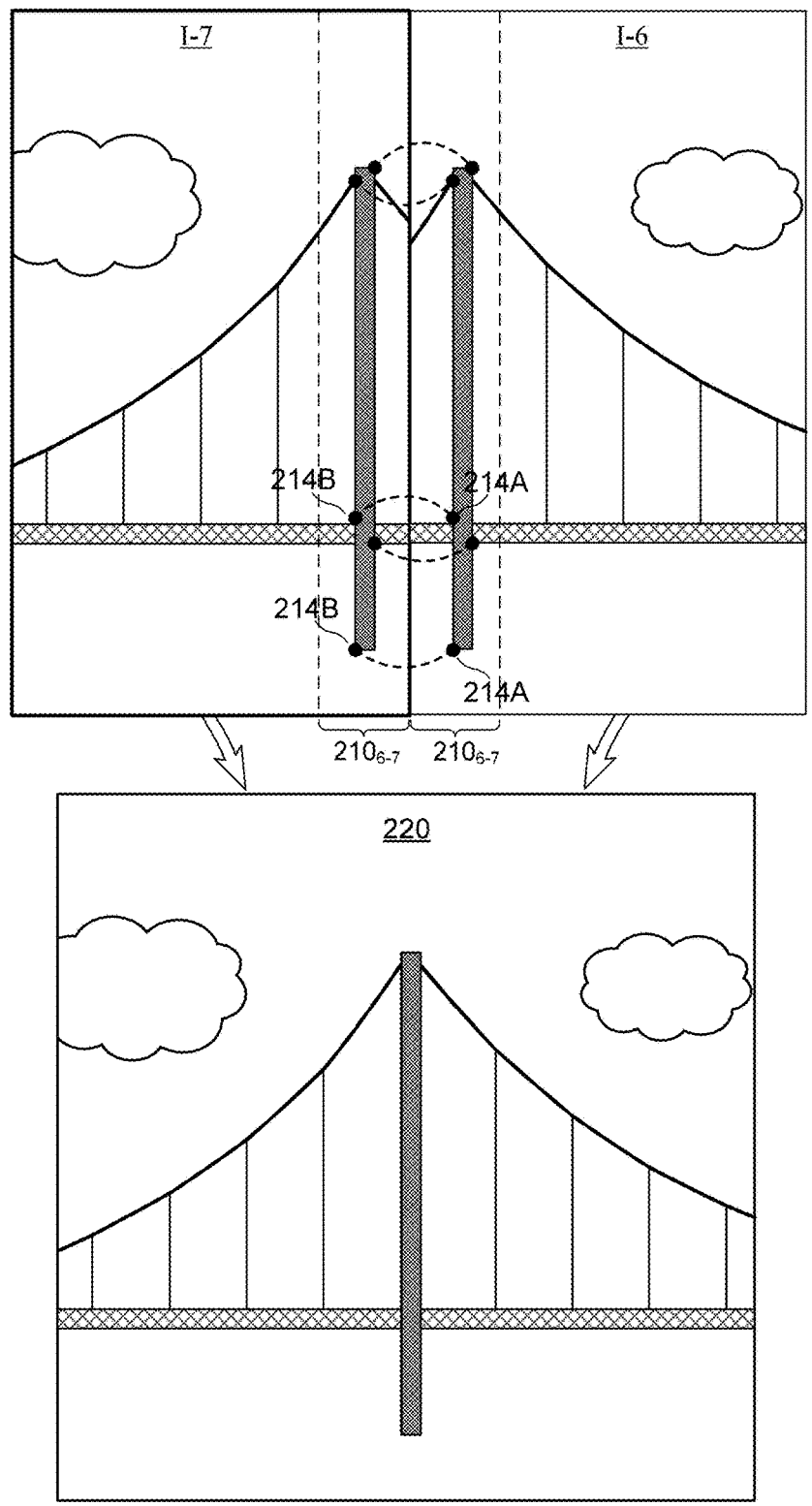
FIG. 12 illustrates example feature point matching of images.

FIG. 12 illustrates example feature point matching of images. At step 310, feature point matching may be performed locally on the search regions of overlap areas $210_{6-7}$ to minimize the effect of irrelevant points on stitched image 220, as illustrated in the example of FIG. 10. As an example and not by way of limitation, feature point calculations may be performed on the detected feature points 214A-B to match a feature point 214A of image I-6 to a corresponding feature point 214B of image I-7. The pairs of corresponding feature points 214A-B may be detected by locally comparing the area around each detected feature point 214A-B in search regions of overlap areas $210_{6-7}$. In particular embodiments, the respective contrast settings for that feature point 214A-B in the respective images I-7 and I-6 may be applied as part of the matching of feature points 214A-B. As an example and not by way of limitation, the contrast difference between images I-7 and I-6 may be compensated as an offset of a contrast curve. In particular embodiments, this offset of the contrast curve may be calculated with additional bits (e.g., using signed 16 bits for 8 bit values) to take this into account. A difference in the offset may cause the best match to have a uniform difference that is known ahead of time.

In particular embodiments, a size of an area used to match feature points 214 may be set according to a size of images. In particular embodiments, a geometry of camera system 110 may be known, and based on the known camera-system geometry, an approximate number of pixels of the search regions and overlap areas $210_{6-7}$ of adjacent images I-6 and I-7 may be known a priori. As an example and not by way of limitation, since the location and orientation of cameras 112 of camera system 110 are fixed relative to one another, the overlap between adjacent left cameras (e.g., cameras L1 and L2) or adjacent right cameras (e.g., cameras R11 and R12) may be known, and similarly the overlap between adjacent left or right cameras (e.g., cameras L1 and R1) may also be known. In particular embodiments, determining corresponding pairs of feature points may be performed using a nearest-neighbor search algorithm. As an example and not by way of limitation, a nearest-neighbor search algorithm may identify patterns of feature points 214B within each search region of overlap area $210_{6-7}$ of image I-7 that match corresponding patterns of feature points 214A within each search region of overlap area $210_{6-7}$ of image I-6. In particular embodiments, a nearest-neighbor algorithm may use a search radius around each feature point 214A-B to determine the pairs of corresponding feature points 214A-B. As an example and not by way of limitation, a search area may have a radius of 32 pixels, 64 pixels, or any suitable radius, or a search area may have a size of 32 pixels×32 pixels, 64 pixels×64 pixels, or any suitable size. In particular embodiments, a secondary refinement step may be used to realign the pairs of corresponding feature points before a final homography calculation.

In particular embodiments, a feature-matching procedure may use estimated parameters, and some searching may be applied within an overlap area or a search region to optimize position. In particular embodiments, a search radius may be increased as a feature search moves from a center to an edge of an image (e.g., image I-6 or I-7). As an example and not by way of limitation, a search radius may be increased due to increased errors associated with a difference between actual and estimated parameters (e.g., actual FOV versus estimated FOV). In particular embodiments, additional feature points may be added to regions 212 with fewer than a pre-determined number (e.g., 3 pairs) of pairs of corresponding feature points 214A-B. As an example and not by way of limitation, if a feature search reveals less than 3 feature points in a particular region 212, backup feature points from a backup feature-point set may be added to a set of features. In particular embodiments, backup, substitute, or additional feature points may be based on characteristics of camera system 110, characteristics of each camera 112, calibration data, or any combination thereof, and additional feature points may be indicated or marked in a data structure.

In particular embodiments, camera parameters or images (e.g., I-6 and I-7) may be heuristically optimized to reduce the number of free variables in a final optimization to generate stitched image 220. As an example and not by way of limitation, heuristic optimization may be used to optimize or refine one or more camera-related parameters (e.g., FOV, orientation 114, or location of vertical or horizontal camera center). A feature-matching procedure may use estimated camera parameters based at least in part on known camera geometry (e.g., position or orientation of cameras 112 of camera system 110) or on a calibration process. For example, knowing a nominal position and orientation of cameras 112 may allow estimates to be made of camera FOV, angular overlap 116, camera orientation 114, or camera position (e.g., location of vertical and horizontal camera center). In particular embodiments, estimated camera parameters may be optimized iteratively or by using a group numeric approach for multiple non-linear values. In particular embodiments, for each image (e.g., I-6 and I-7), the position of the pairs of corresponding feature points 214A-B may be compared to each other and adjustments made to corresponding camera parameters based on an offset in the position of the respective feature points 214A-B. As an example and not by way of limitation, a FOV parameter or an orientation parameter may be adjusted in response to detecting a radial offset on average between the feature points 214A-B. As another example and not by way of limitation, a vertical or horizontal camera-position parameter may be adjusted (e.g., translated) in response to detecting a vertical or horizontal offset, respectively, on average between the feature points 214A-B.

At step 315, an estimation of camera displacement (e.g., camera rotation or translation) between images I-6 and I-7 may be determined using a homography matrix based on the matched pairs of corresponding feature points, as illustrated in the example of FIG. 10. In particular embodiments, adjustments to images I-6 and I-7 may be made based on the estimated camera displacement determined by the homography matrix. The stitch parameters that are used to adjust and align images I-6 and I-7 to form the merged stitched image 220 may be calculated using the homography matrix. As an example and not by way of limitation, the homography matrix may be initially calculated for images I-6 and I-7, and adjustment may be made to subsequent images based on the calculated homography matrix.

Adjustments may be made to images I-7 and I-6 to properly combine the images I-7 and I-6 into stitched image 220. In particular embodiments, the adjustments may be made to meet one or more optimization criteria. As an example and not by way of limitation, optimization criteria may be that the vertical or horizontal offset of the pairs of corresponding feature points 214A-B should be minimized. As another example, an optimization criteria may be that the horizontal offset of the pairs of corresponding feature points 214A-B should be less than a maximum horizontal offset before a viewer would see double. As yet another example, an optimization criteria may be that the vertical offset of the pairs of corresponding feature points 214A-B should be less than a maximum vertical offset.

In particular embodiments, the adjustments to images I-6 and I-7 may be performed assuming one or more initial conditions. As an example and not by way of limitation, an initial condition may assume that a first camera pair (e.g., camera pair L1-R1 in FIG. 4) has an orientation 114 that defines a main ray (or yaw) of camera system 110. As another example, an initial condition may assume that the orientation 114 for the remaining camera pairs (relative to the first camera pair) about the y-axis is $Y_i=(i-1)\times 360°/n$, where the y-axis is orthogonal to a plane of camera system, i=2 . . . n, and n is the number of camera pairs of the camera system. As an example and not by way of limitation, for camera system 110 with n=8 camera pairs, camera pairs 200 are oriented at 45 degrees with respect to one another. As yet another example, an initial condition may assume that cameras 112 of camera system 110 are level along the x- and z-axes (e.g., zero roll and pitch, respectively).

In particular embodiments, adjustments to images I-6 and I-7 may be determined by minimizing one or more optimization costs. As an example and not by way of limitation, a distance between pairs of corresponding feature points 214A-B may represent a base total optimization cost. As another example, rotational adjustments along an axis may have a cost that is proportional to a weighted rotational displacement (e.g., $k_x(X'-X_0)^2$ about each axis, yaw, pitch, and roll, where $k_x$ is a weighting coefficient). Furthermore, each axis may have a particular weighting coefficient, such as for example $k_Y$ for a yaw axis, $k_P$ for a pitch axis, and $k_R$ for a roll axis. In particular embodiments, FOV or translational adjustment of images I-6 and I-7 may have linear cost of $k_x|X'-X_0|$ per axis. Each axis may have a particular weighting coefficient, such as for example $k_{FOV}$ for a FOV adjustment, $k_{CX}$ for an x-axis translation, and $k_{CY}$ for a y-axis translation. In particular embodiments, the optimization costs may be functionalized, such that the optimization cost functions may be modified to deal with corner cases.

In particular embodiments, images (e.g., I-6 and I-7) may be stitched together by performing a global optimization using the results of the heuristic optimization, initial conditions, optimization costs, or any combination thereof. These factors may be globally optimized using, for example, Monte-Carlo, gradient descent, a sparse version of Gauss-Newton, or other suitable non-linear optimization solver. In particular embodiments, the system of parameters may be global optimized through a system of equations expressed by (2):

$$\text{Global optimization} \begin{bmatrix} x' \\ y' \\ 0 \\ 1 \end{bmatrix} \begin{bmatrix} \text{Homography Matrix} \\ \text{YPR} \\ \text{scale} \\ \text{translate} \end{bmatrix} \rightarrow \begin{bmatrix} x'' \\ y'' \\ z'' \\ 1 \end{bmatrix} \quad (2)$$

where x' and y' are the coordinates from the dewarp operation; the homography matrix is calculated from the pairs of corresponding feature points as described above; YPR is the rotational adjustments along the yaw, pitch, and roll axis, respectively; scale is a scaling of the image; translate is a translational adjustment; and x'', y'', and z'' are the optimized coordinates.

The system of equations described by equation (2) may suffer convergence failure. At step 325, a failed convergence on an image with more than 40% of the feature points coming from a backup source (e.g., calibration) may indicate the particular image is too white, too close, or lacks features, as illustrated in the example of FIG. 10. In this situation, the particular image may be adjusted in accordance with the initial conditions described above. In particular embodiments, convergence of the system of equations described by equation (2) may fail due to the substituted feature points having too large of a spatial offset. In that case, substituted feature points may have their optimization cost halved and the global optimization performed again. As an example and not by way of limitation, the reduction of the optimization and performing global optimization may be performed a pre-determined number of times (e.g., 4 cycles). Furthermore, if the equation (2) continues to fail to converge, then the contribution of the feature points may be set to zero.

In particular embodiments, in addition to images from adjacent cameras corresponding to a particular eye having an overlap, an image from a neighboring camera corresponding to the other eye may also have an overlap with both images. As an example and not by way of limitation, images from cameras L1 and L2 may have an overlap area, and a neighboring camera (e.g., camera R1, R2, or R3) may also capture an image that includes the same overlap area. As illustrated in the example of FIG. 7, images I-L1 and I-L2 have overlap area $210L_{1-2}$, and image I-R1 also overlaps the two images. In particular embodiments, features of an image (e.g., image I-R1) from a neighboring camera (e.g., camera R1) may be detected and corresponding pairs of feature points may be determined between an overlap area (e.g., overlap area $210L_{1-2}$) of adjacent images (e.g., images I-L1 and I-L2) and the image from the neighboring camera. Furthermore, a homography matrix may be calculated based on the detected pairs of corresponding feature points of the overlap areas of adjacent cameras and the overlapping portions of the image from a neighboring camera. In particular embodiments, the results of a homography matrix corresponding to adjacent cameras (e.g., cameras L1 and L2) may be compared to a homography matrix corresponding to a neighboring camera (e.g., camera R1). In addition, determining a correspondence between a stitched image corresponding to a left-eye view with a stitched image corresponding to a right-eye view may be used to stabilize the vertical offset between the stereoscopic pair of stitched images.

In particular embodiments, once stitch parameters or adjustments are calculated, as described above, they may be checked for correctness. In particular embodiments, a calibration may be performed using images of a known scene captured by camera system 110. The detection of pairs of corresponding feature points of the known scene may provide a set of feature points that may be used as a basis for image adjustments to stitch images. Once the stitching server has detected the pairs of corresponding feature points within the overlapped areas, an error calculation (e.g., a sum of squares of differences) may be performed in an area around each detected feature point. If the error calculation is above a pre-determined threshold value, then the detected pair of corresponding feature points may be flagged as being suspect. If the number of pairs of corresponding feature points drops below a pre-determined threshold number of pairs, the stitching of the discrete images may be flagged. In particular embodiments, the flagged pairs of corresponding feature points may be replaced with the feature points of the calibration data, thereby forcing the homography calculation to think that the images are at calibration orientations.

After the homography matrices are calculated, they may be checked for correctness. At step 335, the difference between the yaw rotations of consecutive homography matrices may be checked, as illustrated in the example of FIG. 10. If the difference is within ±2-3° of the expected difference based on the calibrated data, described above, the image adjustments may be considered to be correct. As an example and not by way of limitation, the homography matrices for a 12-camera system where each camera is separated by 30° may be calculated. If the yaw rotation differences are within a pre-determined range of the expected value (e.g., between 27° and 33°), then the calculated homography matrices may be considered acceptable. In particular embodiments, the images from the cameras are used to calculate homography matrices. If the calculated homography matrices or camera positions are within ±2 degrees of the expected positions and angles, the stitch may be considered good. At step 345, if the stitch fails for some images, the detected pairs of corresponding feature points may be replaced with substitute feature points from calibration data and the stitching procedure re-attempted, as illustrated in the example of FIG. 10. At step 355, if the stitching procedure fails for a number of images above a pre-determined threshold number, the entire stitch may be rejected and the homography matrices from the last successful stitched frame may be used, as illustrated by the example of FIG. 10. In the case where a stitching failure occurs for an initial frame, homography matrices calculated based on calibration data may be used instead.

Figure 13:
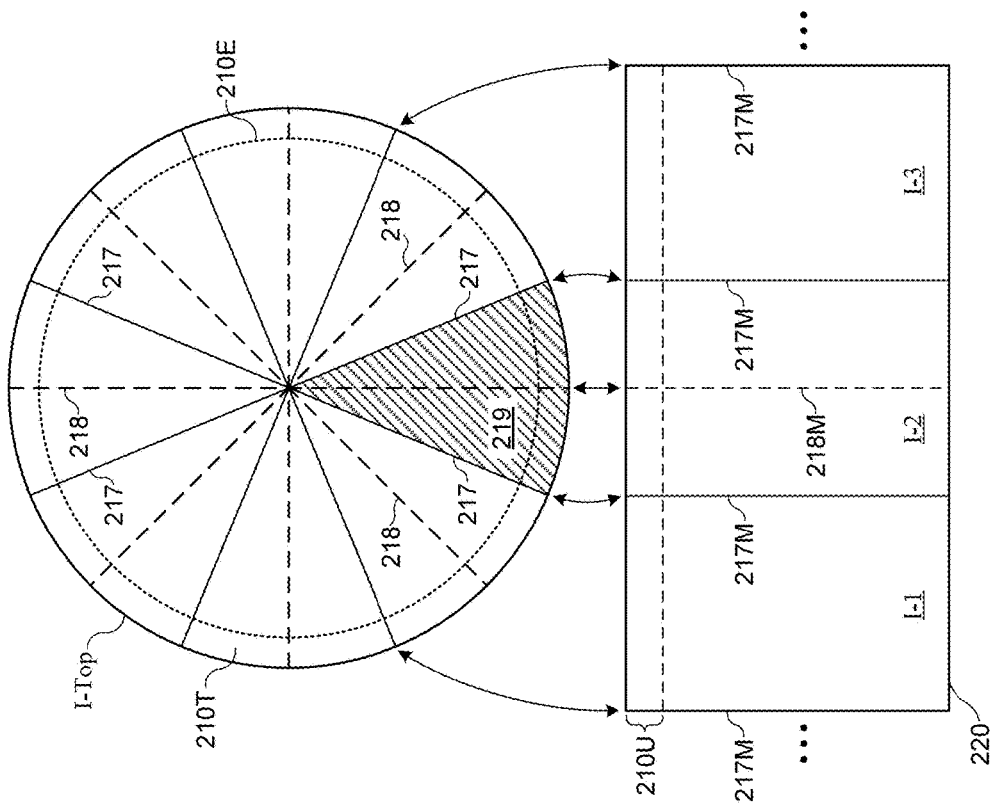
FIG. 13 illustrates an example top image and an example main stitched image.

FIG. 13 illustrates example top image I-Top and stitched image 220. Top image I-Top may be captured by top camera 112T, and stitched image 220 may result from a stitching process that stitches or combines left or right images (e.g., images I-R1 through I-Rn) together. In the example of FIG. 13, stitched image 220 includes images I-1, I-2, and I-3, which are stitched together to form stitched image 220. In particular embodiments, after images from cameras 112 are stitched together to form stitched image 220, top image I-Top from top camera 112T may be stitched or added to an upper portion 210U of stitched image 220. Similarly, in particular embodiments, an image from a bottom camera may be stitched or added to a bottom portion of stitched image 220. In particular embodiments, adding a top or bottom image to stitched image 220 may provide an added view to accommodate stitched image 220 that may not cover a ±90° vertical FOV. As an example and not by way of limitation, left images I-L1 through I-Ln illustrated in the example of FIG. 7 may be stitched together to form stitched image 220 with a vertical extent corresponding to $FOV_V$ of cameras 112. For example, stitched image 220 may represent a 360° horizontal panoramic view around camera system 110, and the panoramic view may cover a ±70° vertical range (corresponding to $FOV_V$=140°) with respect to a horizontal plane of camera system 110. After stitched image 220 is formed, top image I-Top may be stitched to a top portion of stitched image 220, thereby forming an image with a 360° panoramic view having a vertical extent with a range of approximately −70° to approximately +90°. Additionally, a bottom image may also be stitched to a bottom portion of stitched image 220, thereby forming an image that extends in all directions (e.g., covers a full 360° horizontal view that extends vertically in a range from approximately −90° to approximately +90°, where −90° represents looking straight down and +90° represents looking straight up). Although this disclosure describes and illustrates particular stitched images having particular horizontal and vertical extents, this disclosure contemplates any suitable stitched images having any suitable horizontal and vertical extents.

In particular embodiments, portions of top image I-Top may overlap with or correspond to portions of stitched image 220. Furthermore, particular portions of top image I-Top may be correlated with particular images (e.g., images I-1, I-2, I-3, etc.) based on a known configuration of cameras 112 of camera 110 as well as a known configuration of top camera 112T. As an example and not by way of limitation, each region of top image I-Top bordered by two adjacent seam lines 217 (e.g., hatched region 219) may correspond to a particular image of stitched image 220. In the example of FIG. 13, hatched region 219 of image I-Top may correspond to image I-2 captured by a particular camera 112 of camera system 110. A correspondence between images that make up stitched image 220 and portions of top image I-Top may be based on a configuration or orientation 114 of cameras 112 and a configuration of top camera 112T. In particular embodiments, seam lines 217 in image I-Top may correspond to seams 217M of stitched image 220, where seams 217M may represent a border between adjacent discrete images that form stitched image 220. As another example and not by way of limitation, center lines 218 may correspond to an approximate center 218M of discrete images of stitched image 220. In particular embodiments, lines 217 and 218 may represent estimated locations for seams 217M and centers 218M, respectively, before top image I-Top is processed or optimized for stitching to stitched image 220.

In particular embodiments, upper portion 210U of stitched image 220 may represent an area of stitched image 220 that overlaps outer annular region 210T of top image I-Top. For example, stitched image 220 may correspond to a $FOV_V$ that covers for example ±70° with respect to a horizontal orientation 114, and top image I-Top may correspond to an image that extends from a vertical direction (e.g., +90° latitude) to a latitude of +60°. The outer solid black circle of image I-Top may correspond to a latitude of +60°, and the smaller dashed circle 210E of image I-Top may correspond to a latitude of +70°. Overlap areas 210U and 210T may correspond to a 10° overlap (e.g., from latitude +60° to latitude)+70° between image I-Top and stitched image 220. In particular embodiments, an algorithm to stitch top image I-Top to stitched image 220 may include searching for features, determining pairs of corresponding feature points that are located in overlap areas 210U and 210T, as described above, and using those pairs of corresponding feature points to stitch image I-Top' with stitched image 220 as described below. Although this disclosure describes and illustrates particular top and stitched images having particular portions that correspond to or overlap with one another, this disclosure contemplates any suitable top and stitched images having any suitable portions that correspond to or overlap with one another.

Figure 14:
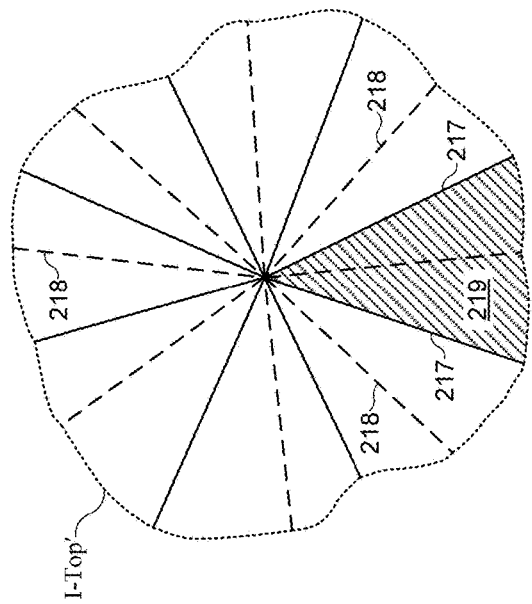
FIG. 14 illustrates the example top image from FIG. 13 after processing.

FIG. 14 illustrates the example top image from FIG. 13 after processing. In particular embodiments, prior to being added to stitched image 220, smaller dashed circle 210E of top image I-Top may be processed, transformed, or optimized to form processed image I-Top', which is then stitched or added to stitched image 220. In particular embodiments, processing steps applied to smaller dashed circle 210E of top image I-Top may include rotating or moving lines 217 or 218, or warping smaller dashed circle 210E of top image I-Top so that processed image I-Top' matches or blends with stitched image 220. In particular embodiments, a single processed image I-Top' may be used with the respective stitched images 220 that correspond to the left and right views or eyes. As an example and not by way of limitation, overlap area 210T of top image I-Top may be cropped prior to the transformation process. In particular embodiments, processed image I-Top' may be added to a stitched image representing a left-eye view and to a stitched image representing a right-eye view. In particular embodiments, smaller dashed circle 210E of top image I-Top may undergo two processing routines to generate separate left and right processed top images based on the stitched image that corresponds to a left-eye and right-eye view, respectively. As an example and not by way of limitation, the left processed top image may be added to the stitched image representing a left-eye view and the right processed image may be added to the stitched image representing a right-eye view.

In particular embodiments, processing of smaller dashed circle 210E of top image I-Top to generate processed image I-Top' may include detecting pairs of corresponding feature points in overlap areas 210T and 210U, as described above. As an example and not by way of limitation, features located near where seam lines 217 intersect an outer edge of image I-Top may be detected. One or more feature points of the detected features may be matched to corresponding feature points from stitched image 220, and based on the matching between corresponding pairs of feature points, offsets of smaller dashed circle 210E of image I-Top with respect to stitched image 220 may be calculated. In particular embodiments, in the case where no corresponding pairs of feature points are detected, feature points may be determined based on camera geometry, or camera calibration may be used to determine the processing performed on smaller dashed circle 210E of top image I-Top.

In particular embodiments, a radial warp around a center of top image I-Top may be determined such that the center position center of top image I-Top remains fixed. Additionally, based on a determined radial warp, seam lines 217 may be rotated to intersect locations where seams 217M of stitched image 216 end, and center lines 218 may be rotated to match any yaw adjustments performed during stitching the discrete images to generate stitched image 220. As an example and not by way of limitation, if one of the discrete images (e.g., image I-1, I-2, or I-3) forming stitched image 220 underwent a yaw adjustment of +2°, then a +2° rotation may be applied to a corresponding center line 218.

In particular embodiments, one or more portions of the outer edge of smaller dashed circle 210E of image I-Top' may be pulled out or pulled in to match stitched image 220. As an example and not by way of limitation, locations where seam lines 217 or center lines 218 intersect the outer edge of smaller dashed circle 210E of image I-Top may be pulled out or pulled in to match a corresponding region of stitched image 220. As an example and not by way of limitation, the outer edge of smaller dashed circle 210E of image I-Top may be pulled out or pulled in by increasing or decreasing, respectively, the length of seam lines 217 or center lines 218 as appropriate. In particular embodiments, processed image I-Top' may be saved separately as a cap image, or processed image I-Top' may be integrated into stitched image 220. As an example and not by way of limitation, a polar-to-rectilinear transform may be applied to processed image I-Top', and the processed image I-Top' may then be blended with stitched image 220, as described below.

In particular embodiments, seams 217M where the discrete images are stitched together to form stitched image 220 may be "blended" using a gradient blend. As an example and not by way of limitation, the luminance or brightness may have a gradient along a direction approaching seams 217M. For example, the brightness may decrease moving toward seams 217M from either lateral direction. An intersection of stitched image 220 and the outer edge of processed image I-Top' may be blended in a similar fashion. As an example and not by way of limitation, the brightness of the intersection between stitched image 220 and the processed image I-Top' may have a gradient proportional to the scale of stitched image 220, such that the blending is smooth at high latitudes.

The blending of the discrete images may occur within the overlap areas that encompass seams 217M. Furthermore, the blending may occur along a non-linear path to reduce visual discontinuities from the blending path. In particular embodiments, the blending algorithm may explore multiple candidate blending paths. An edge detection algorithm may be performed in area around an intersection of adjacent discrete images. If a candidate blending path hits a side edge of either image, the candidate blending path may follow the side edge in both directions until the candidate blending path is at the bottom edge of stitched image 220. If candidate blending paths intersect, the candidate paths may continue along their current directions. In particular embodiments, selection of the blending path from the candidate blending path may be based on selecting the only candidate blending path that reaches the bottom edge of stitched image 220 or if multiple candidate blending paths reach the bottom edge, the shortest candidate blending path is selected. In particular embodiments, the candidate blending path that is the least concave with relation to the center of the image that the candidate blending path is on. For portions that are "traced" the mask gradient should be 50% directly on trace line with small blur radius.

In particular embodiments, a Voronoi-type seam finder may be used for spatially stable stitching. This spatial stability may ensure that shared homographic matrices and blend data may be reused, which may reduce blend-edge flickering. The Voronoi-type seam finder may be used to further refine the search areas for the feature matcher, described above, thereby improving the accuracy of the homographic matrices of feature points confined within areas (e.g., overlap areas) that are most likely to be in the output image. This data may be fed back in real-time to the front-end processors to ignore image data that may not be used in the stitching of stitched image 220.

In particular embodiments, variation in the near-field depth of objects in the captured images may be a concern when generating stitched image 220. As described above, depth information (e.g., obtained from a depth sensor or triangulation of objects in images using the stereo image pairs) may be used to segregate the feature point matching based on the proximity of the feature points to the camera. Objects closer to the viewer or camera have a different geometry for stitching than objects that are further away. In particular embodiments, the depth variation of far-field objects may have a minimal effect on stitching quality, and therefore computing resources may be focused on accounting for near-field depth variation. In particular embodiments, stitching servers 130 may determine based on depth data whether an object in one or more images is located within an area where additional measures may be taken to improve stitching quality. As an example and not by way of limitation, calculation (or recalculation) of homography matrices may then be triggered in response to detecting objects located within a pre-determined threshold distance of a camera 112 or camera system 110.

In particular embodiments, the discrete images may be partitioned into multiple portions that are stitched and blended separately or near-field objects may be prioritized since these objects may have more visible stitching errors than far-field objects. As an example and not by way of limitation, near-field objects may be segregated from the far-field objects and stitched separately. In particular embodiments, the segregated near-field objects may be masked onto stitched image 220 with the far-field objects by placing the near-field objects over the far-field objects using a binary mask. Near-field objects may look very different to the cameras observing the same spot on the near-field object. In particular embodiments, the stitching server may choose to use one of the adjacent images to stitch the object in the overlap areas. As an example and not by way of limitation, a seam finder (e.g., Voronoi-type) may be used to stitch the near-field object from the image containing the majority of the near-field object's area. In particular embodiments, a non-uniform warp may be used to combine the homography matrix for the near-field object with the homography matrix for the far-field object. A mesh-based warp, for example, may transition between the two homography matrices at the edge between the near-field and far-field objects for stitching of both foreground and background of stitched image 220.

Homography matrices may change significantly when objects move from far-field to near-field. In particular embodiments, calculation of homography matrices may be performed on a separate computing thread from the stitching process. As an example and not by way of limitation, one computing thread may perform stitching of the discrete images, and another computing thread may analyze the discrete images for homography data and provide updates to a shared storage. The remainder of cases may be managed by using calibration data or using the last available homography matrices. In particular embodiments, calculating the homography matrices or the stitching process may be accelerated using a graphical-processing unit (GPU). As an example and not by way of limitation, the central-processing unit (CPU) of the system may be used to calculate the homography matrices and the GPU may be used to distort and blend the discrete images.

In particular embodiments, one or more adjustments specific to stitching for stereoscopic video may be performed. In particular embodiments, the pairs of corresponding feature points from stitched images 220 corresponding to the left-eye and right-eye views may be projected onto a 3-D spherical projection space. In particular embodiments, there may be a difference between the starting point for the left-eye view and the right-eye view. This difference may be corrected through the initial condition that the first camera position is used as a start position and the first camera has a yaw of zero. The remaining cameras may be adjusted based on these initial conditions.

In particular embodiments, stitched images 220 corresponding to the left-eye view and the right-eye view may be performed using shared homography matrices. The stitching process calculating the adjustments to generate stitched image 220 corresponding to the left-eye view may communicate with the stitching process calculating the adjustments to generate stitched image 220 corresponding to the right-eye view to ensure the overall homographies and image adjustments are consistent between the left-eye view and the right-eye view. Furthermore, image parameters or exposure correction should be consistent within a reasonable range between the left-eye view and the right-eye view. In particular embodiments, stereoscopic video may have frames that are time-synchronized between left-eye view and right-eye views.

In particular embodiments, generating stitched images 220 for video may use a look-ahead approach. As an example and not by way of limitation, for a current frame, the stitching adjustments (e.g., homography matrices) may be calculated for the current frame and some pre-determined number of subsequent frames in the future. In particular embodiments, a full set of stitch parameters is calculated in response to detecting a substantive change in a pair of corresponding feature points (e.g., movement of an object from far-field to near-field) occurring in the future frames. Furthermore, a change flag may be set that causes the stitch parameters to be interpolated (e.g., sine easing) to the newly calculated stitching parameters, such that the stitch smoothly switches to deal with the change in the scene. The determination of the pre-determined number of subsequent frames should incorporate the time needed to calculate the new stitching adjustments.

Figure 15:
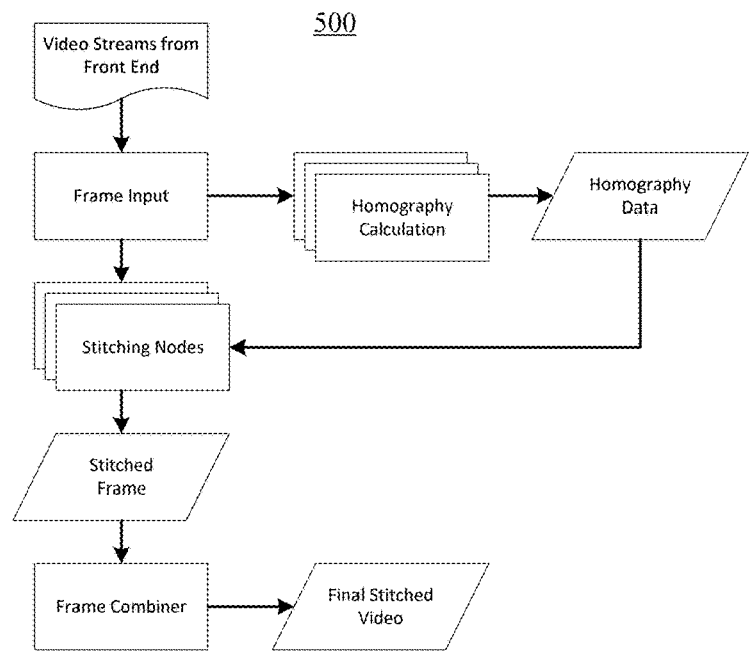
FIGS. 15 and 16 illustrate example methods for stitching discrete images.
Figure 16:
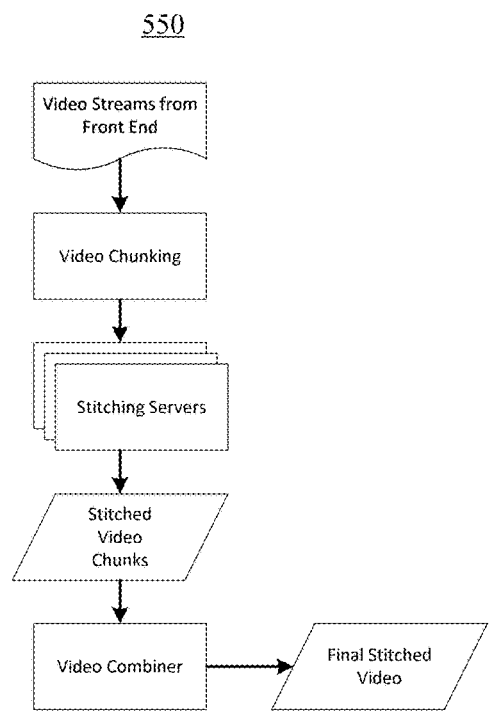

FIGS. 15 and 16 illustrate example methods 500 and 550, respectively, for stitching discrete images. In particular embodiments, a method 500 for stitching of real-time 360° 3-D video is to distribute the stitching of individual frames across multiple stitching servers, as illustrated in the example of FIG. 15. The homography matrix management may be done either per-stitching server, or stitching servers may share homography matrices using a central homography server. In particular embodiments, the central homography server may task individual server nodes to calculate homography matrices or stitch images. The number of servers used to complete stitched images may be proportional to the desired frame rate or the throughput of the stitching servers. As an example and not by way of limitation, for a single stitching server with a 1 frame per second (FPS) throughput, 30 stitching servers may be used to produce a 30 FPS stitched video.

In particular embodiments, another method 550 for stitching of real-time 360° 3-D video is to distribute the stitching of segments of video (e.g., video chunks, or multiple frames) across multiple stitching servers, as illustrated in the example of FIG. 15. Multiple stitching servers may concurrently handle the stitching of the video, where each stitching server generates a stitched video segment corresponding to the received segment of video. A collection server or video combiner may receive the individual video segments from the stitching servers and merge them back in order to produce the stitched video.

In particular embodiments, the discrete images may be manually stitched to generate a stitched image or video. The feature extraction and determination of pairs of corresponding feature points may be bypassed and manually selected pairs of corresponding feature point provided. From this point the remainder of the stitching process may be performed as described above.

Transmission of 360° stereoscopic 3-D video may require a high bandwidth network connection between content sever 140 and client device 150 displaying the video. As an example and not by way of limitation, 360° stereoscopic 3-D video may use as much as 5 times the data bandwidth as standard video. A codec is a computer program that may be used to efficiently encode a digital data stream corresponding to the 360° stereoscopic 3-D video. In particular embodiments, a codec may chronologically encode a subsequent frame of a 360° stereoscopic video stream based on references to a previous frame. As an example and not by way of limitation, the codec may use an initial video frame as the primary image that is encoded normally. The difference or "delta" between the next chronological image and the primary image is determined and encoded by the codec to capture the chronological offset. As described above, the stereoscopic pairs of images corresponding to the left-eye view and the right-eye view have a spatial offset from each other. In particular embodiments, a codec may additionally spatially encode the images of the stereoscopic video as a primary/secondary pair of images in a similar fashion to the chronological encoding. As an example and not by way of limitation, the primary image used for the chronological encoding may correspond to the view from one eye and be used as the primary image for the spatial encoding. In particular embodiments, the corresponding image for other eye may be encoded as "delta" or B-image relative to the primary image. As an example and not by way of limitation, the "delta" between the primary frame corresponding to one eye and the image corresponding to the eye is determined and encoded by the codec to capture the spatial offset. In particular embodiments, the encoding may combine spatial encoding of the left-eye and the right-eye views with the chronological encoding of current and subsequent images. In particular embodiments, a search for similarities or differences between left and right images may use knowledge of point shifts calculated by a stitching system during the processing of an image.

In particular embodiments, a codec may be used to compress the final video output by combining the left-eye and right-eye views into a single image, thereby capturing spatial redundancies between the frames since most of the spatial information will be same or similar. Furthermore, the codec may be used to compress the final video output by combining the single image of the left-eye and right-eye views with a subsequent single image of the left-eye and right-eye views, thereby capturing chronological redundancies between the frames since most of the chronological data will be same or similar. Thus, in particular embodiments, a codec may include information describing a delta from a left-eye image to a right-eye image (or vice versa), both corresponding to the same chronological point in time; a delta from a left-eye image at a first point in time to a left-eye image at a second point in time; a delta from a left-eye image at a first point in time to a right-eye image at a second point in time; or any suitable combination thereof. The codec may use as a reference an image corresponding to any suitable point in time or points in time. This disclosure contemplates that a codec may use a left-image or right-image for any given pair of cameras. In particular embodiments, a codec may compress the final video by determining one or more shared transform blocks such that an underlying "dictionary" of block data may be used to carry out compression and motion compensation. The transform blocks or underlying dictionary may be shared between the left and right videos, thereby allowing for a video with two streams that share underlying compression data. In particular embodiments, the transform blocks may serve as the input to a linear block transform (e.g., discrete cosine transform (DCT)) used to compress the final video. In particular embodiments, a codec may maintain four separate motion compensation streams: (1) a compensation of motion for the primary eye; (2) a change in motion of the primary eye; (3) an offset (and change in offsets) for the secondary eye; and (4) a change in motion of the secondary eye.

In particular embodiments, a stitching system may stitch together discrete images into a stereoscopic 3-D 360° video and store the stereoscopic 3-D 360° video as high-data video frames. For high speed, high resolution video playback or low latency scenarios, it may be preferable for client device 150 to carry out the stitching operations using its GPU or CPU. In such cases, content server 140 may store the parameters and masks for client device 150 to properly stitch the received images, and client device 150 may carry out distortion, composition, or blending steps based on the parameters and masks. The masks may be stored at a low resolution as binary images, and using the parameters, the binary images may be expanded to appropriate resolution through interpolation and received images stitched together to recreate the scene. In particular embodiments, masks may not be generated from frame to frame and may be stored only when changes are detected. A combined approach can also be taken where a low resolution version of the frame is fully composited and kept for use as a background, but high resolution images may be retrieved as-is and then distorted and composited on client device 150.

Figure 17:
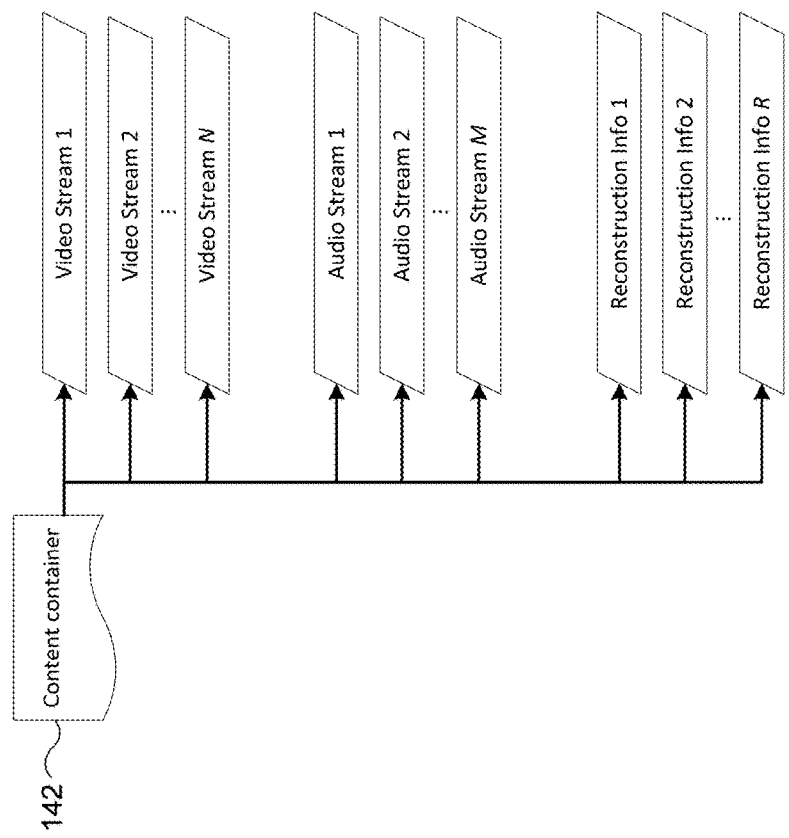
FIG. 17 illustrates a content container which includes various video-data components.

FIG. 17 illustrates content container 142 which includes various video-data components. In particular embodiments, a composite stream may refer to a video stream that includes components of video data coalesced into a single content container 142 (or, container stream). In particular embodiments, video data may be stored as a single container (content container 142) with multiple streams or sub-streams interleaved inside container 142. In particular embodiments, content container 142 may include multiple sub-streams, such as for example: video sub-streams (e.g., composited video at multiple resolutions, single camera streams, manipulated camera streams, or top/bottom cap video data); audio sub-streams (e.g., audio with or without spatial reconstruction data, stereo audio, or mono audio); reconstruction sub-streams (e.g., mask data, distortion data, correction data, or projection parameters); or any combination thereof. In the example of FIG. 17, content container 142 includes video sub-streams 1 through N, audio sub-streams 1 through M, and reconstruction information 1 through R. In particular embodiments, one or more audio sub-streams of a composite stream may be time synchronized to one or more video sub-streams. Furthermore, audio spatial reconstruction data may include data to spatially recreate 360° audio ("surround sound") from one or more of the audio sub-streams. In particular embodiments, a video stream for 360° stereoscopic 3-D video may be a video stream that includes the entire image data or a video stream for each camera of the camera system. In particular embodiments, client device 150 may receive parameters and masks as a separate stream and retrieve the specific image frames as needed. Although this disclosure describes and illustrates particular composite streams having particular components or sub-streams, this disclosure contemplates any suitable composite streams having any suitable components or sub-streams.

Figure 18:
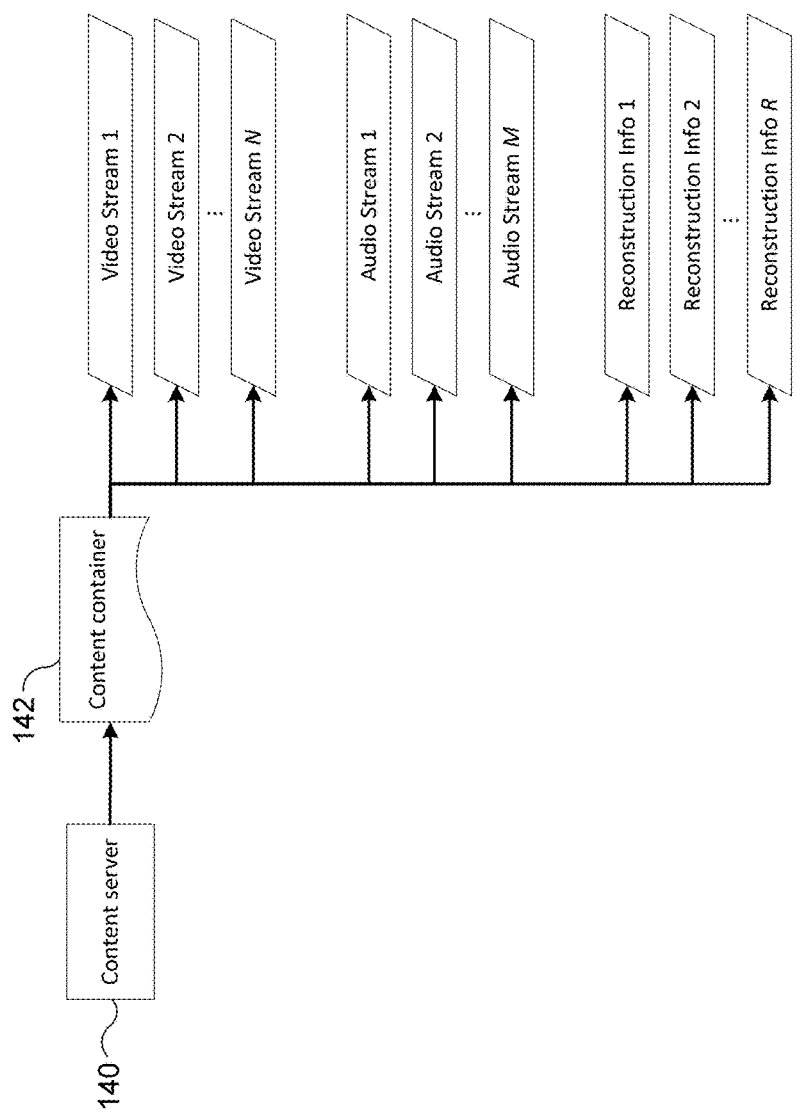
FIG. 18 illustrates a content server configured to broadcast a content container as a composite stream.

FIG. 18 illustrates an example content server 140 configured to broadcast content container 142 as a composite stream. In particular embodiments, a composite stream with content container 142 may be streamed (possibly in a rate-limited manner) by content server 140 to client device 150, and client device 150 may unpack and comprehend the stream. As an example and not by way of limitation, the approach illustrated in FIG. 18 may be applied to broadcasting live streams where a composite stream (e.g., received from stitching servers 130) may be directly broadcast by content server 140 with little or no additional processing applied by content server 140. As another example and not by way of limitation, the example transmission method illustrated in FIG. 18 may be applied to composite streams that have a minimum level of internal redundancy. In particular embodiments, content server 140 may be a hypertext transfer protocol (HTTP) server, and content server 140 may be configured to transmit content container 142 to client device 150. In particular embodiments, an initial portion of a composite stream may be delivered at a higher data rate to fill buffers of client device 150, and then, the remaining portion of the composite stream may be delivered at a reduced data rate. In particular embodiments, stitching servers 130 may output multiple composite streams, each having a different bitrate as determined by video parameters (e.g., resolution, framerate, or compression parameters). As an example and not by way of limitation, content server 140 or client device 150 may select an appropriate stream based on available or requested bandwidth.

Figure 19:
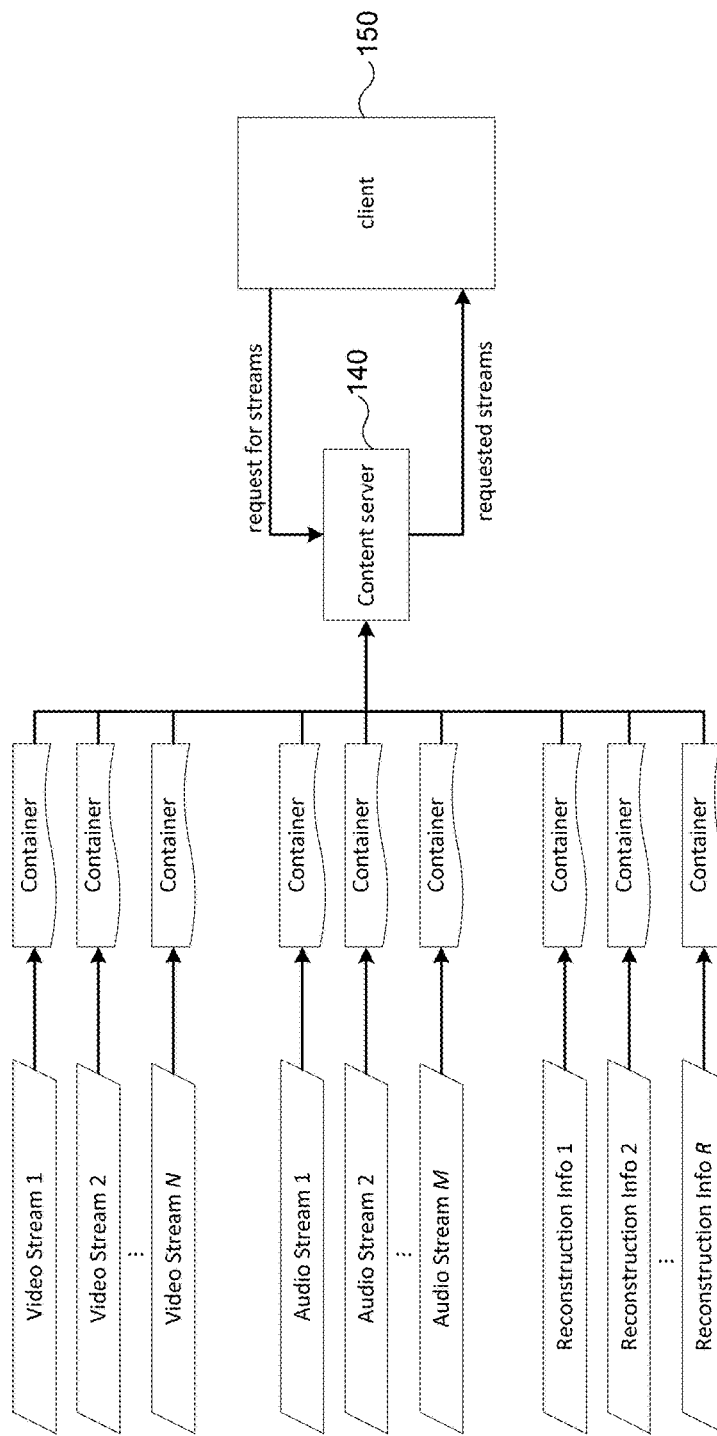
FIG. 19 illustrates an example transmission scheme involving direct transmission of unbundled streams.

FIG. 19 illustrates an example transmission scheme involving direct transmission of unbundled streams. In particular embodiments, content server 140 may transmit video data in the form of separate streams, rather than a single composite stream. As an example and not by way of limitation, client device 150 may request resources separately (e.g., video stream 2, audio stream 2, and reconstruction information 2), and then client device 150 may receive these resources separately and utilize them as needed. In particular embodiments, a descriptor file or stream (e.g., with metadata or locations of the various streams) may be included to facilitate access.

Figure 20:
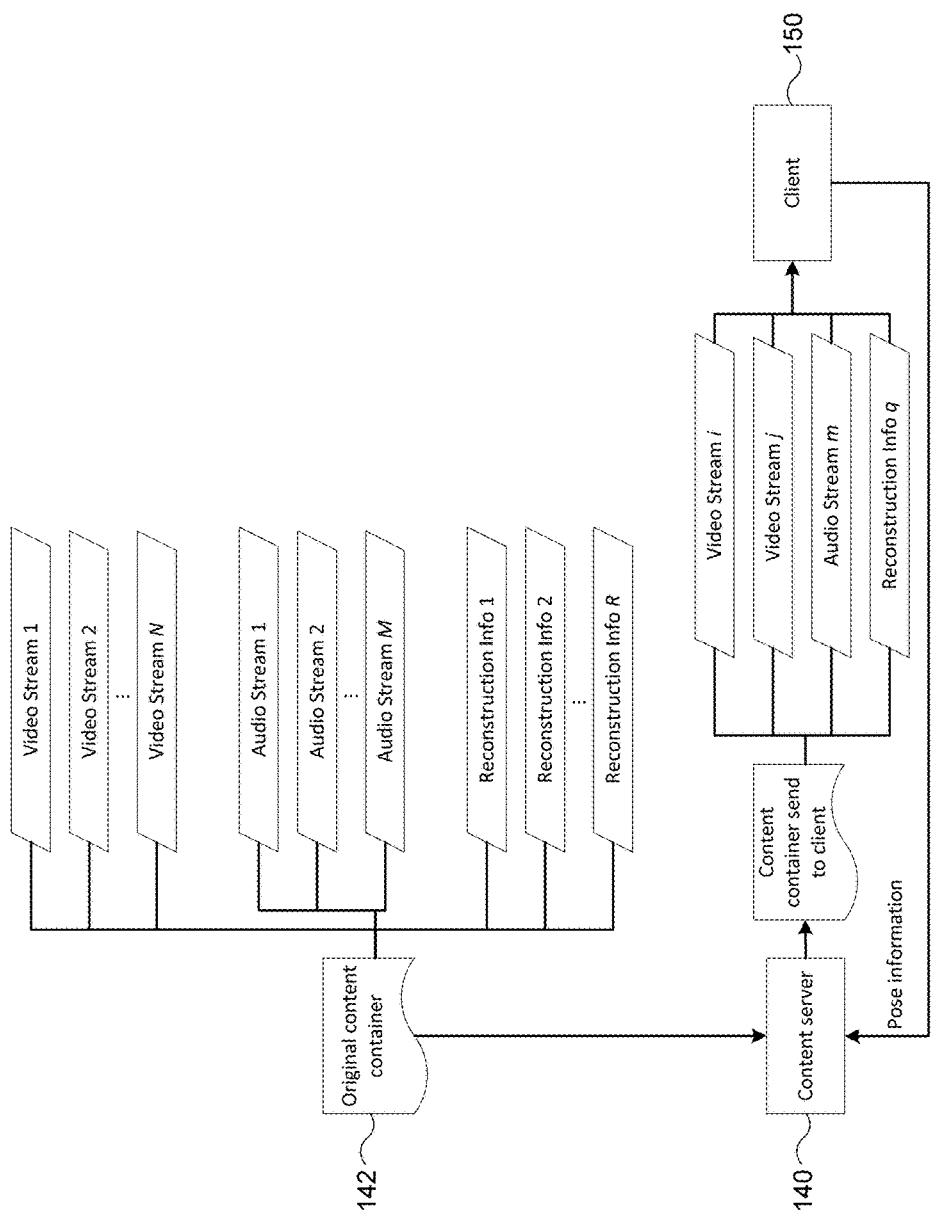
FIGS. 20-22 each illustrate an example mediated scheme for transmission of a video stream.

FIG. 20 illustrates an example mediated scheme for transmission of a video stream. In particular embodiments, content server 140 may decode and comprehend the data included in a composite stream (e.g., original content container 142). In particular embodiments, client device 150 may transmit a request for a particular composite stream. As an example and not by way of limitation, a request for a video stream may include instructions to include or omit one or more components or sub-streams of the video stream, or instructions to select components or sub-streams with particular bit rates. For example, the components or sub-streams may correspond to a particular view of the video stream that includes a number of views. Content server 140 may access a component stream to extract the components of the component stream in response to receiving a request from client device 150. In particular embodiments, content server 140 may assemble the requested components or sub-streams corresponding to the components or sub-streams requested by client device 150 as a custom stream. In the example of FIG. 20, the custom stream ("content container send to client") includes video stream i, video stream j, audio stream m, and reconstruction information q. Content server 140 then transmits the custom stream to client device 150. As an example and not by way of limitation, a client device without speakers or without a sound card may include instructions to exclude any audio related information from the custom stream transmitted by content server 140. As another example and not by way of limitation, client device 150 with a high-definition display may request a high-resolution video stream.

Figure 21:
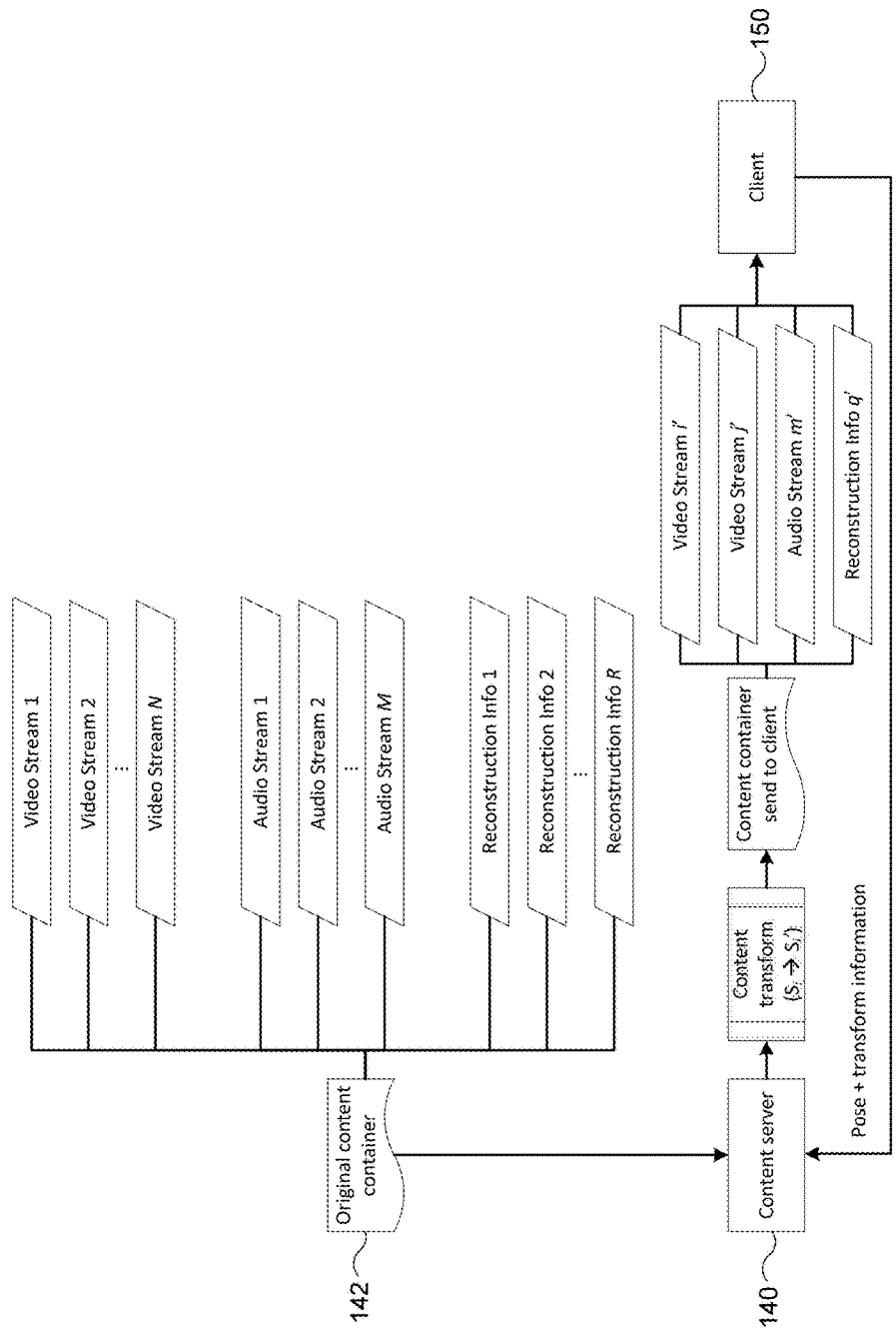

FIG. 21 illustrates another example mediated scheme for transmission of a video stream. As described above, content server 140 may decode and comprehend the data included in a composite stream. Furthermore, client device 150 may transmit a request to content server 140 for a particular video feed that may include instructions for the content server to perform a transformation on one or more components or sub-streams. As an example and not by way of limitation, a request by client device 150 may include instructions to customize the stream by transcoding or resizing one or more components or sub-streams of the composite stream. For example, one or more of the video sub-streams included in the custom stream may be chronologically and spatially encoded, as described above, or encoded to conform to any suitable encoding format (e.g., moving pictures experts group-4 (MPEG-4)). As another example, a request from a mobile device may include instructions to resize the video stream to a resolution that is appropriate to the screen size of the mobile device and the bandwidth of the connection.

Figure 22:
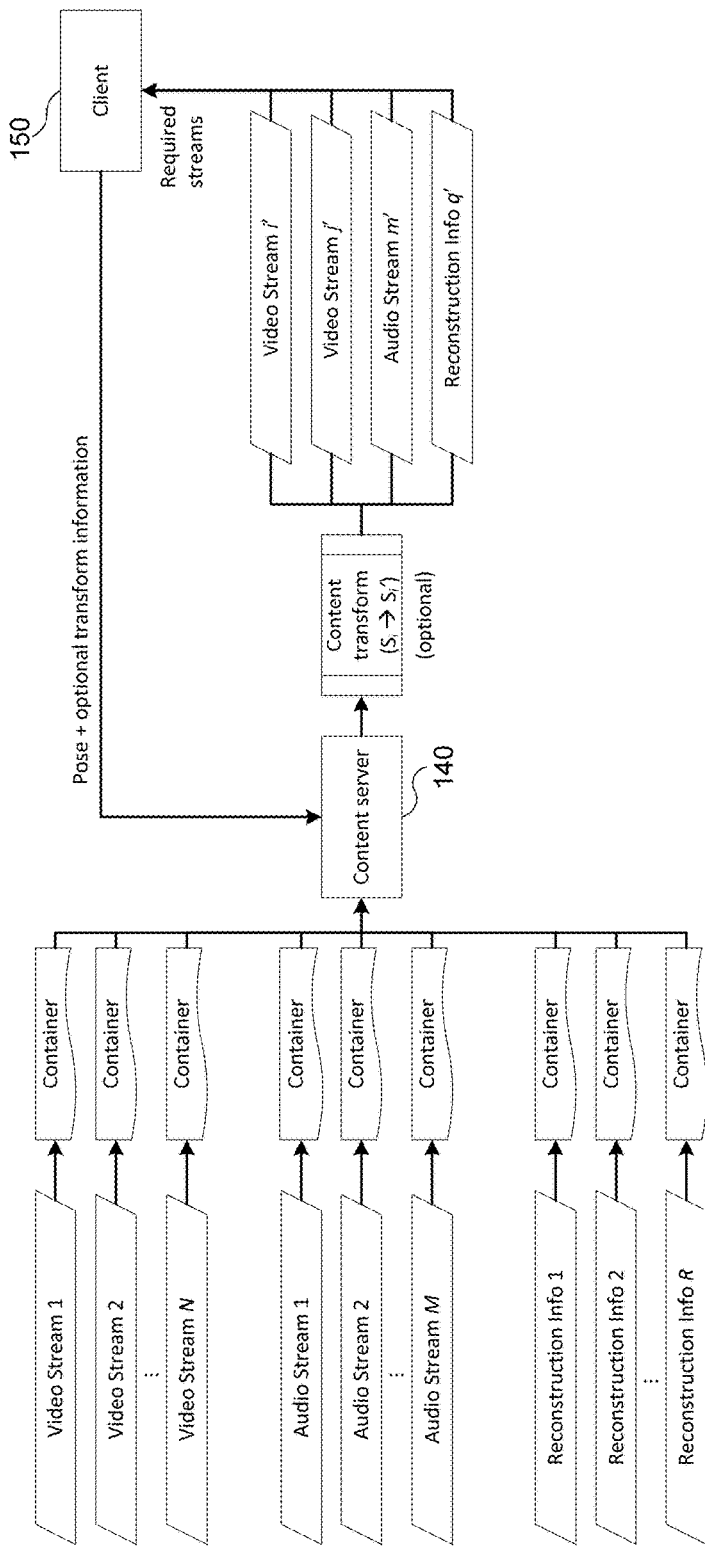

FIG. 22 illustrates another example mediated scheme for transmission of a video stream. In particular embodiments, content server 140 may store the components and sub-streams of a composite stream as separate streams, such that the content server is not required to extract the components of the composite stream at the time a request is received from client device 150. As described above, client device 150 may transmit a request to content server 140 that includes instructions that selects one or more components or sub-streams of the composite stream. Content server 140 may retrieve the requested components or sub-streams and transmit the requested components or sub-streams to client device 150. In particular embodiments, a request from client device 150 may include instructions to perform a transform on one or more of the components or sub-streams of the composite stream. As described above, a transformation may include transcoding or resizing one or more components or sub-streams. As an example and not by way of limitation, instructions from client device 150 may direct content server 140 to transcode one or more audio streams into a surround sound format (e.g., spatial audio coding (SAC)).

Figure 23:
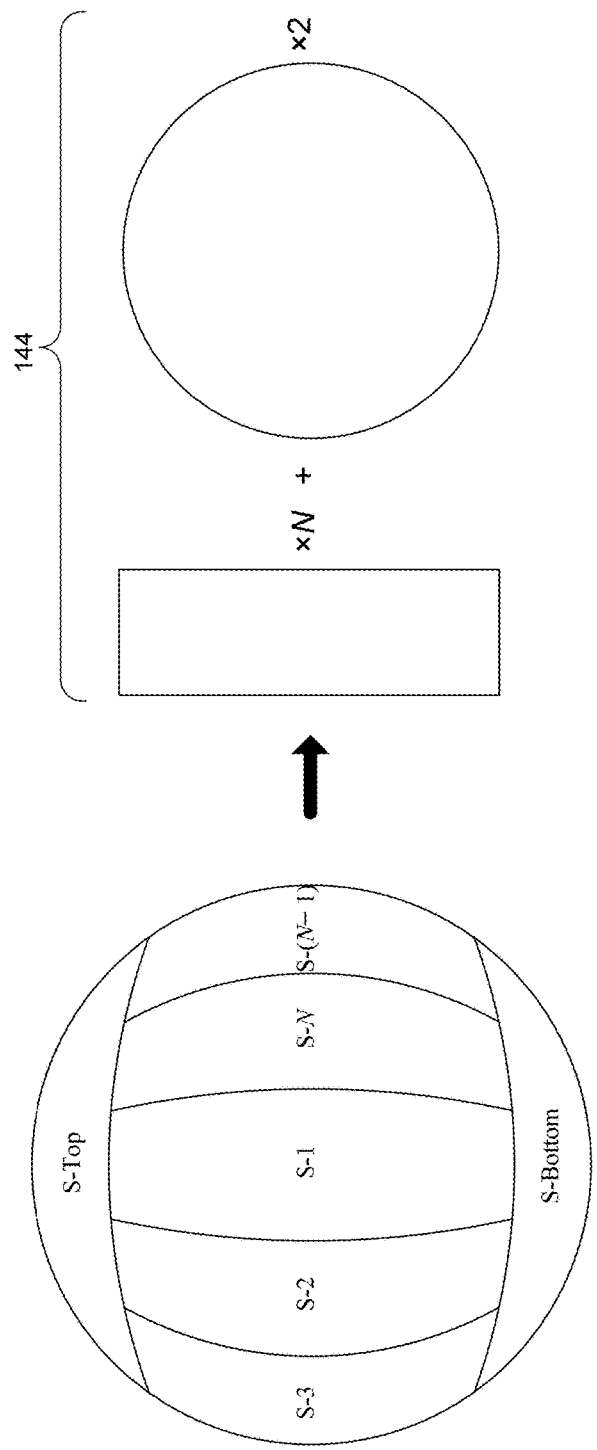
FIG. 23 illustrates a sliced stream set.

FIG. 23 illustrates sliced stream set 144. In the example of FIG. 23, sliced stream set 144 includes two streams corresponding to top slice S-Top and bottom slice S-Bottom. Sliced stream set 144 also includes N streams corresponding to slices S-1 through S-N that represent a 360-degree view provided by cameras 112 of camera system 110. Herein, the term slice may refer to a spatially distinct region of a frame that may be encoded separately from other regions in the same frame. Furthermore, herein, the term sliced stream may refer to a stitched or unstitched video stream that has been separated into multiple independent video streams that compose vertical and/or horizontal slices of the video frames where each video stream may be independently decodable. In particular embodiments, sliced stream set 144 may additionally include data from a composite stream such as audio or control information.

Figure 24:
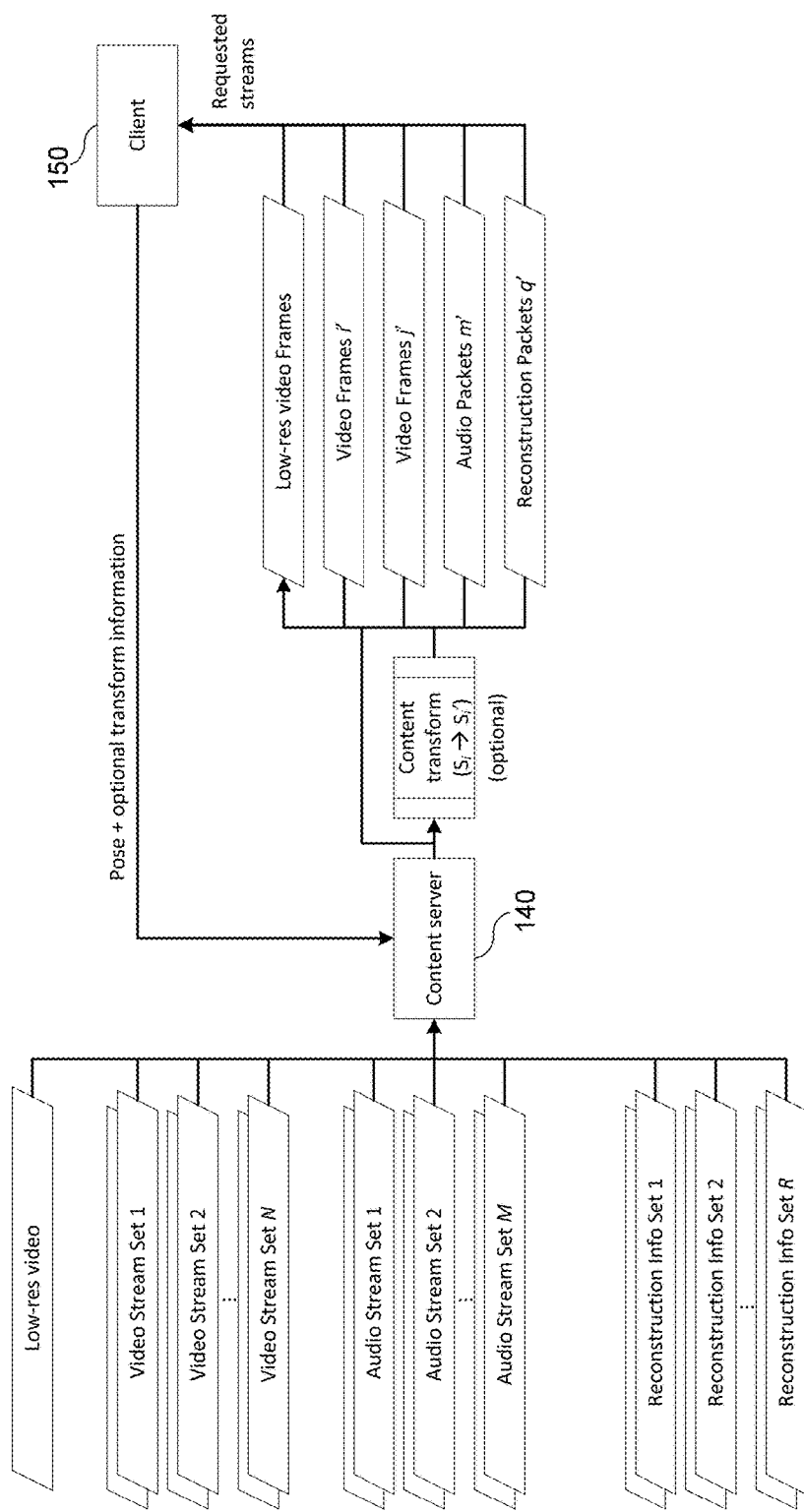
FIG. 24 illustrates an example interactive scheme for transmission of a video stream.

FIG. 24 illustrates an example interactive scheme for transmission of a video stream. In particular embodiments, content server 140 may separate a composite stream into slices that may be accessed or streamed separately. In particular embodiments, content server 140 may provide access to a sliced stream in an interactive way based on input from client device 150. As an example and not by way of limitation, a sliced stream may be a real-time 360° 3-D video, and an input from client device 150 may describe an orientation of the user to content server 140. Content server 140 may dynamically serve frames corresponding to the areas the user is viewing. As an example and not by way of limitation, content server 140 may select one or more frames of a video stream that correspond to the orientation of the user and transmit the selected frames to client device 150. In particular embodiments, content server 140 may transmit a lower-resolution, fully stitched video stream that serves as a background scene when displayed on client device 150. The background scene may be displayed for the user during a period of time when there may be latency in receiving the full resolution video stream from content server 140. The level of detail (LoD) of the video rendered on client device 150 may be increased as the full-resolution video stream is received from content server 140.

In addition to the orientation data, client device 150 may transmit instructions to select one or more components or frames of a sliced stream. In particular embodiments, the instructions may also direct content server 140 to transform one or more of the components or frames of a sliced stream. As an example and not by way of limitation, content server 140 may access and serve data from multiple streams in response to instructions from client device 150 selecting one or more components or frames.

In particular embodiments, client device 150 may predictively request additional slices on each side of a visible area based on inferring that the user is expected to change perspective (e.g., based on movement of a head-mounted display (HMD) or remote). Client device 150 may transmit instructions selecting one or more components or frames based on an inferred change of perspective. The LoD increase is slight during the transition in the viewer perspective, but as the perspective becomes more stable in direction of viewing, the LoD may be incrementally increased (e.g., increased video resolution). In particular embodiments, as the user perspective changes, instructions from client device 150 may select progressively higher-resolution video slices.

In particular embodiments, content server 140 or client device 150 may use latency- or bandwidth-sensing algorithms to dynamically adjust the framerate of the video stream to compensate changes in the available bandwidth. As an example and not by way of limitation, the transmission rate of a background full-stitch video may be reduced to recover bandwidth. In particular embodiments, content server 140 or client device 150 may make additional decisions based on the nature of client device 150. As an example and not by way of limitation, navigation on a TV may be slower than for a HMD that may be slower than a mobile phone or tablet that can be easily moved in hand. In particular embodiments, content server 140 may adjust one or more transmission parameters based on a device profile of client device 150.

Interactive streaming may use a recoding or a keyframe-only encoding stream, such as, for example, motion joint photographic experts group (M-JPEG) encoding. In the situation where both keyframes and intermediate frames exist, content server 140 may decode all streams and then re-encode the requested slices. In particular embodiments, content server 140 may incorporate accelerator ASICs or other capabilities to speed up recoding/decoding/manipulation of video streams. As an example and not by way of limitation, these capabilities may be implemented as a separate processing node with specialized hardware (e.g., accelerator ASICs) with the content servers acting as proxies to this processing node.

In particular embodiments, an entire data stream (e.g., content container 142) may be transmitted to one or more client devices 150. As an example and not by way of limitation, content server 140 may transmit content container 142 to one or more client devices 150, and each client device 150 may select or extract a portion of the content container 142 (e.g., client device 150 may extract a particular video sub-stream from content container 142 for display on client device 150). Client device 150 may determine what portion of a data stream is needed based on the requirements or capabilities of the client device 150 (e.g., if client device 150 has the capability to display high-definition video, then the client device 150 may extract a high-definition video stream from content container 142). In particular embodiments, one or more portions of a data stream may be sent to multiple client devices 150. As an example and not by way of limitation, content server 140 may transmit a high-definition video stream to one or more client devices 150 having the capability to display high-definition video, and content server 140 may transmit a standard-definition video stream to one or more other client devices 150 having the capability to display standard-definition video.

Figure 25:
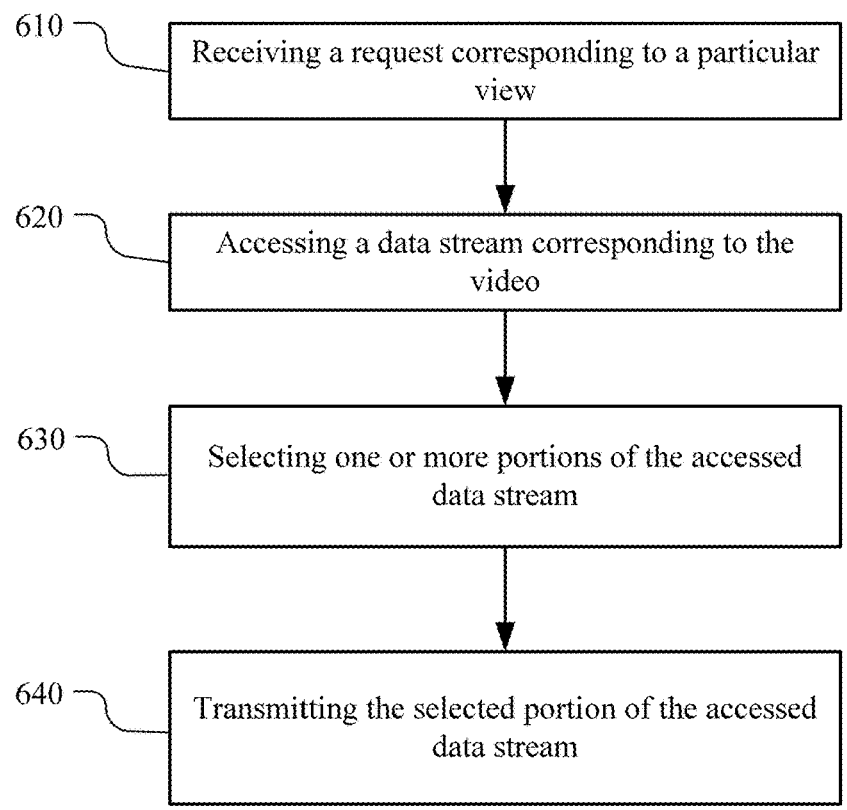
FIG. 25 illustrates an example method for transmitting 3-D 360° video.

FIG. 25 illustrates an example method 600 for transmitting 3-D 360° video. The method may begin at step 610, where a request that corresponds to a particular view of a three-dimensional video is received. In particular embodiments, the 3-D video includes a number of views. At step 620, a data stream corresponding to the video is accessed. At step 630, one or more portions of the accessed data stream is selected based on the request. In particular embodiments, at least one of the selected portions corresponds to the particular view. At step 640, the selected portion of the accessed data stream is transmitted to the client device. Particular embodiments may repeat one or more steps of the method of FIG. 25, where appropriate. Although this disclosure describes and illustrates particular steps of the method of FIG. 25 as occurring in a particular order, this disclosure contemplates any suitable steps of the method of FIG. 25 occurring in any suitable order. Moreover, although this disclosure describes and illustrates an example method for transmitting 3-D 360° video including the particular steps of the method of FIG. 25, this disclosure contemplates any suitable method for transmitting 3-D 360° video including any suitable steps, which may include all, some, or none of the steps of the method of FIG. 25, where appropriate. Furthermore, although this disclosure describes and illustrates particular components, devices, or systems carrying out particular steps of the method of FIG. 25, this disclosure contemplates any suitable combination of any suitable components, devices, or systems carrying out any suitable steps of the method of FIG. 25.

In particular embodiments, after a 3-D 360° video is transmitted to client device 150, the video may be reconstructed so that a user may view a scene represented by the video as a 3-D scene. As an example and not by way of limitation, a 3-D 360° video may be reconstructed in such a way that a user viewing the reconstructed video may perceive a natural, realistic, or immersive 3-D environment that provides a sense of "being there" personally rather than just viewing a representation of a scene on a screen. Herein, the term reconstruction may refer to an action of converting 2-D images or videos into stitched or otherwise processed and calibrated video streams that can be used to present a scene in a realistically 3-D way. In particular embodiments, reconstruction may be performed by a stereoscopic viewing system such as a HMD or a 3-D television. Client device 150 (e.g., a HMD or 3-D television) may receive discrete images or streams from content server 140, and client device 150 may perform reconstruction by combining, stitching, or processing the discrete images or streams to produce a stereoscopic 3-D 360° video. In particular embodiments, a reconstruction technique may allow client device 150 to seamlessly present a 3-D scene to a viewer while also offering one or more of the following: efficient use of bandwidth; optimization of stitching processes; an ability to employ advanced network streaming techniques; or optimization of latency, computation, or other viewing parameters. Although this disclosure describes and illustrates particular reconstruction techniques performed in particular manners, this disclosure contemplates any suitable reconstruction techniques performed in any suitable manners.

In particular embodiments, a reconstruction technique may be applied to stereoscopic images (e.g., images captured using camera system 110 as described above). As an example and not by way of limitation, stereoscopic images may be reconstructed by mapping stitched images onto a sphere (e.g., using a spherical projection map). When displaying a reconstructed 3-D video, a user's eyes or head may be represented as being located at the center of the sphere, where the user's head is allowed to rotate freely to view different portions of the 3-D video. As the user's head rotates, client device 150 may display two reconstructed images (e.g., a left image and a right image) in a seamless fashion. In particular embodiments, client device 150 may receive individual images, mask data, and distortion parameters from content server 140. Client device 150 may use a GPU or CPU to distort the images and apply the masks or other correction parameters to create a spherical texture in memory. In particular embodiments, portions of the sphere not being viewed by a user may be skipped or disregarded, which may lower bandwidth consumption for data transfer. In particular embodiments, a low-resolution image may be provided and used temporarily (e.g., when a user turns their head to view a different portion of a video) while a higher-resolution video is retrieved or processed.

In particular embodiments, a reconstruction process may include a photogrammetric technique. As an example and not by way of limitation, photogrammetry may be based on capturing non-stereoscopic images using a set of cameras with overlapping FOVs. As an example and not by way of limitation, a set of cameras may be arranged along a circle or a portion of a circle, and each camera may be oriented along a radial line originating from a common center point of the circle. A set of images captured by a set of cameras arranged in a circle may represent a 360° view of a scene, and each image of the set may correspond to a particular angular position of the 360° scene (e.g., each camera may have a different orientation). Adjacent cameras may have an angular overlap similar to angular overlap 116 described above. In particular embodiments, photogrammetry may involve adjacent cameras that have a high degree of angular overlap (e.g., greater than or equal to 50% angular overlap of horizontal FOVs) so that any point in a scene is captured by at least two cameras. In particular embodiments, a photogrammetric method may use other images intersecting with an image plane to synthesize 3-D information. As an example and not by way of limitation, multiple views of the same scene may be used to create separate left and right views and provide a sense of 3-D to a viewer. Images from different viewpoints may be placed at mathematically appropriate locations to provide a reconstruction that matches an orientation or FOV of the cameras that captured the images. As an example and not by way of limitation, a set of images may be mapped onto a corresponding set of polygons. Once the images are placed or aligned, appropriate portions of overlapped images may be chosen to produce a stereoscopic view (e.g., a left view and a right view) having a 3-D appearance. In particular embodiments, a photogrammetric technique may be applied without using blending, stitching, or repeated feature search or homography calculation.

In particular embodiments, a photogrammetric technique may offer a relatively fast or efficient method to process images. As an example and not by way of limitation, a photogrammetric technique may be used to directly process images from camera system 110 and provide a viewfinder-type indication of a scene captured by camera system 110 (e.g., without requiring stitching or other additional processes). A person setting up camera system 110 for operation may use images processed using photogrammetry to quickly view images obtained by camera system 110 in case camera system 110 needs to be moved or its operating parameters adjusted. As another example and not by way of limitation, if a stitching process becomes temporarily unavailable or unfeasible, a photogrammetric technique may be applied as a back-up to process images from camera system 110 or to place image planes at an appropriate focal length. Although this disclosure describes particular photogrammetric techniques that include particular processes, this disclosure contemplates any suitable photogrammetric techniques that include any suitable processes.

Figure 26:
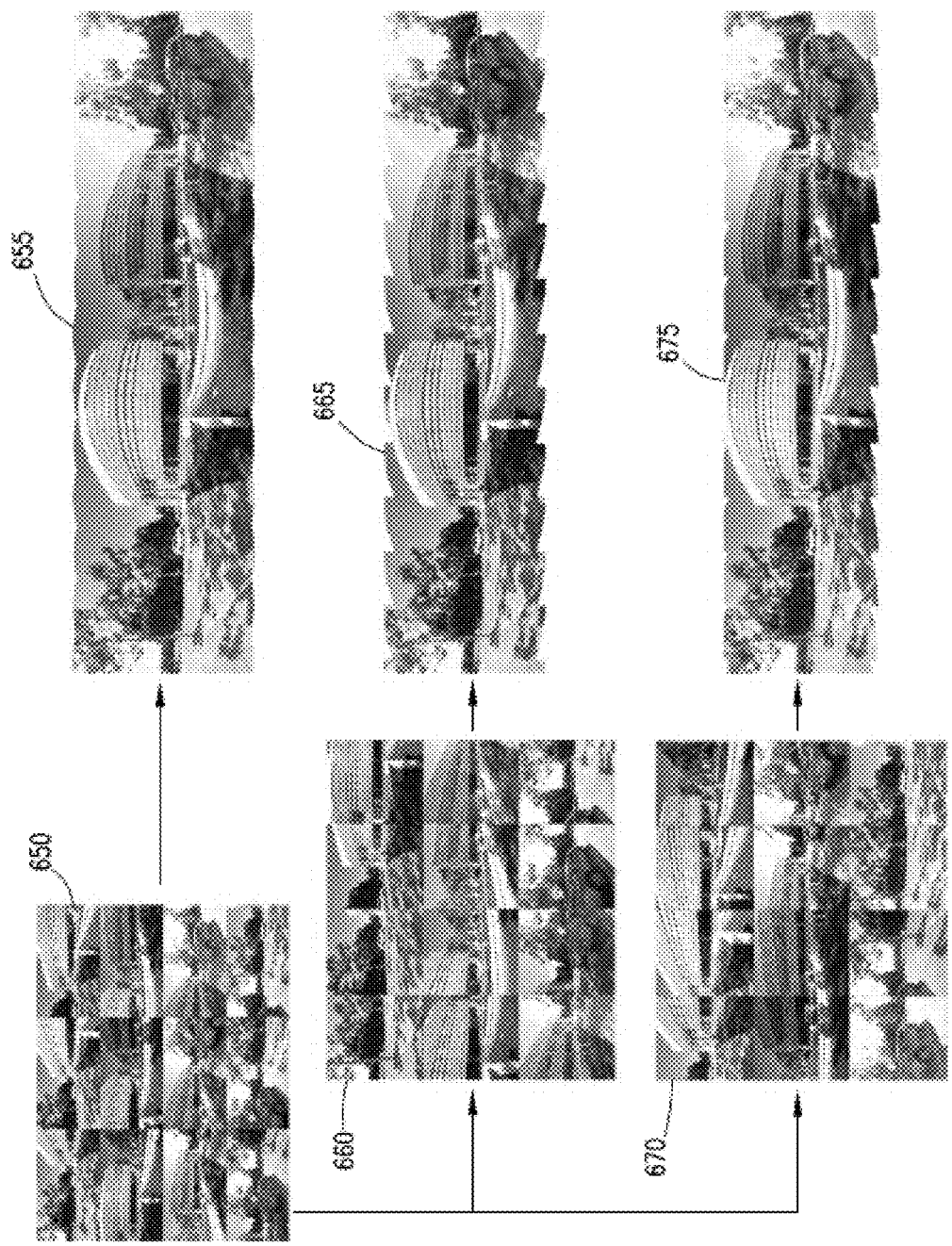
FIG. 26 illustrates an example reconstruction process based on hybrid stitching using photogrammetry.

FIG. 26 illustrates an example reconstruction process based on hybrid stitching using photogrammetry. In particular embodiments, a reconstruction process may include hybrid stitching using photogrammetry in which a photogrammetric technique is combined with a stitching process to generate a set of 3-D images. As with the photogrammetric technique described above, hybrid stitching using photogrammetry may not require stereo image capture. In particular embodiments, a set of overlapping images 650 may be captured using a set of cameras with overlapping FOVs, and then the captured images 650 may be stitched together (e.g., using a stitching process as described above) to form a composite image 655. In particular embodiments, a stitching process as described above may be used to combine captured images 650 together, but for hybrid stitching using photogrammetry, captured images 650 may not be fully stitched (e.g., the images may be stitched but may not be blended or composited). In particular embodiments, after the stitching process is performed to produce composite image 655, an overall set of homographies is calculated. As an example and not by way of limitation, a homography matrix correlating corresponding pairs of feature points of pairs of adjacent images may be calculated, as described above. In particular embodiments, after the homographies are calculated, the captured images 650 may be split into left and right image sets using masks or direct image segmentation. In the example of FIG. 26, captured images 650 are used to generate left image set 660 and right image set 670. As an example and not by way of limitation, each image of the captured images 650 may have a first overlap area 210 that is shared with one adjacent image and a second overlap area 210 shared with another adjacent image. A set of left images 660 may be formed by extracting the first overlap area 210 from each image of the captured images 650, and a set of right images 670 may be formed by extracting the second overlap area 210 from each image of the captured images 650. The extracted left images 660 are then stitched together using the calculated homographies to produce pseudo-stereoscopic left image 665. Similarly, the extracted right images 670 are stitched together using the calculated homographies to produce pseudo-stereoscopic right image 675. In particular embodiments, a full blending and compositing process may be performed on the left and right stitched images 665 and 675. In particular embodiments, hybrid stitching using photogrammetry may be performed by a server (e.g., stitching server 130) and the stitched images 665 and 675 may be transmitted to client device 150 by content server 140. In particular embodiments, base videos or images may be transmitted (e.g., by content server 140) along with the homographies to client device 150, and client device 150 may perform a final stitching operation.

Figure 27:
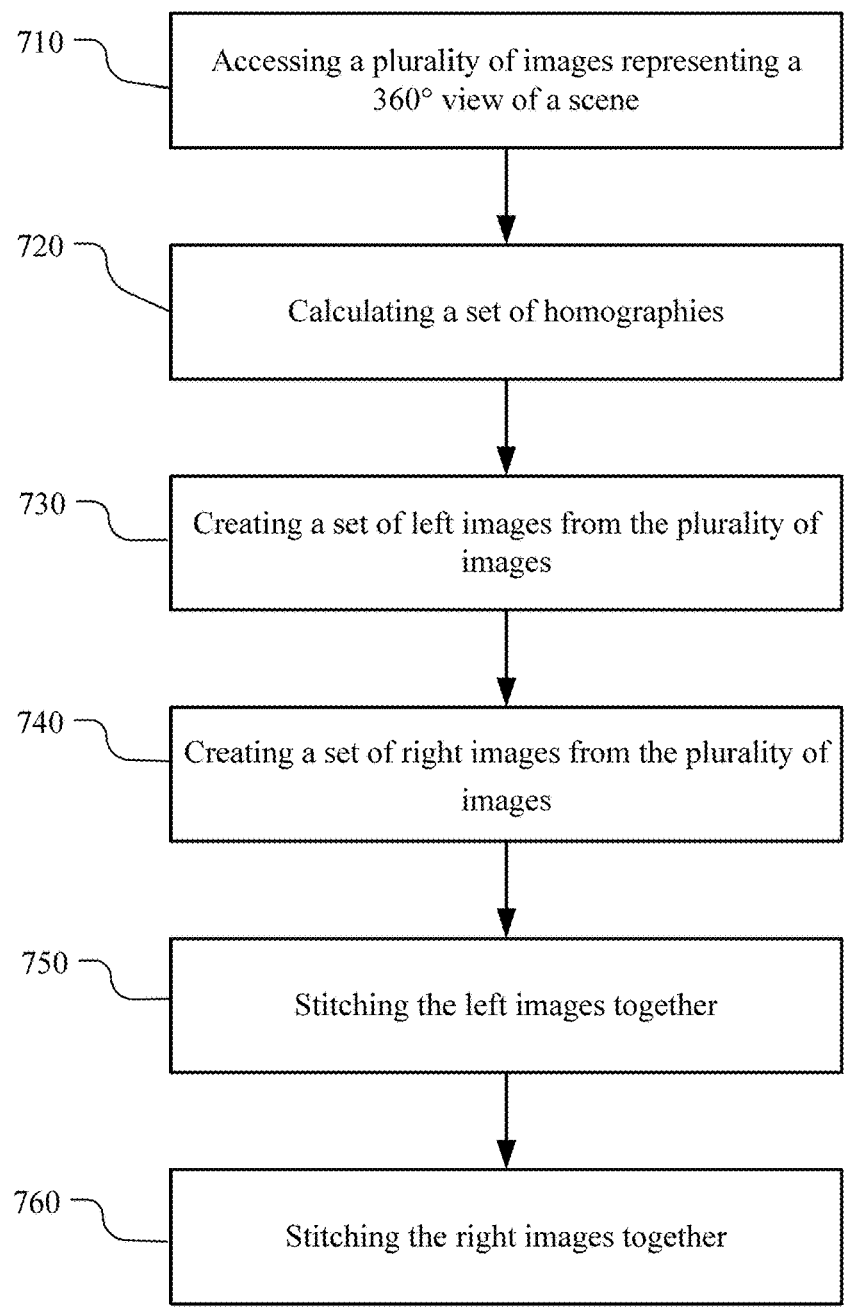
FIG. 27 illustrates an example method for reconstructing a 3-D 360° video.

FIG. 27 illustrates an example method 700 for reconstructing a 3-D 360° video. The method may begin at step 710, where a number of images representing a 360° view of a scene are accessed. As an example and not by way of limitation, the images may be captured by a set of cameras (e.g., a set of non-stereoscopic cameras), each camera oriented to capture a particular portion of the 360° scene. In particular embodiments, each image may represent a portion of the 360° scene, and each image may include a first overlap area and a second overlap area. The first overlap area may correspond to an overlap with a first adjacent image, and the second overlap area corresponding to an overlap with a second adjacent image. In particular embodiments, an overlap area of a particular image may include 50% or more of the area of the particular image. As an example and not by way of limitation, a particular image with a 1000-pixel extent in a horizontal direction may have a first overlap area that includes at least pixels 0 through 500 and may have a second overlap area that includes at least pixels 500 through 1000. At step 720, a set of homographies is calculated. In particular embodiments, a set of homographies may be calculated for each overlap area, and the homographies may be based on feature points in the overlap area. As an example and not by way of limitation, a feature point matching process, as described above, may be applied to the images representing the 360° view of the scene. At step 730, a set of left images is created from the images representing the 360° view of the scene. The set of left images may represent a first 360° view of the scene. At step 740, a set of right images is created from the images representing the 360° view of the scene. The set of right images may represent a second 360° view of the scene. In particular embodiments, the creation of the sets of left and right images may be based on a photogrammetric technique. At step 750, the left images are stitched together. In particular embodiments, the set of left images may be stitched together using the previously calculated homographies to produce a stitched 360° left image. At step 760, the right images are stitched together, at which point the method may end. In particular embodiments, the set of right images may be stitched together using the previously calculated homographies to produce a stitched 360° right image. Particular embodiments may repeat one or more steps of the method of FIG. 27, where appropriate. Although this disclosure describes and illustrates particular steps of the method of FIG. 27 as occurring in a particular order, this disclosure contemplates any suitable steps of the method of FIG. 27 occurring in any suitable order. Moreover, although this disclosure describes and illustrates an example method for reconstructing a 3-D 360° video including the particular steps of the method of FIG. 27, this disclosure contemplates any suitable method for reconstructing a 3-D 360° video including any suitable steps, which may include all, some, or none of the steps of the method of FIG. 27, where appropriate. Furthermore, although this disclosure describes and illustrates particular components, devices, or systems carrying out particular steps of the method of FIG. 27, this disclosure contemplates any suitable combination of any suitable components, devices, or systems carrying out any suitable steps of the method of FIG. 27.

Figure 28:
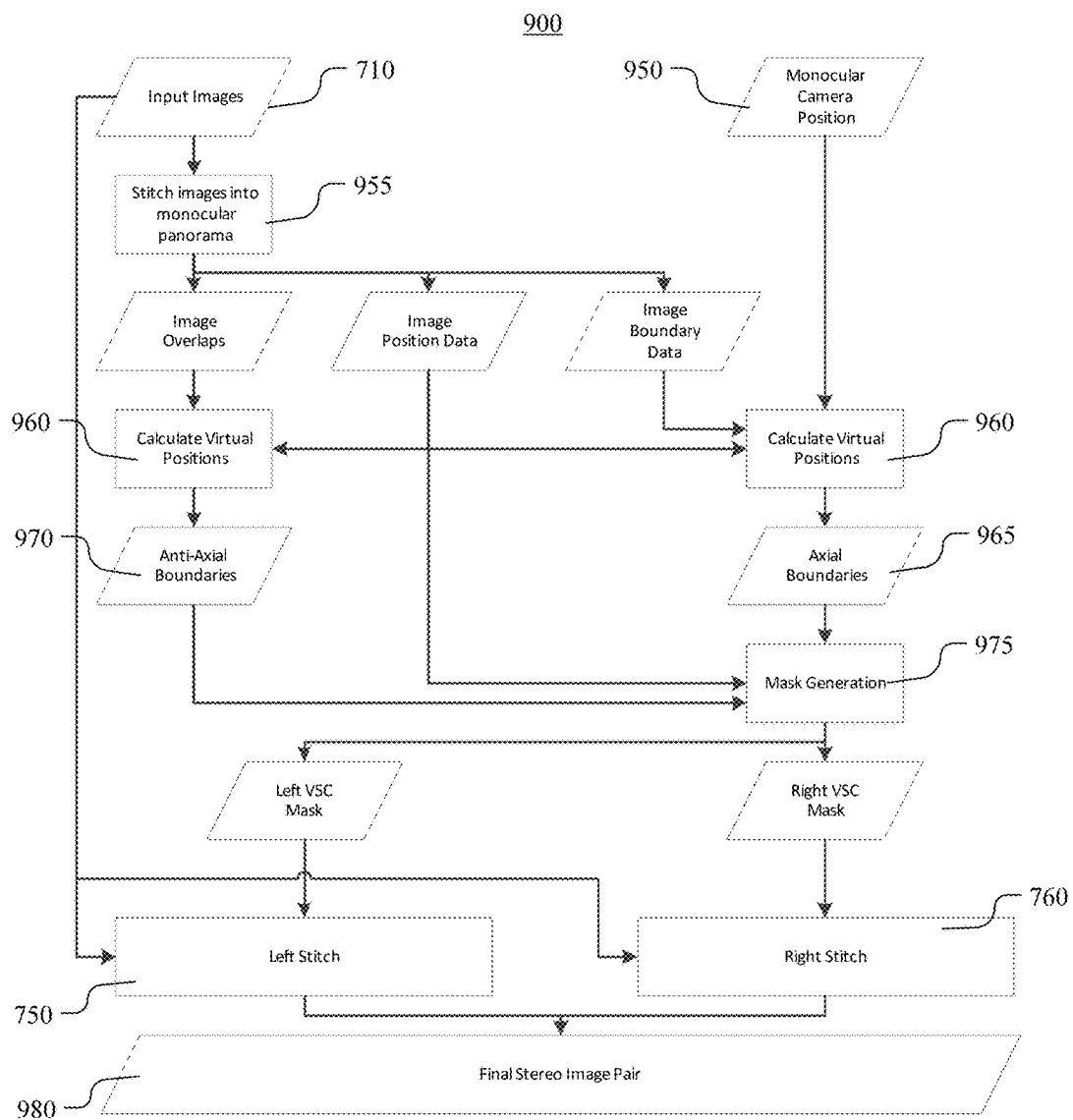
FIG. 28 illustrates another example method for reconstructing a 3-D 360° video.

FIG. 28 illustrates another example method 900 for reconstructing a 3-D 360° video. The method may begin at step 710, where a number of images representing a 360° view of a scene are accessed. As described above, the images may be captured by a set of cameras (e.g., a set of non-stereoscopic cameras), where each image may represent a portion of the 360° scene, and each image may include a first overlap area and a second overlap area. The first overlap area may correspond to an overlap with a first adjacent image, and the second overlap area corresponding to an overlap with a second adjacent image. At step 950, the position of each camera relative to its adjacent cameras, the amount of overlap between the images from adjacent cameras, and image boundary data may be received by the camera system as described above. At step 955, the images from the camera system may be stitched to form a monocular panorama image. As an example and not by way of limitation, a feature point matching process, as described above, may be applied to stitch images representing the 360° view of the scene. In particular embodiments, the received images may be segmented to create two image boundaries for a left virtual stereo camera (VSC) and a right VSC. The area of the received images may be expanded so that proper stitching overlaps exist. At step 960, virtual positions may be calculated. At step 965, segmentation of the image based on their overlap may define the axial-edge boundaries. As an example and not by way of limitation, the axial-edge boundaries may correspond to the right boundary of left VSC and the left boundary of right VSC. As an example and not by way of limitation, the left edge of the left VSC and the right edge of the right VSC are defined by the stitching lines (shown in orange) between different monocular cameras At step 970, the anti-axial boundaries of the segmented images may be determined. As an example and not by way of limitation, the anti-axial boundaries may correspond to the left edge of the left VSC and the right edge of the right VSC. In particular embodiments, the anti-axial boundaries are defined by the stitching lines or seams between different cameras.

At step 975, image masks may be generated that capture the boundaries of the received images. In particular embodiments, the image masks define what part of a monocular image belongs to the corresponding VSC. The received monocular images may be distorted to compensate the monocular images must be distorted to compensate for various positions of the objects in virtual 3-D space of the captured scene. In particular embodiments, the boundaries of the distorted images may be relatively arbitrary and difficult to define as simple lines. Instead, these boundaries are more easily captured as masks (e.g., left VSC masks and right VSC masks). At step 750, the left images are stitched together. In particular embodiments, the set of left images may be stitched together using the previously calculated VSC masks for the left images. At step 760, the right images are stitched together. In particular embodiments, the set of right images may be stitched together using the previously calculated VSC masks for the right images. At step 980, the left and right stitched images are combined to form a 3-D 360° video. Particular embodiments may repeat one or more steps of the method of FIG. 28, where appropriate. Although this disclosure describes and illustrates particular steps of the method of FIG. 28 as occurring in a particular order, this disclosure contemplates any suitable steps of the method of FIG. 28 occurring in any suitable order. Moreover, although this disclosure describes and illustrates an example method for reconstructing a 3-D 360° video including the particular steps of the method of FIG. 28, this disclosure contemplates any suitable method for reconstructing a 3-D 360° video including any suitable steps, which may include all, some, or none of the steps of the method of FIG. 28, where appropriate. Furthermore, although this disclosure describes and illustrates particular components, devices, or systems carrying out particular steps of the method of FIG. 28, this disclosure contemplates any suitable combination of any suitable components, devices, or systems carrying out any suitable steps of the method of FIG. 28.

FIG. 29 illustrates an example set of monocular images before and after a distortion operation is applied to the images. In the example of FIG. 29, images 765A, 765B, and 765C correspond to captured monocular images before applying a distortion operation, and images 767A, 767B, and 767C correspond to the images after a distortion operation has been applied. In particular embodiments, a camera system may include a set of monocular cameras, where each camera is aligned coaxially along a radius of the camera system. In particular embodiments, a set of monocular images from a monocular camera system may be combined to form stitched images that appear to be taken with a set of virtual stereo cameras, where each VSC pair (e.g., a pair of left and right VSCs) corresponds to a monocular camera. As an example and not by way of limitation, a set of monocular images may be transformed during a stitching process to produce separate left-eye and right-eye outputs. In particular embodiments, the monocular images may be segmented, as described above, based on axial-edge boundaries and anti-axial edges. In particular embodiments, a set of monocular images may be distorted to compensate for the various 3-D positions of objects in a scene. As an example and not by way of limitation, a set of images after a distortion operation has been applied may have boundaries that are not linear or boundaries that vary across two dimensions, as illustrated by the distorted images 767A, 767B, and 767C in FIG. 29. In particular embodiments, image boundaries may form masks which may define which part of a monocular image belongs to which VSC. Although this disclosure describes and illustrates particular monocular images being segmented and distorted in particular manners, this disclosure contemplates any suitable monocular images being segmented and distorted in any suitable manners.

Figure 30:
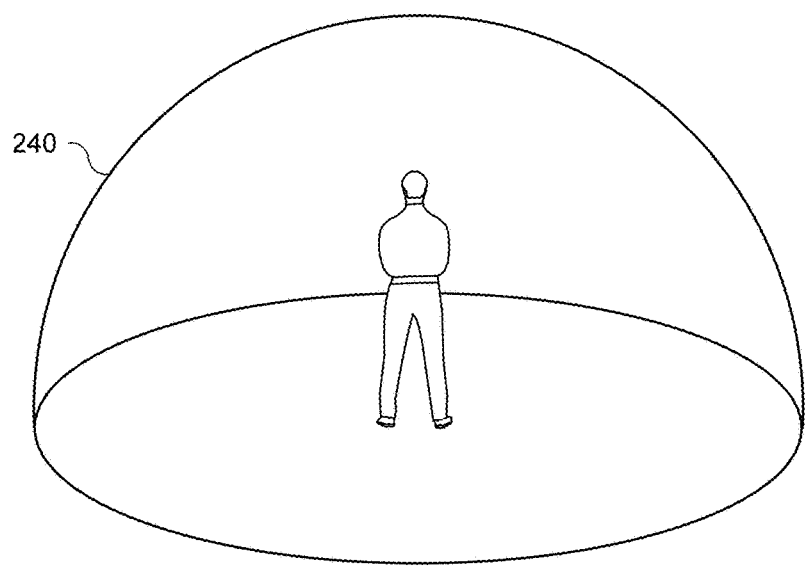
FIGS. 30-31 illustrate an example 360° stereoscopic 3-D environment.
Figure 31:
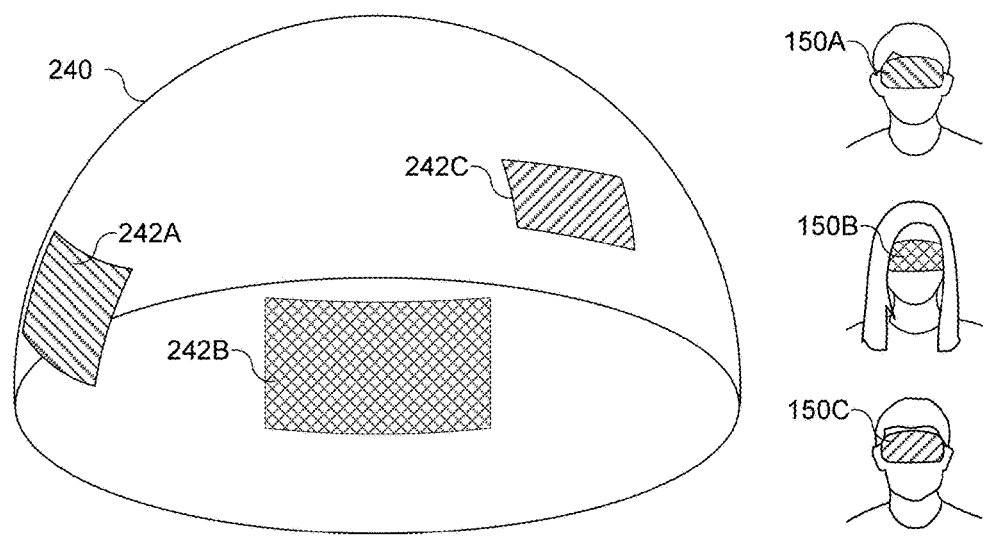

FIGS. 30-31 illustrate an example 360° stereoscopic 3-D environment. In particular embodiments, a user may experience an immersive 360° stereoscopic 3-D environment 240 through use of a 3-D capable client device. In particular embodiments, the user is surrounded by 360° stereoscopic 3-D environment 240 and the user may interact with 360° stereoscopic 3-D environment 240, as illustrated in the example of FIG. 30. Example client devices 150A-C for viewing 360° stereoscopic video may include a head-mounted display (HMD), mobile device (e.g., phone, tablet, etc.), or television. In particular embodiments, multiple users may view the 360° stereoscopic 3-D environment 240 through client devices 150A-C and independently view 360° stereoscopic 3-D environment 240 from their unique perspective 242A-C, as illustrated in the example of FIG. 31. As an example and not by way of limitation, each user may dynamically adjust their personal perspective 242A-C of 360° stereoscopic 3-D environment 240 in real-time through client devices 150A-C. Furthermore, the selected perspective 242A-C may be provided as a stereoscopic 3-D video that is captured in real-time and rendered in real-time on client devices 150A-C.

As described above, client devices 150A-C may describe the orientation of each user to the content server 140 providing the 360° stereoscopic 3-D video. In particular embodiments, client devices 150A-C may include an inertial measurement unit (IMU) that may be used to rotate or control perspective 242A-C. Furthermore, client devices 150A-C may determine the orientation of each user based on inertial measurements, such that the 360° stereoscopic 3-D environment 240 may be rendered to properly align with left and right eyes of each user. As an example and not by way of limitation, the IMU may include a gyroscope, accelerometer, or a combination thereof. In particular embodiments, an accelerometer may be used to ascertain a gravity vector and align 360° stereoscopic 3-D environment 240 to a global vertical axis of the user. As another example, the parallax of the displayed perspective 242A-C may be adjusted based on the relative position of the user to a display. In particular embodiments, faster sampling of the inertial measurement sensors may result in greater accuracy and precision when calculating of motion of the client devices 150A-C. In particular embodiments, control of the use of the automatic motion calculation from the IMU may be toggled. In particular embodiments, the content server 140 may provide access to the 360° stereoscopic 3-D environment 240 in an interactive way based on input from the user as described above. As an example and not by way of limitation, perspectives 242A-C may each correspond to a particular view, or perspective, of 360° stereoscopic 3-D environment 240 that is made up of multiple views, or perspectives. Thus, as described more fully herein, a client device may display a particular view of a panoramic (such as 360°) scene, and that scene may be divided into multiple views, each of which may be viewed by the user as, e.g., the user turns her head. This disclosure contemplates that views may be continuous, such that a view is simply whatever is displayed to the user, and the user can adjust the display continuously, e.g., by turning her head. In particular embodiments, the content server 140 may select the frames from the high-resolution stream based on the orientation of the user and may transmit selected frames to client devices 150A-C. The content server 140 may predict direction of motion of client devices 150A-C and transmit additional frames based on the predicted direction of motion.

In particular embodiments, client devices 150A-C may be a smartphone or tablet that has a horizontal or vertical reference plane to rotate around their own center of motion. Since the user is likely to rotate around their own center of motion rather than the center of the device, rotation must take translation into account in such cases. Panning can be supported simultaneously with motion control to allow the user to set a horizontal or vertical reference plane. Alternatively, gravity vector sensing can be used to automatically set these planes. In particular embodiments, the users may manually establish the vertical plane for the 360° stereoscopic 3-D video. As an example and not by way of limitation, perspective 242A-C may be rotated by panning client devices 150A-C. In particular embodiments, the user may perform gestures on a touchscreen of the phone or tablet to interact with the 360° stereoscopic 3-D video. As an example and not by way of limitation, a pinch gesture may increase the zoom of the perspective 242A-C being rendered on client devices 150A-C.

In particular embodiments, a peripheral device may be paired with client devices 150A-C. As an example and not by way of limitation, the peripheral device may be a remote control, mobile phone, tablet computer, joystick, touchpad, stylus, or wearable device. Furthermore, the pairing may be performed via radio frequency (RF), optical transmission, BLUETOOTH, WI-FI, or wired connection. As an example and not by way of limitation, input from a joystick or game controller may be used to pan perspectives 242A-C. In particular embodiments, the peripheral device may include a positional tracking system (e.g., PLAYSTATION MOVE or WII REMOTE) and position or rotational tracking may be used to modify perspectives 242A-C. As another example, a touchpad or joystick may be used to enter "mouse gestures" that pull up visual menus or carry out certain functions. In particular embodiments, the peripheral device may be a remote control and perspectives 242A-C may be changed through movement of a remote control based on accelerometer or gyroscope data. As another example, zoom in or zoom out may be affected by using bi-directional buttons of the remote control. As another example, the user may rotate perspectives 242A-C using arrow keys of the remote control. In particular embodiments, the peripheral device may include a particular button that may be used to return perspectives 242A-C to a known safe setting, thereby allowing the user to situate themselves easily. If zoom or other controls are required, bi-directional buttons (such as channel control) can be mapped to these function.

In particular embodiments, a peripheral device may be paired with a HMD to adjust perspectives 242A-C. As an example and not by way of limitation, the peripheral device (e.g., a remote control or game controller) may include physical textures to guide the user to local buttons or controls. Furthermore, the peripheral device may include a tag (active or passive) that allows an external camera to locate the peripheral device and show a representation of it in perspectives 242A-C. In particular embodiments, the virtual representations of the peripheral device may not be an exact representation. For example, some portions (e.g., buttons or switches) may be accurately rendered, while extensions may be made to the peripheral device to imbue the peripheral device with additional capabilities. As another example, the peripheral device may use touch sensing that allows the peripheral device to provide inputs to client devices 150A-C when the user is touching the buttons. In particular embodiments, the peripheral device may be one or more attachable sensor stickers attached to a real-world object. As an example and not by way of limitation, left-arrow functioning sticker may be placed on the left side of an object (e.g., a tissue box) and a right-arrow function sticker on the right side of the object. Tapping on each side of the object may navigate through the video content.

In particular embodiments, the peripheral device may be a wearable device paired with client devices 150A-C. As an example and not by way of limitation, the peripheral device may be one or more gloves with tactile feedback. When the user touches a virtual object, the gloves send a haptic feedback (e.g., texture, feeling, or temperature) associated with the object. In particular embodiments, the peripheral device may be a smartwatch and movement of the smartwatch may control the spatial navigation of perspectives 242A-C. Movement may be detected by an IMU (e.g., accelerometer or gyroscope), geo-magnetic sensor, or barometer. For example, when user points a finger, perspective 242A-C may move forward. As another example, rotating or dialing the smartwatch may move the 360° stereoscopic 3-D video backward or forward in time. As another example, a movement of the smartwatch may move perspective 242A-C to a different locations or advance 360° stereoscopic 3-D video to the next chapter. In particular embodiments, the peripheral device may be a ring worn on a finger of the user. As an example and not by way of limitation, the user may change perspectives 242A-C through a rotational element on a side of the ring. As another example, the rotational element may control the playback rate of the 360° stereoscopic 3-D video. In particular embodiments, the ring may include a physical button or capacitive sensor for user input. As an example and not by way of limitation, the user may push the button to perform a select operation. As another example, the user may perform a swiping gesture on the capacitive sensor to control perspectives 242A-C. In particular embodiments, the ring may perform movement sensing using an accelerometer, barometer, gyroscope, or geomagnetic sensor, and use finger with the ring to control the navigation of perspectives 242A-C.

In particular embodiments, the smartphone or tablet may include a user-facing camera and user input may be provided by tracking eye movements of the user. As an example and not by way of limitation, the user may navigate the 360° stereoscopic 3-D video or a user interface (UI) based on the amount or duration of the blinking. As another example, particular commands may be performed in response to the user directing their eyes to a particular portion of perspective 242A-C and hold their eye position for a pre-determined amount of time. As another example, the UI may perform a particular action based on the user having one eye closed and the other eye open.

In particular embodiments, a stylus may be used in conjunction with a tablet or smartphone to interact or control the 360° stereoscopic 3-D video. As an example and not by way of limitation, a stylus may be used to draw, annotate, or select parts of 360° stereoscopic 3-D environment 240. For example, the user may perform a "lasso" selection by tracing the outline of an object of the 360° stereoscopic 3-D video with the stylus tip. As another example, the stylus may be a "mouse-like" controller when paired with client device 150A-C.

In particular embodiments, the client device may provide a UI that allows the user to interact with the 360° stereoscopic 3-D video. In particular embodiments, the IMU of client devices 150A-C may use motion of the user's head to interact with the UI (e.g., nod or shake their head to confirm or deny actions). As an example and not by way of limitation, the UI may use the sides of perspective 242A-C to display menu items or activate various capabilities. For example, if the center of perspective 242A-C includes the main video content, the sides or back of perspective 242A-C may include controls that the user may look at to activate. As another example, the UI may horizontally organize different video footage. The user may navigate through the video footage by rotating the head horizontally. Furthermore, by looking up or down, the user may expand selected footage frame by frame. As another example, tilting the head of the user may lead to a tilt of perspective 242A-C. As another example, the UI may open the menu of actions based on detecting a downward head movement performed by the user.

In the case where client devices 150A-C is a HMD, the user's vision may be occluded and the user may interact with 360° stereoscopic 3-D environment 240 without visibility of the hand or real-world environment. In particular embodiments, the HMD may include an outward-facing camera that may be used to track a skeleton of the user's hand to produce a pointer or virtual image of a hand. As an example and not by way of limitation, the user may interact with the UI using gestural interactions captured by the outward-facing camera. In particular embodiments, client devices 150A-C may include electrodes in contact with the head. As an example and not by way of limitation, one or more electrodes may be built into an edge of a HMD device to make contact with areas near the prefrontal cortex at the front of the user' head.

As an example, the UI may include a brain-computer interface (BCI) that captures electrical activity in the brain to interact with the 360° stereoscopic 3-D environment 240. Furthermore, client devices 150A-C may infer the user's mood or commands and adjust the content or perspective 242A-C, accordingly.

In particular embodiments, client devices 150A-C may include a depth and image sensor combination to capture movement of the user's extremities (e.g., hands or feet) in 3-D. As an example and not by way of limitation, the sensor may be part of a KINECT-like system. As another example, client devices 150A-C may use a pair of cameras facing the user to segment the user's hand and ascertain its 3-D position through triangulation. In particular embodiments, a UI of client devices 150A-C may recognize particular gestures from the captured movement of the hands of the user. Furthermore, the UI may provide direct control over a set of pointers through the captured movement of one or both hands of the user. As an example and not by way of limitation, the captured hand movements may allow the user to play games, interact with other virtual content, or annotate the virtual landscape. As another example, the user can also use gestures to, for example, pause or run the 360° stereoscopic 3-D video, access controls such as rewind, fast forward, or volume, or transfer to a different virtual scene or area. For example, the UI may allow the user to move or frame a portion of the 360° stereoscopic 3-D video by holding up their hands. In particular embodiments, control of the 360° stereoscopic 3-D video may be done through virtual controls of the UI (e.g., a virtual button or slider) that are "touched" by the user or by using gestures without virtual controls.

As an example and not by way of limitation, the UI may highlight or select a virtual item based on recognizing movement of a finger or hand tracing the outline of displayed virtual objects. For example, the UI may provide a special effect to distinguish the selected object from the other unselected objects in perspective 242A-C. As another example, the UI may recognize the movement of four fingers as corresponding to an input on a virtual QWERTY keyboard or controller panel. For example, the UI may provide virtual sticky notes on perspectives 242A-C based on input on the virtual keyboard. As another example, the UI may perform a select or click operation in response to detecting movement of two thumbs. Furthermore, the user may select a letter by the tapping on virtual keyboard and the camera tracks the movement. As another example, the UI may associate a pointing gesture as a command to advance the 360° stereoscopic 3-D video to a next recording point. As another example, the UI may zoom in or zoom out of the perspective 242A-C based on detecting a change distance between the hands of the user. As another example, the UI may zoom in on perspective 242A-C based on capturing two hands forming the shape of a telescope.

As another example, the UI may remove a portion of 360° stereoscopic 3-D environment 240 to reveal a phone camera feed in response to the captured hand movement corresponding to a peeling back gesture. As another example, the UI may open a menu of actions based on detecting a hand swipe gesture. As another example, the UI may display a see-through perspective 242A-C by wiping away the nearest perspective 242A-C using a swipe gesture. As another example, the UI may support defining an area to crop of perspective 242A-C based on an area defined by extend hands of the user. The cropped area may be collaged with sections from recordings or live streaming of 360° stereoscopic 3-D video. As another example, the UI may switch between streamed content to camera feed when the user actuates a virtual button or performs a particular gesture. In particular embodiments, the UI may perform an action based on the movement of the user based on depth and image sensor data. As an example and not by way of limitation, a step movement by the user may open a notification, while a kick motion may dismiss the notification.

In particular embodiments, cameras or depth cameras may be used to pull in objects from the user's "real-world" environment into perspective 242A-C. As an example and not by way of limitation, the user may be in their living room, and using a HMD be virtually transported to a beautiful beach, while still seeing their sofa, coffee table and a drink on the coffee table. In particular embodiments, the UI may use real-world objects that are augmented into perspective 242A-C as virtual controls for perspectives 242A-C. In particular embodiments, the user may interact with perspective 242A-C through a peripheral device connected to client devices 150A-C. In particular embodiments, the peripheral device or client devices 150A-C may include a microphone to manipulate the UI or perspectives 242A-C. As an example and not by way of limitation, the user may say phrases such as "open my email" for the UI to display content to the user. As another example, the user may say a phrase such as "where is this" and the UI may display a map and mark the location on the map. As another example, the user may say phrases such as "pause" or "start" to manipulate the playback of the 360° stereoscopic 3-D video.

As described above, the 360° stereoscopic 3-D video may provide an immersive experience. As an example and not by way of limitation, the UI for the 360° stereoscopic 3-D video may perform actions based on the user's interaction with virtual objects. For example, the user may drop a virtual ball to mark their current location within the immersive environment. As another example, when you receive a message, there is a ball in a virtual pocket of the user or virtual letter on the UI. As another example, the UI may provide virtual pins to mark different portions of perspectives 242A-C. In particular embodiments, the UI may include an archiving artificial intelligence to curate different 360° stereoscopic 3-D videos. In particular embodiments, 360° stereoscopic 3-D environment 240 may be augmented to display information based on the data or metadata of the 360° stereoscopic 3-D video. As an example and not by way of limitation, the UI may provide a summary of the history of Venice based on the user watching a 360° stereoscopic 3-D video of Venice based on image analysis of the video or location data. As another example, the UI may display icons on top of the objects of perspectives 242A-C. When user interacts with an icon, the UI may display a more detailed view or information. As another example, the UI may allow the user to provide comments via voice, type, or keyboard to augment real-time 360° stereoscopic 3-D video. As another example, the UI may display a phone menu inside of perspective 242A-C in response to receiving an incoming call.

In particular embodiments, the UI may allow the user to select an object, person, or space on live streaming or pre-recorded 360° stereoscopic 3-D video and perspective 242A-C may switch to another perspective 242A-C. As an example and not by way of limitation, the UI may show a closer, optimized perspective 242A-C of a selected object, person, or space. In particular embodiments, the UI may provide a time overlay of 360° stereoscopic 3-D video of a particular site or landmark. As an example and not by way of limitation, the UI may allow the user to augment the 360° stereoscopic 3-D environment 240 with another 360° stereoscopic 3-D video of objects (e.g., people or buildings) from an earlier time. For example, a 360° stereoscopic 3-D video of current-day Machu Picchu may be rendered by client devices 150A-C and the UI may allow the user to augment 360° stereoscopic 3-D environment 240 with a 360° stereoscopic 3-D video of people and buildings from the Incan era. In particular embodiments, the UI may provide overlapping transition of 360° stereoscopic 3-D video by different times or different perspectives 242A-C. As an example and not by way of limitation, 360° stereoscopic 3-D environment 240 may be within an art gallery. Multiple users may display their artwork on a blank real-life wall and the artwork may be rendered on the art gallery wall. As another example, the UI may provide the user with a virtual shopping experience, where the user may check the actual condition or products by visiting the store rendered as 360° stereoscopic 3-D environment 240.

In particular embodiments, client devices 150A-C may reconstruct the audio environment associated with the 360° 3-D video using audio reconstruction data from the content server 140 described above. Client devices 150A-C may have the ability to provide headphone output or may instead use surround sound output capabilities of the client device (e.g., surround audio on a 3-D TV). As an example and not by way of limitation, the audio may be spatially anchored to the scene, such that when the user turns their head, the audio has a corresponding change in tone, volume, etc. As another example, the user may control a particular section of the audio environment. For example, the user may perform a particular input on an object (e.g., a character) in their perspective 242A-C and the audio associated with the object be muted or enhanced.

Figure 32:
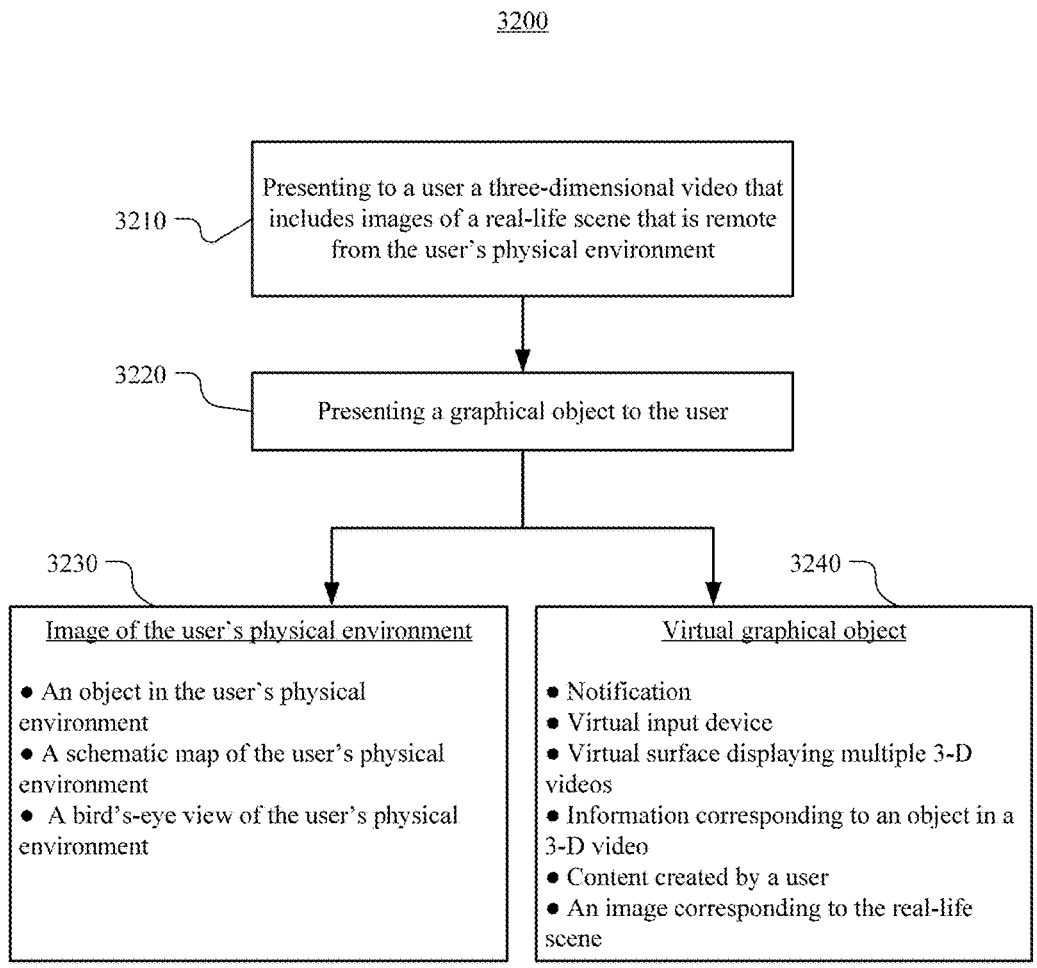
FIG. 32 illustrates an example method for interacting with a 3-D video.

FIG. 32 illustrates an example method 3200 for interacting with a 3-D video. The method may begin at step 3210 where a three-dimensional video that includes images of a real-life scene that is remote from the user's physical environment is presented to a user on a display of a head-worn client computing device. At step 3220, a graphical object is presented to the user on the display of the head-worn client computing device. In particular embodiments, the graphical object may include an image of the user's physical environment 3230 or a virtual graphical object 3240. As an example and not by way of limitation, an image of the user's physical environment 3230 may include an object (e.g., a person, an animal, or a piece of furniture) in the user's physical environment, a schematic map of the user's physical environment, or a bird's-eye view of the user's physical environment. As another example and not by way of limitation, a virtual graphical object 3240 may include a notification, a virtual input device, a virtual surface displaying multiple 3-D videos, information corresponding to an object in a 3-D video, content created by a user, or an image corresponding to the real-life scene. In an alternative embodiment, the user's physical environment may be presented to the user on a display of a head-worn client computing device, and a three-dimensional video that includes images of a real-life scene that is remote may also be presented to the user. In yet another embodiment, any suitable combination of a three-dimensional video that includes images of a real-life scene that is remote and the user's physical environment may be presented to the user on the display of a head-worn client computing device. Particular embodiments may repeat one or more steps of the method of FIG. 32, where appropriate. Although this disclosure describes and illustrates particular steps of the method of FIG. 32 as occurring in a particular order, this disclosure contemplates any suitable steps of the method of FIG. 32 occurring in any suitable order. Moreover, although this disclosure describes and illustrates an example method for interacting with a 3-D video including the particular steps of the method of FIG. 32, this disclosure contemplates any suitable method for interacting with a 3-D video including any suitable steps, which may include all, some, or none of the steps of the method of FIG. 32, where appropriate. Furthermore, although this disclosure describes and illustrates particular components, devices, or systems carrying out particular steps of the method of FIG. 32, this disclosure contemplates any suitable combination of any suitable components, devices, or systems carrying out any suitable steps of the method of FIG. 32.

Figure 33:
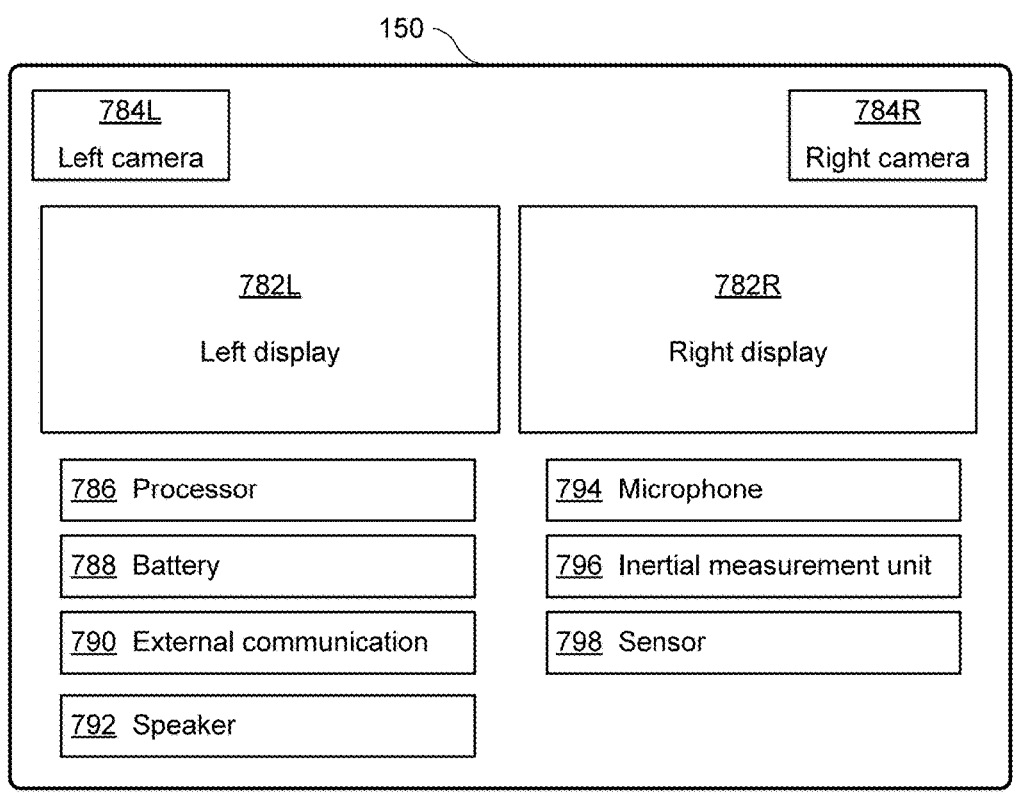
FIG. 33 illustrates a block diagram of an example head-worn client computing device.

FIG. 33 illustrates a block diagram of an example head-worn client computing device 150. In particular embodiments, a head-worn client computing device 150 may be referred to as a client system 150, a client device 150, or a head-mounted display (HMD). In particular embodiments, client system 150 may be worn by a user on or around the user's head. In particular embodiments, client system 150 may include one or more displays. As an example and not by way of limitation, client system 150 may include a single display that is partitioned into left and right sides for displaying left and right images, respectively, of a 3-D scene to a user while wearing client system 150. In the example of FIG. 33, client system 150 includes a left display 782L and a right display 782R, and the two displays may be used to present a 3-D video to a user. In particular embodiments, client system 150 may include one or more cameras. As an example and not by way of limitation, client system 150 may include one or more cameras facing outward or away from a user's head, and the cameras may be used to capture one or more images of the user's physical environment. In the example of FIG. 33, client system 150 includes a left camera 784L and a right camera 784R. The two cameras 784L and 784R may be used to capture stereoscopic images or videos of the user's physical environment, and these images or videos may be displayed to the user on displays 782L and 782R.

In particular embodiments, client system 150 may include one or more processors 786. As an example and not by way of limitation, processor 786 may perform stitching operations on images received from content server 140 by client system 150. In particular embodiments, client system 150 may include a battery 788 (e.g., a rechargeable battery) for providing power to the client system 150. In particular embodiments, client system 150 may include an external-communication module 790, such as for example a module that communicates wirelessly using a WI-FI or BLUETOOTH protocol. As an example and not by way of limitation, external-communication module 790 may communicate wirelessly with content server 140 or may communicate wirelessly with an Internet-connected computing device that communicates with content server 140. In particular embodiments, client system 150 may include one or more speakers 792. As an example and not by way of limitation, speaker 792 may directly produce an audible sound that a user can hear, or speaker 792 may supply a signal (e.g., a BLUETOOTH signal) to headphones that produce audible sounds. In particular embodiments, client system 150 may include one or more microphones 794. As an example and not by way of limitation, microphone 794 may be used to receive verbal commands from a user. As another example and not by way of limitation, microphone 794 may be used to receive or detect audio signals from a user's physical environment (e.g., the sound of a person speaking to the user; the sound of a doorbell; or the sound of the user's dog barking). In particular embodiments, client system 150 may include one or more inertial measurement units (IMUs) 796 to determine an orientation or a movement of client system 150. In particular embodiments, client system 150 may include one or more sensors 798. As an example and not by way of limitation, client system 150 may include one or more depth sensors 798 to determine or detect the location of objects in a user's physical environment (e.g., to detect the approach of a person towards the user). Although this disclosure describes and illustrates particular head-worn client computing devices that include particular components, this disclosure contemplates any suitable head-worn client computing devices that include any suitable components.

Figure 34:
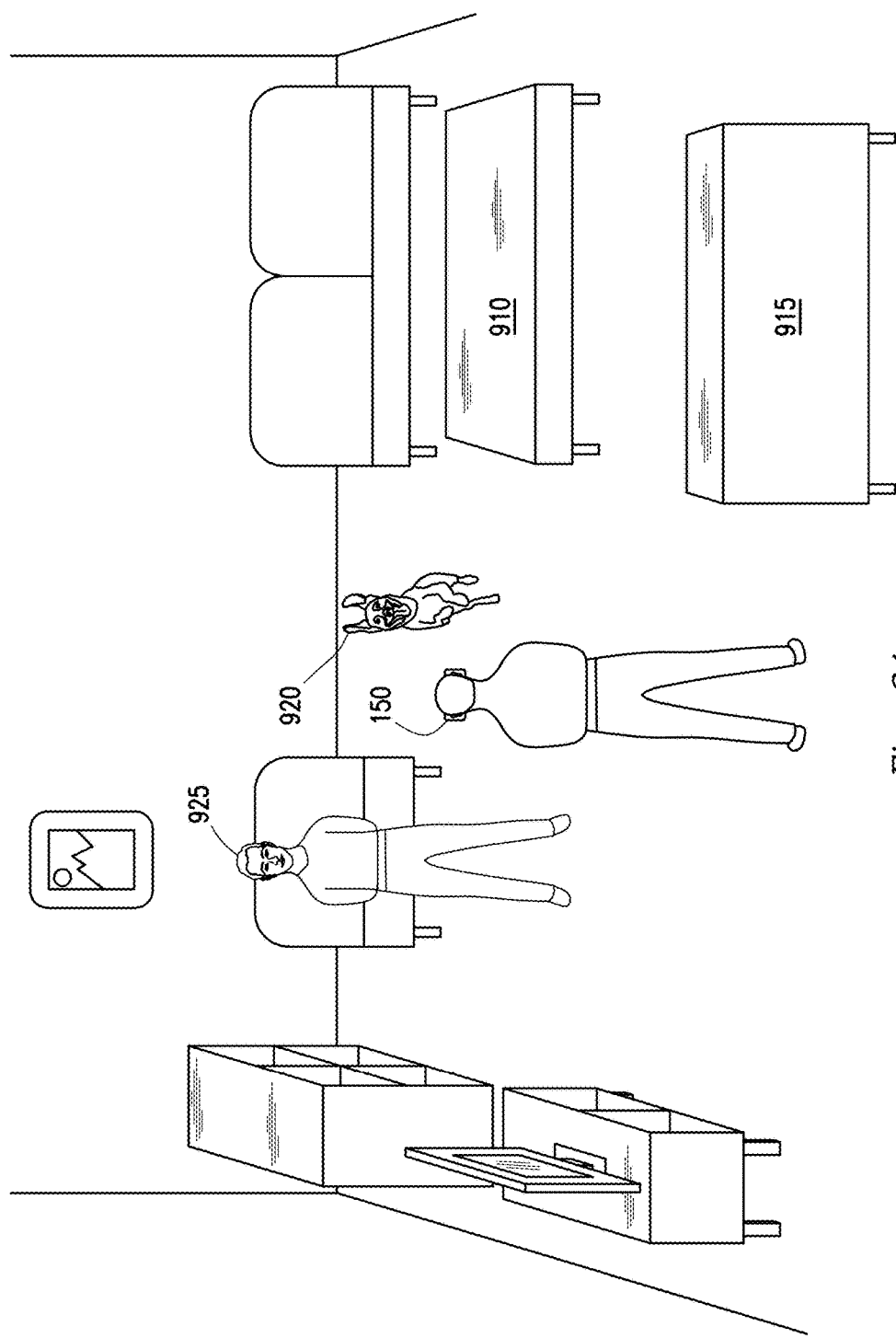
FIG. 34 illustrates a user standing in a room while wearing an example head-worn client computing device.

FIG. 34 illustrates a user standing in a room while wearing an example head-worn client computing device 150. In particular embodiments, a user may view a 3-D video presented on client system 150, where the 3-D video includes images of a real-life scene that is remote from the user's physical environment. In particular embodiments, a user's physical environment may include one or more objects (e.g., furniture, walls, stairs, doors), animals, or people located near the user, located in the same room as the user, or located within a particular distance of the user (e.g., within 1 meter, 3 meters, 5 meters, 10 meters, or within any suitable distance). In the example of FIG. 34, the user is viewing a scene presented on client system 150 while standing in a room, and the user's physical environment includes furniture (e.g., table 910 and shelf 915), a dog 920, and another person 925.

Figure 35:
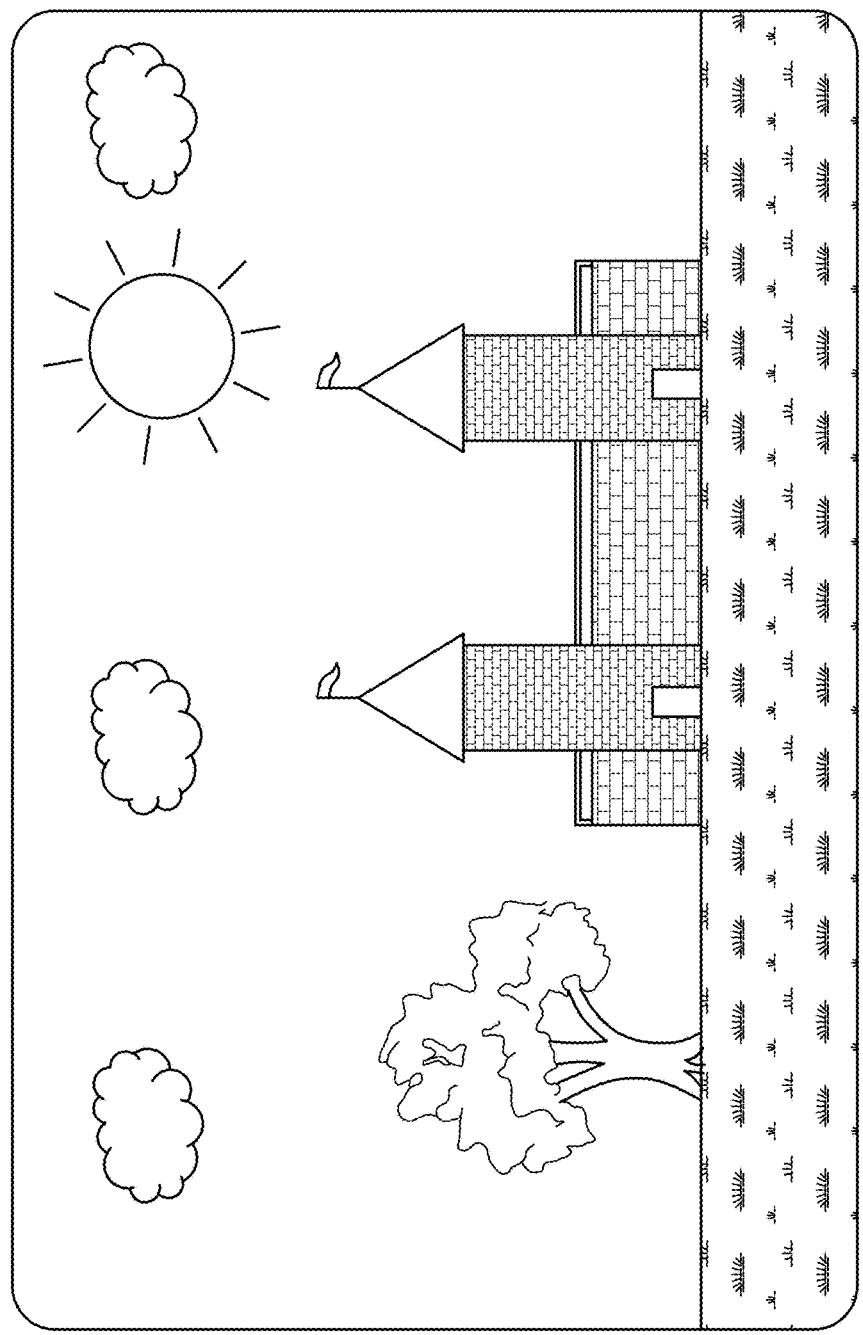
FIG. 35 illustrates an example scene viewed by a user while wearing a head-worn client computing device.

FIG. 35 illustrates an example scene viewed by a user while wearing a head-worn client computing device 150. In particular embodiments, a scene viewed by a user may include a 3-D image or a 3-D video. In the example of FIG. 35, the scene displayed to the user on client system 150 includes a castle, a tree, and a sunny sky. The user may be located at home in his living room while wearing client system 150 to view a travel video that describes the castles of Europe.

Figure 36:
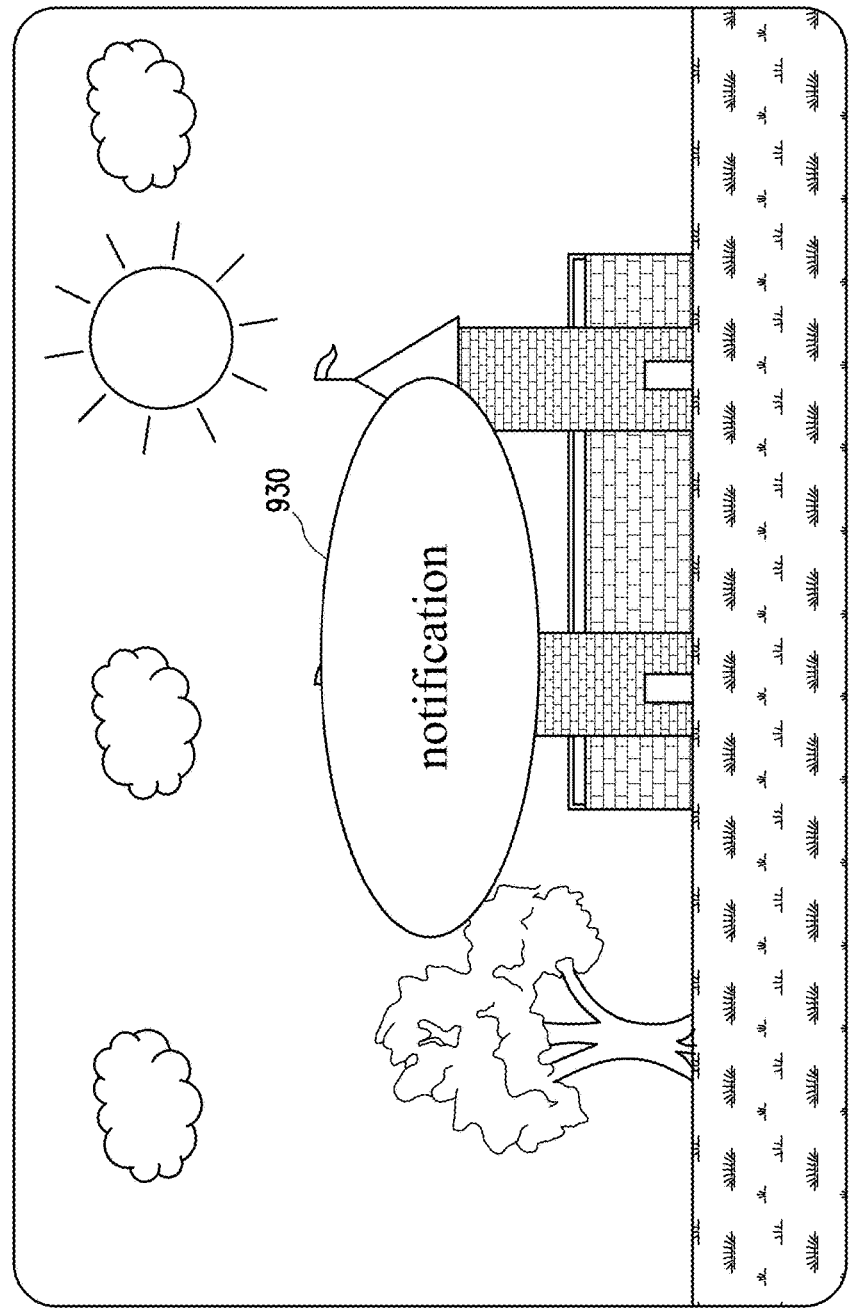
FIG. 36 illustrates the example scene of FIG. 35 with an example notification.

FIG. 36 illustrates the example scene of FIG. 35 with an example notification 930. In particular embodiments, client system 150 may present to a user a 3-D scene and a virtual graphical object. In particular embodiments, a virtual graphical object may include a notification 930, a virtual input device (e.g., a virtual keyboard, a virtual pen, or a virtual control panel), a virtual surface displaying multiple 3-D videos, information corresponding to an object in a 3-D video, content created by a user (e.g., text or a drawing), or an image corresponding to a real-life scene. As an example and not by way of limitation, a virtual graphical object with historical information about a castle may be overlaid onto a 3-D video of a castle. As another example and not by way of limitation, a virtual graphical object may include an image of a historical site (e.g., a castle as it may have appeared centuries ago) superimposed over a real-life scene of the historical site (e.g., the ruins of the castle as it appears today). In the example of FIG. 36, client system 150 is displaying a scene of a castle with notification 930 overlaid over the scene. In particular embodiments, notification 930 may be displayed in any suitable format, such as for example, overlaid or superimposed over part or all of a scene, near the center of a scene, or off to one side of a scene. In particular embodiments, notification 930 may be opaque and may block out a portion of the scene located behind the notification 930, or notification 930 may be semi-transparent allowing the scene located behind the notification to be viewed, at least partially. In particular embodiments, notification 930 may include a message from another user or from an application. As an example and not by way of limitation, notification 930 may include a portion of an email, voicemail, or text message sent to the user by another user, or an indication that the user has received an email, phone call, or text message. As another example and not by way of limitation, notification 930 may include a message from client system 150 or an application running on client system 150, such as for example a message that the user's doorbell has rung, that a person 925 is approaching the user, that the user's dog 920 is barking, that the user's dog 920 is approaching, or that battery 788 is running low and needs to be recharged. Although this disclosure describes and illustrates particular notifications that include particular information displayed in particular formats, this disclosure contemplates any suitable notifications that include any suitable information displayed in any suitable formats.

Figure 37:
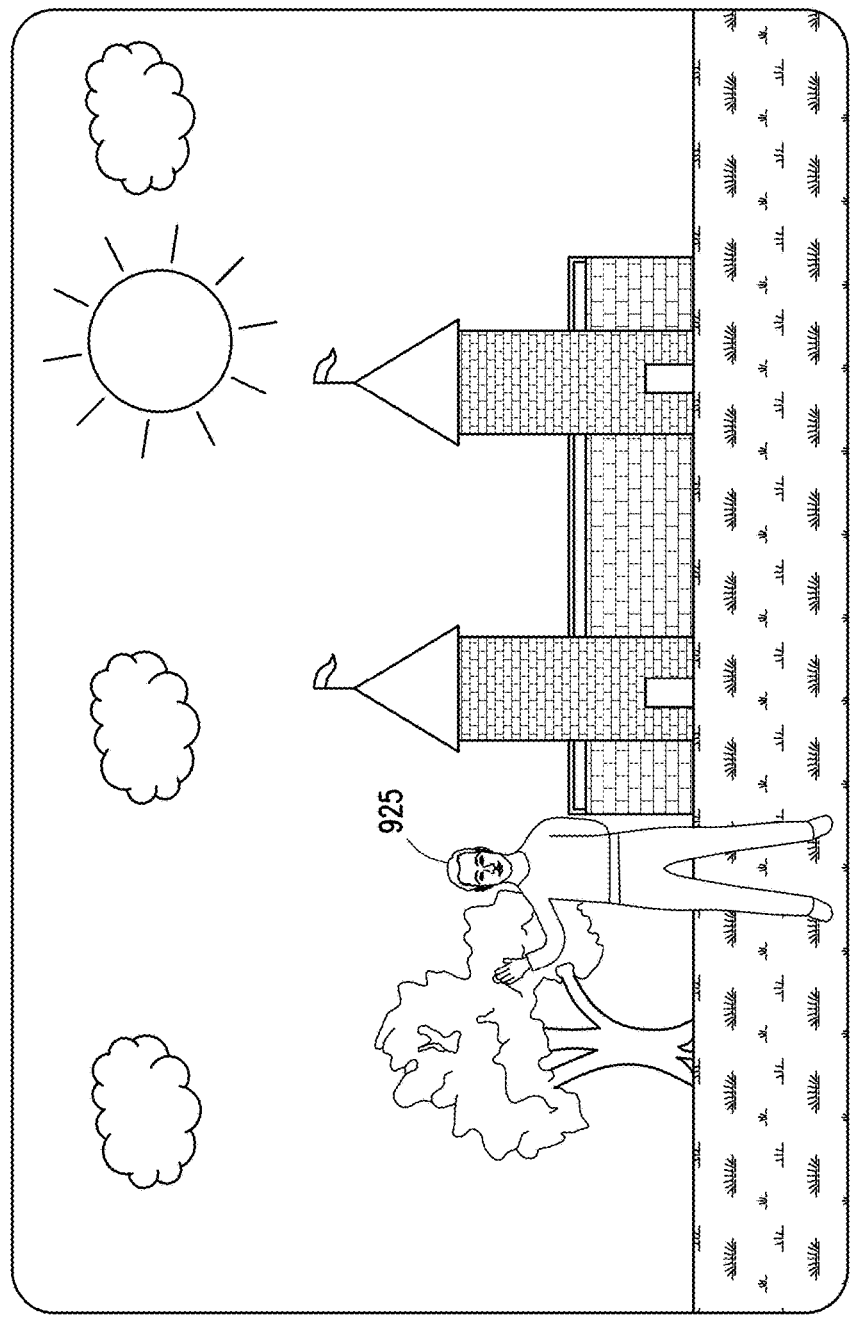
FIG. 37 illustrates the example scene of FIG. 35 with a person superimposed on the scene.

FIG. 37 illustrates the example scene of FIG. 35 with a person 925 superimposed on the scene. In particular embodiments, client system 150 may present to a user a 3-D scene and an image of the user's physical environment. As an example and not by way of limitation, client system 150 may include an image sensor (e.g., one or more cameras, such as for example, left camera 784L and right camera 784R), and an image of the user's physical environment captured by the image sensor may be combined with a 3-D video and presented to the user. In particular embodiments, client system 150 may receive an indication that an event occurred in the user's physical environment, and based on the event, client system 150 may present to the user an image of at least a portion of the user's physical environment. As an example and not by way of limitation, an event may include an aspect of the user's physical environment, such as for example a distance between the user and an object, a speed of an object, or a particular gesture performed by the user or by another person. In the example of FIG. 37, person 925 is facing the user and waving at the user, and an image of person 925 (as captured by a camera of client system 150) is superimposed over the 3-D scene of the castle. The image of person 925 waving at the user is extracted from the remaining portion of the image captured by a camera of client system 150, and only the extracted portion is presented to the user. In particular embodiments, presenting an image of the user's physical environment may allow the user to continue viewing a 3-D scene while also interacting with or being aware of their physical environment. As an example and not by way of limitation, a user may not need to remove client system 150 from their head in order to view an event that is occurring in the user's physical environment. In the example of FIG. 37, the user may be able to interact with person 925 while still wearing client system 150.

Figure 38:
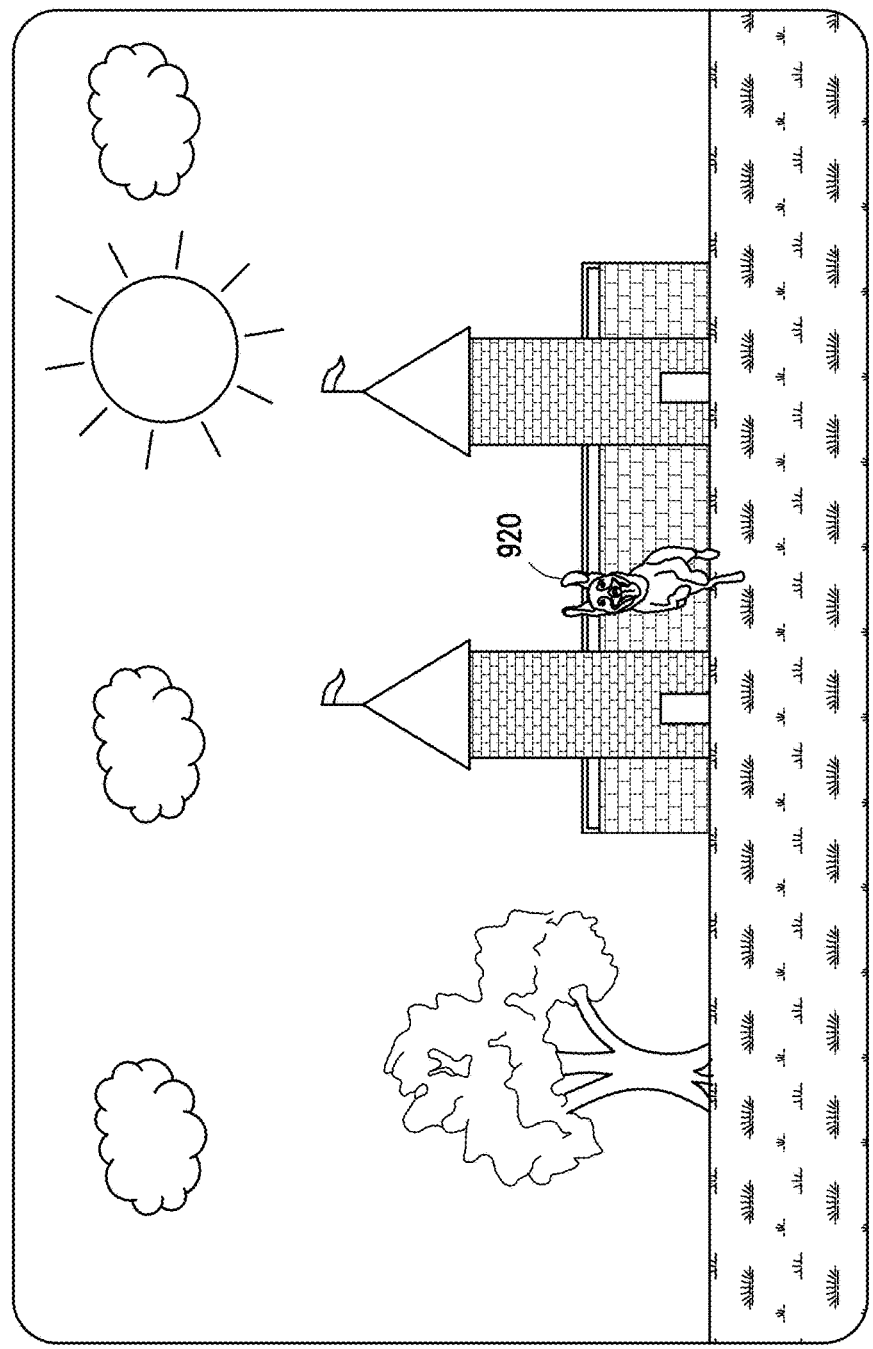
FIG. 38 illustrates the example scene of FIG. 35 with a dog superimposed on the scene.

FIG. 38 illustrates the example scene of FIG. 35 with a dog 920 superimposed on the scene. In particular embodiments, an object from a user's physical environment may be displayed to a user when the object is approaching the user at or above a particular speed or when the object is located within a particular distance of the person. In particular embodiments, displaying an object from a user's physical environment may allow the user to avoid running into or tripping over the object. In FIG. 38, the dog 920 may be approaching the user at or above a particular speed, or the dog may be located within a particular distance of the person. The image of the dog 920 may be captured by a camera of client system 150, and the image of the dog may be extracted from its surrounding and superimposed onto a 3-D video. In particular embodiments, an object from a user's physical environment may be displayed to a user in a location that approximately corresponds to its location in the user's physical environment. In FIG. 38, the dog 920 is shown in a location that corresponds to the dog 920's location in the user's physical environment.

In particular embodiments, client system 150 may receive an indication that an event occurred in the user's physical environment, where the event includes a sound. In particular embodiments, a sound corresponding to an event may include one or more audible words. As an example and not by way of limitation, a user wearing client system 150 may speak a verbal command that is received by a microphone 794. The user may speak a command "camera" or "display room," and in response, client system 150 may display an image of the user's physical environment. In the example of FIG. 37, person 925 may say "hello" to the user, and in response to person 925's audible greeting, client system 150 may display an image of person 925. In particular embodiments, a sound corresponding to an event may include a sonic amplitude that is greater than a threshold sonic amplitude. In the example of FIG. 38, dog 920 may bark, and the sonic amplitude of dog 920's bark may exceed a threshold sonic amplitude. In response to detecting the bark from dog 920, client system 150 may display an image of the dog 920.

Figure 39:
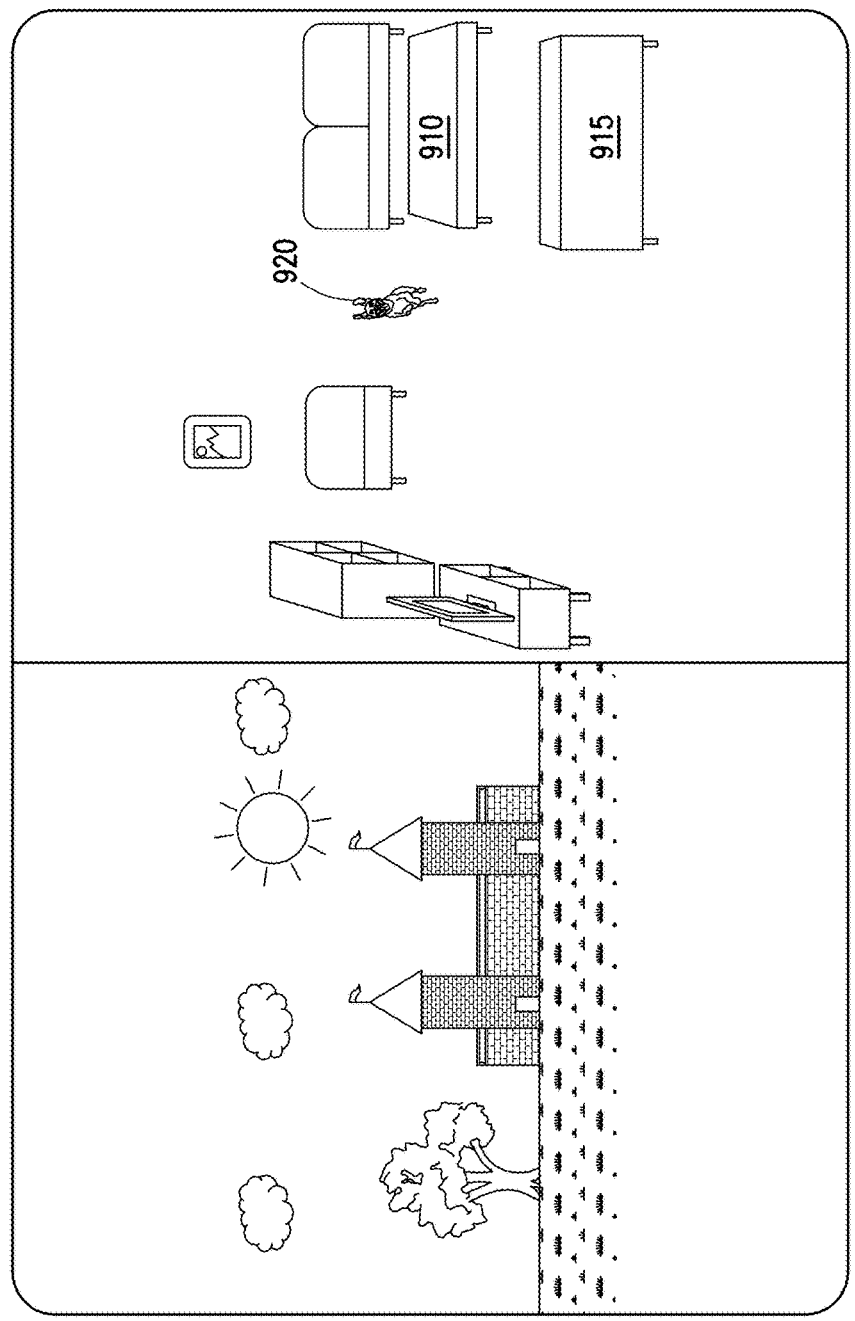
FIG. 39 illustrates an example display split into two example views.

FIG. 39 illustrates an example display split into two example views. In particular embodiments, a scene displayed to a user on client system 150 may be split into two or more views. In the example of FIG. 39, the castle scene is displayed on the left half of the user's view, and an image of the user's physical environment is displayed on the right half of the user's view. The image of the user's physical environment may be captured by one or more cameras of client system 150.

Figure 40:
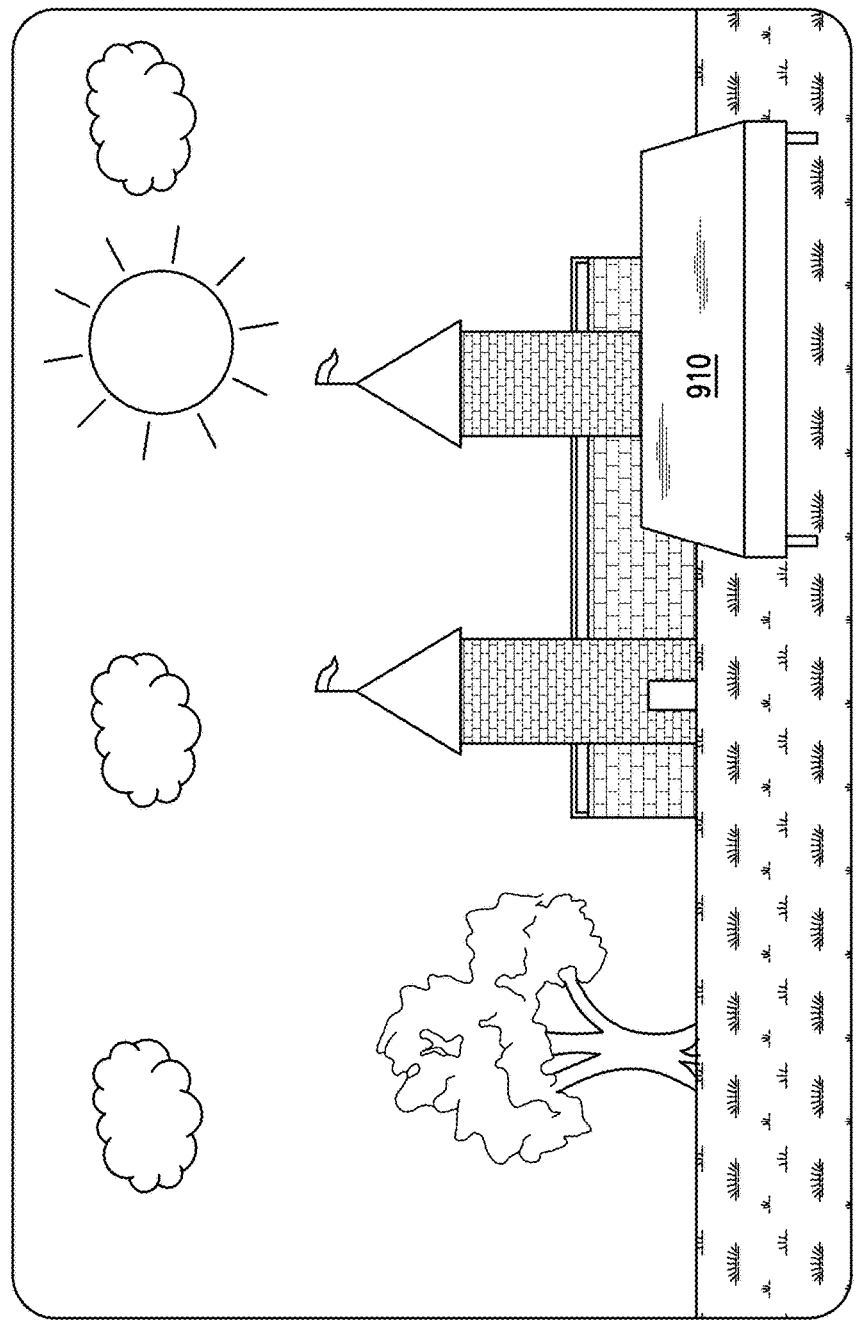
FIG. 40 illustrates the example scene of FIG. 35 with a table superimposed on the scene.

FIG. 40 illustrates the example scene of FIG. 35 with a table 910 superimposed on the scene. In particular embodiments, an object from a user's physical environment may be displayed to a user when the object is located within a particular distance of the person. As an example and not by way of limitation, a user wearing client system 150 may turn or move around within their physical environment as they view or interact with a scene displayed on client system 150. To prevent the user from running into or tripping over an object in their physical environment, client system 150 may alert the user when they are near an object. In the example of FIG. 40, the user may be within a threshold distance of table 910, and to make the user aware of this object, client system 150 may display an image of table 910 to the user.

Figure 41:
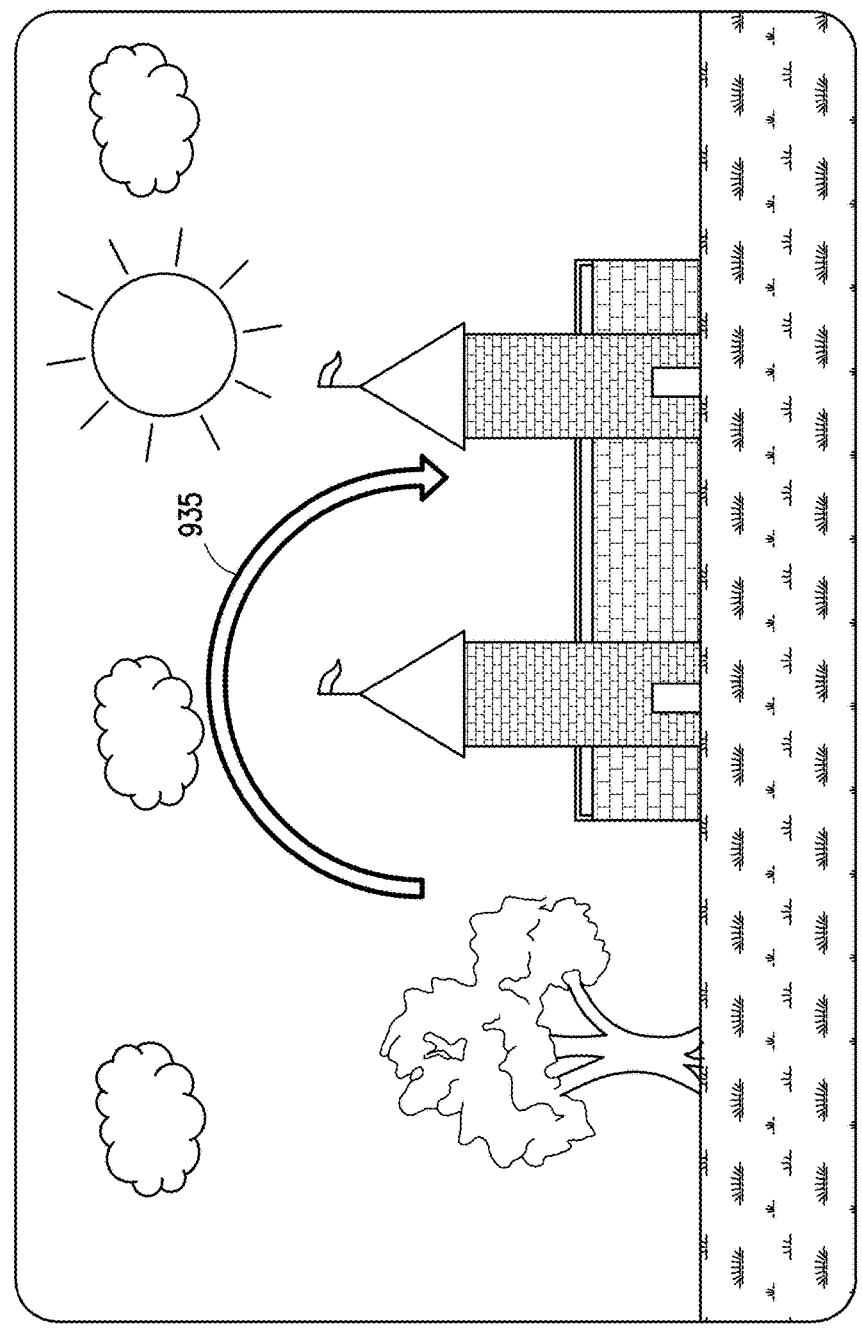
FIG. 41 illustrates the example scene of FIG. 35 with a curved arrow superimposed on the scene.

FIG. 41 illustrates the example scene of FIG. 35 with a curved arrow 935 superimposed on the scene. In particular embodiments, client system 150 may superimpose a graphic symbol (e.g., arrow 935) over a displayed scene to alert the user to an object or event located behind the user or off to the side of the user. In the example of FIG. 41, curved arrow 935 indicates that the user should be aware of shelf 915 located behind and to the right of the user so they do not bump into or trip over the shelf 915. While wearing client system 150, the user may be moving toward the shelf 915, and client system 150 may display the arrow 935 to indicate to the user that there is an object located behind or to the side of the user. In particular embodiments, after displaying arrow 935 to a user, if the user turns in the direction of the arrow 935, then client system 150 may display an image of the object (e.g., shelf 915) associated with the arrow 935.

Figure 42:
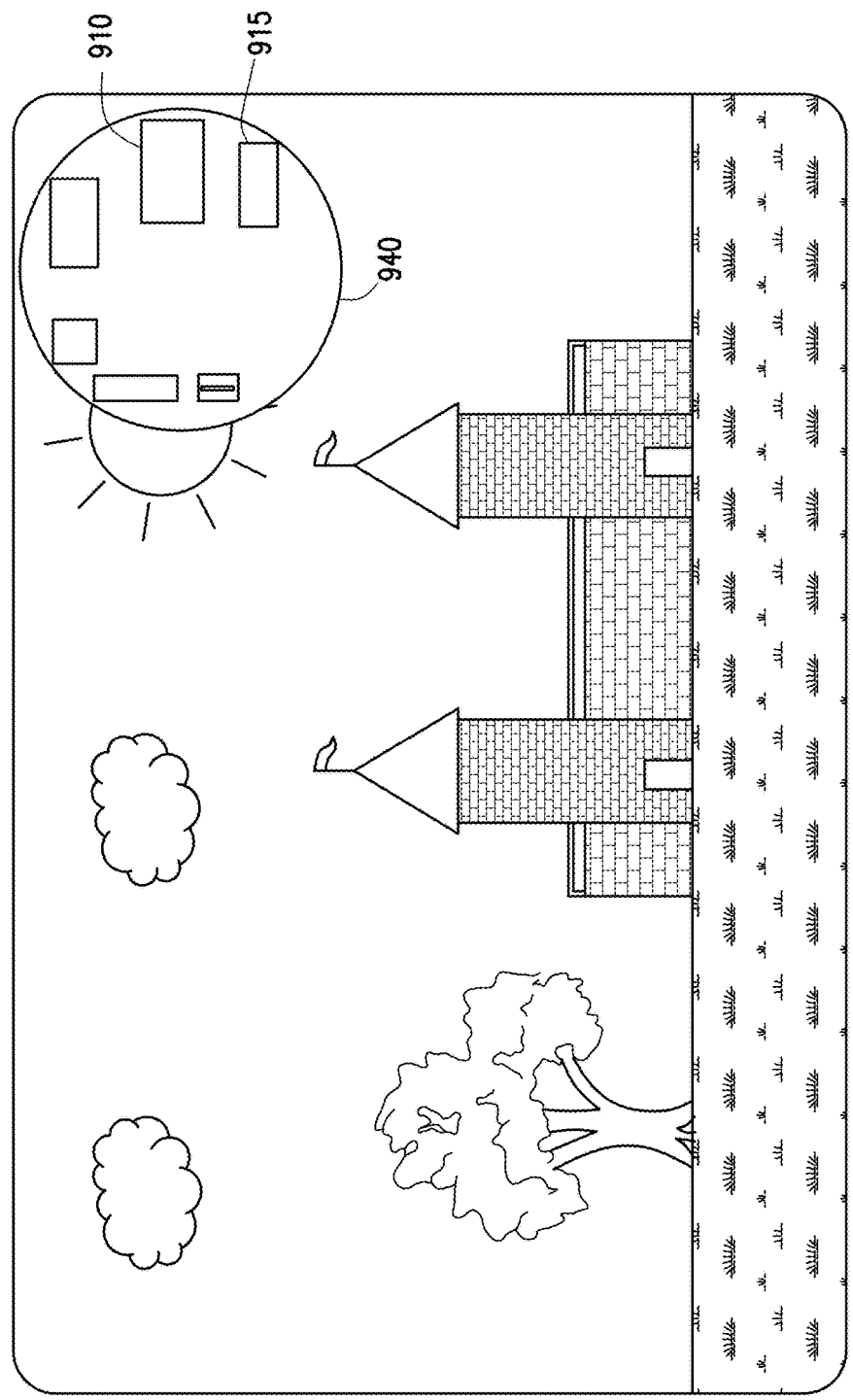
FIG. 42 illustrates the example scene of FIG. 35 with an example schematic map.

FIG. 42 illustrates the example scene of FIG. 35 with an example schematic map 940. In particular embodiments, in addition to displaying a 3-D image or video, client system 150 may display a schematic map 940 that shows objects in the user's physical environment. As an example and not by way of limitation, cameras of client system 150 may capture images of the user's physical environment, and from the camera images, a schematic map 940 of the user's physical environment may be generated. In particular embodiments, a schematic map 940 may display objects within a particular distance from the user (e.g., within 1 meter, 3 meters, or within any suitable distance). In the example of FIG. 42, the schematic map 940 is centered on the user's location and shows objects in the room where the user is located. In particular embodiments, a schematic map 940 may be used by the user to maintain awareness of the user's physical environment while the user is wearing client system 150. As an example and not by way of limitation, a user may be able to move around his physical environment based on a schematic map 940 displayed on client system 150. In particular embodiments, a user may be able to toggle on or off the display of a schematic map 940.

Figure 43:
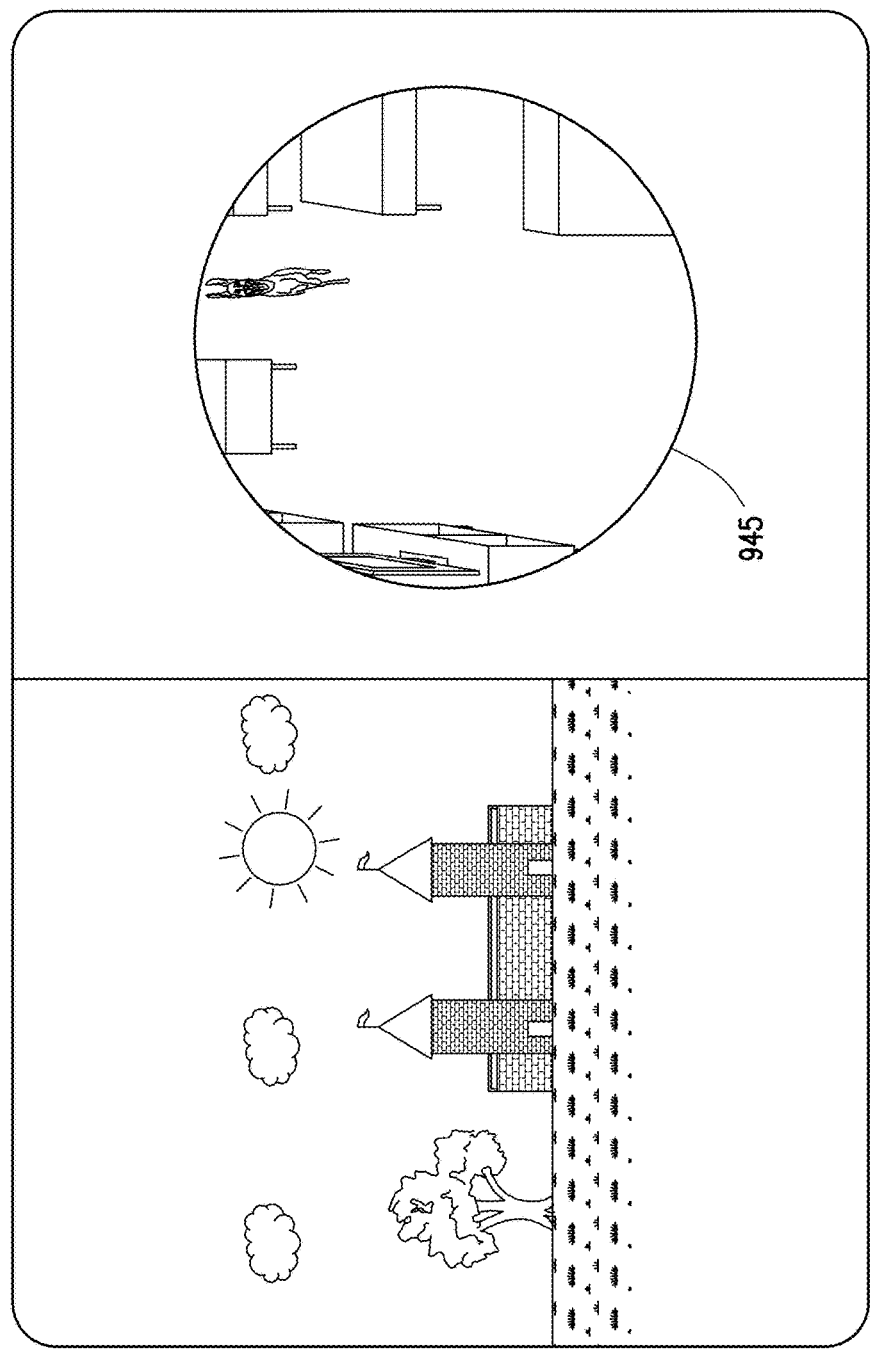
FIG. 43 illustrates the example scene of FIG. 35 with an example bird's-eye view.

FIG. 43 illustrates the example scene of FIG. 35 with an example bird's-eye view 945. In particular embodiments, in addition to displaying a 3-D image or video, client system 150 may display a bird's-eye view of the user's physical environment (e.g., a view showing the user's physical environment from above). As an example and not by way of limitation, cameras of client system 150 may capture images of the user's physical environment, and portions of the camera images may be combined together to form a bird's-eye view 945. In the example of FIG. 43, the bird's-eye view is circular and centered on the user's location. In particular embodiments, a bird's-eye view 945 may allow a user to maintain awareness of the user's physical environment while the user is wearing client system 150.

Figure 44:
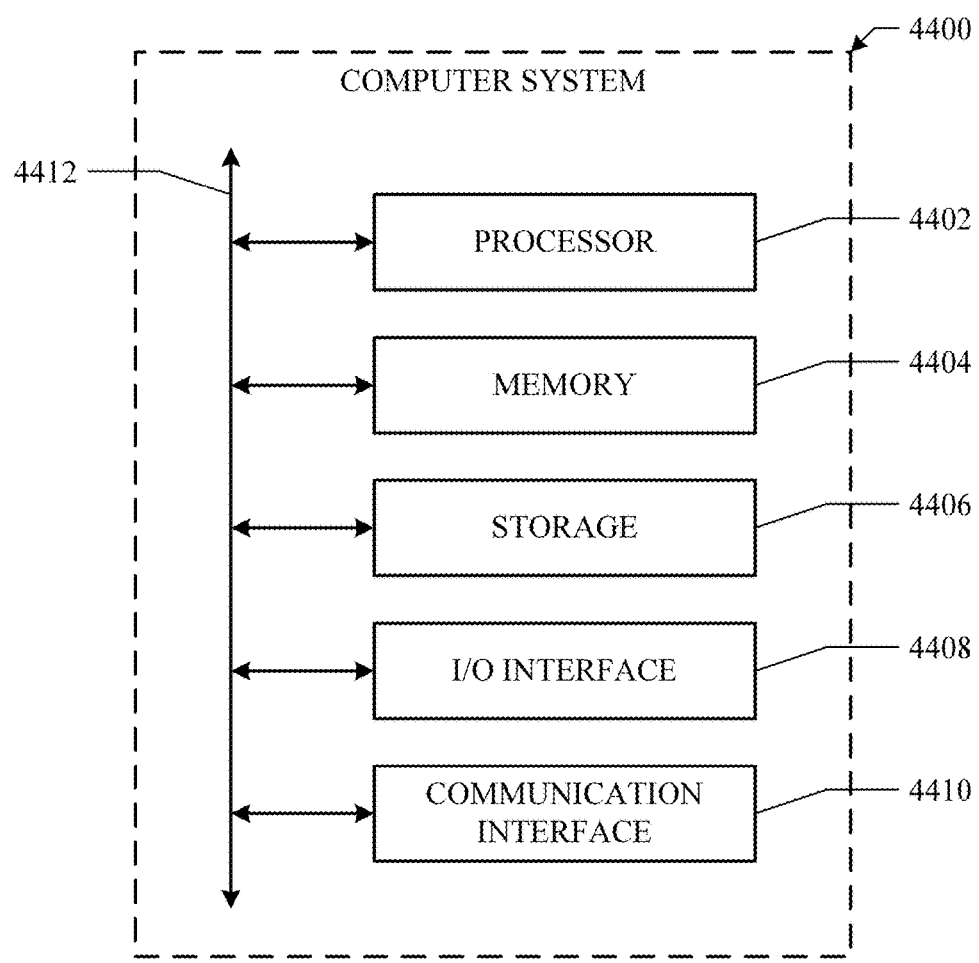
FIG. 44 illustrates an example computer system.

FIG. 44 illustrates an example computer system 4400. In particular embodiments, one or more computer systems 4400 perform one or more steps of one or more methods described or illustrated herein. In particular embodiments, one or more computer systems 4400 provide functionality described or illustrated herein. In particular embodiments, software running on one or more computer systems 4400 performs one or more steps of one or more methods described or illustrated herein or provides functionality described or illustrated herein. Particular embodiments include one or more portions of one or more computer systems 4400. Herein, reference to a computer system may encompass a computing device, and vice versa, where appropriate. Moreover, reference to a computer system may encompass one or more computer systems, where appropriate.

This disclosure contemplates any suitable number of computer systems 4400. This disclosure contemplates computer system 4400 taking any suitable physical form. As example and not by way of limitation, computer system 4400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 4400 may include one or more computer systems 4400; be unitary or distributed; span multiple locations; span multiple machines; span multiple data centers; or reside in a cloud, which may include one or more cloud components in one or more networks. Where appropriate, one or more computer systems 4400 may perform without substantial spatial or temporal limitation one or more steps of one or more methods described or illustrated herein. As an example and not by way of limitation, one or more computer systems 4400 may perform in real time or in batch mode one or more steps of one or more methods described or illustrated herein. One or more computer systems 4400 may perform at different times or at different locations one or more steps of one or more methods described or illustrated herein, where appropriate.

In particular embodiments, computer system 4400 includes a processor 4402, memory 4404, storage 4406, an input/output (I/O) interface 4408, a communication interface 4410, and a bus 4412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 4402 includes hardware for executing instructions, such as those making up a computer program. As an example and not by way of limitation, to execute instructions, processor 4402 may retrieve (or fetch) the instructions from an internal register, an internal cache, memory 4404, or storage 4406; decode and execute them; and then write one or more results to an internal register, an internal cache, memory 4404, or storage 4406. In particular embodiments, processor 4402 may include one or more internal caches for data, instructions, or addresses. This disclosure contemplates processor 4402 including any suitable number of any suitable internal caches, where appropriate. As an example and not by way of limitation, processor 4402 may include one or more instruction caches, one or more data caches, and one or more translation lookaside buffers (TLBs). Instructions in the instruction caches may be copies of instructions in memory 4404 or storage 4406, and the instruction caches may speed up retrieval of those instructions by processor 4402. Data in the data caches may be copies of data in memory 4404 or storage 4406 for instructions executing at processor 4402 to operate on; the results of previous instructions executed at processor 4402 for access by subsequent instructions executing at processor 4402 or for writing to memory 4404 or storage 4406; or other suitable data. The data caches may speed up read or write operations by processor 4402. The TLBs may speed up virtual-address translation for processor 4402. In particular embodiments, processor 4402 may include one or more internal registers for data, instructions, or addresses. This disclosure contemplates processor 4402 including any suitable number of any suitable internal registers, where appropriate. Where appropriate, processor 4402 may include one or more arithmetic logic units (ALUs); be a multi-core processor; or include one or more processors 4402. Although this disclosure describes and illustrates a particular processor, this disclosure contemplates any suitable processor.

In particular embodiments, memory 4404 includes main memory for storing instructions for processor 4402 to execute or data for processor 4402 to operate on. As an example and not by way of limitation, computer system 4400 may load instructions from storage 4406 or another source (such as, for example, another computer system 4400) to memory 4404. Processor 4402 may then load the instructions from memory 4404 to an internal register or internal cache. To execute the instructions, processor 4402 may retrieve the instructions from the internal register or internal cache and decode them. During or after execution of the instructions, processor 4402 may write one or more results (which may be intermediate or final results) to the internal register or internal cache. Processor 4402 may then write one or more of those results to memory 4404. In particular embodiments, processor 4402 executes only instructions in one or more internal registers or internal caches or in memory 4404 (as opposed to storage 4406 or elsewhere) and operates only on data in one or more internal registers or internal caches or in memory 4404 (as opposed to storage 4406 or elsewhere). One or more memory buses (which may each include an address bus and a data bus) may couple processor 4402 to memory 4404. Bus 4412 may include one or more memory buses, as described below. In particular embodiments, one or more memory management units (MMUs) reside between processor 4402 and memory 4404 and facilitate accesses to memory 4404 requested by processor 4402. In particular embodiments, memory 4404 includes random access memory (RAM). This RAM may be volatile memory, where appropriate, and this RAM may be dynamic RAM (DRAM) or static RAM (SRAM), where appropriate. Moreover, where appropriate, this RAM may be single-ported or multi-ported RAM. This disclosure contemplates any suitable RAM. Memory 4404 may include one or more memories 4404, where appropriate. Although this disclosure describes and illustrates particular memory, this disclosure contemplates any suitable memory.

In particular embodiments, storage 4406 includes mass storage for data or instructions. As an example and not by way of limitation, storage 4406 may include a hard disk drive (HDD), a floppy disk drive, flash memory, an optical disc, a magneto-optical disc, magnetic tape, or a Universal Serial Bus (USB) drive or a combination of two or more of these. Storage 4406 may include removable or non-removable (or fixed) media, where appropriate. Storage 4406 may be internal or external to computer system 4400, where appropriate. In particular embodiments, storage 4406 is non-volatile, solid-state memory. In particular embodiments, storage 4406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 4406 taking any suitable physical form. Storage 4406 may include one or more storage control units facilitating communication between processor 4402 and storage 4406, where appropriate. Where appropriate, storage 4406 may include one or more storages 4406. Although this disclosure describes and illustrates particular storage, this disclosure contemplates any suitable storage.

In particular embodiments, I/O interface 4408 includes hardware, software, or both, providing one or more interfaces for communication between computer system 4400 and one or more I/O devices. Computer system 4400 may include one or more of these I/O devices, where appropriate. One or more of these I/O devices may enable communication between a person and computer system 4400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 4408 for them. Where appropriate, I/O interface 4408 may include one or more device or software drivers enabling processor 4402 to drive one or more of these I/O devices. I/O interface 4408 may include one or more I/O interfaces 4408, where appropriate. Although this disclosure describes and illustrates a particular I/O interface, this disclosure contemplates any suitable I/O interface.

In particular embodiments, communication interface 4410 includes hardware, software, or both providing one or more interfaces for communication (such as, for example, packet-based communication) between computer system 4400 and one or more other computer systems 4400 or one or more networks. As an example and not by way of limitation, communication interface 4410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 4410 for it. As an example and not by way of limitation, computer system 4400 may communicate with an ad hoc network, a personal area network (PAN), a local area network (LAN), a wide area network (WAN), a metropolitan area network (MAN), body area network (BAN), or one or more portions of the Internet or a combination of two or more of these. One or more portions of one or more of these networks may be wired or wireless. As an example, computer system 4400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 4400 may include any suitable communication interface 4410 for any of these networks, where appropriate. Communication interface 4410 may include one or more communication interfaces 4410, where appropriate. Although this disclosure describes and illustrates a particular communication interface, this disclosure contemplates any suitable communication interface.

In particular embodiments, bus 4412 includes hardware, software, or both coupling components of computer system 4400 to each other. As an example and not by way of limitation, bus 4412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 4412 may include one or more buses 4412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This scope of this disclosure encompasses all changes, substitutions, variations, alterations, and modifications to the example embodiments herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving a plurality of images from a plurality of cameras, wherein the plurality of cameras comprises a first camera having a first orientation and a second camera having a second orientation, wherein the plurality of images comprises a first image from the first camera and a second image from the second camera;
detecting a plurality of feature points within the first and second images;
determining one or more pairs of corresponding feature points located within a region of overlap between the first and second images, wherein the pairs of corresponding feature points comprise a respective one of the feature points from each of the first and second images;
spatially adjusting one or more pixels of the first or second image based on a calculated offset between each pair of the corresponding feature points, wherein at least some of the one or more pixels are in the region of overlap;
comparing, prior to combining the first and second images, a portion of the first or second image containing the spatially adjusted one or more pixels with a third image containing the region of overlap, wherein the third image is taken by a third camera having the same orientation as either the first or the second camera;
either:
spatially adjusting, based on the comparison of the portion of the first or second image containing the spatially adjusted one or more pixels with the third image, at least one pixel within the portion; or confirming, based on the comparison of the portion of the first or second image containing the spatially adjusted one or more pixels with the third image, the accuracy of the spatial adjustment made to the one or more pixels of the first or second image; and combining the first and second images as spatially adjusted into a merged image.

2. The method of claim 1, wherein the region of overlap between the first and second images is proportional to an overlap in a respective field of view of the first and second cameras.

3. The method of claim 1, wherein the detection comprises:

detecting one or more features of the first and second images based on a local contrast gradient; and extracting one or more feature points of the detected features.

4. The method of claim 3, wherein the extraction comprises using a scale-invariant feature transform (SIFT), speeded up robust features (SURF), or oriented FAST and Rotated BRIEF (ORB) feature detection algorithm.

5. The method of claim 1, wherein the determination comprises:

partitioning the first and second images into a pre-determined number of regions in a pre-determined grid;

comparing feature points located within each region along an edge of the first image with a corresponding region along an opposite edge of the second image; and identifying the corresponding pairs of feature points based on a pattern of feature points within each region of the edges.

6. The method of claim 5, wherein the comparison within each region along the edge is performed on a pre-determined area around each feature point, wherein the pre-determined area is based on the number of pixels of the region of overlap.

7. The method of claim 6, further comprising determining whether a sum of square of differences in the pre-determined area is less than a pre-determined threshold value.

8. The method of claim 1, wherein:

the third image is captured during a same time period as the first and second images;

the third camera has the first orientation; and the second camera is located between the first and third cameras.

9. The method of claim 8, further comprising:

detecting a plurality of feature points within the third image;

determining one or more pairs of corresponding feature points located within the third image and the region of overlap between the first and third images, wherein the pairs of corresponding feature points of the first and third images comprise a respective one of the feature points from each of the first and third images; and determining one or more pairs of corresponding feature points located within a region of overlap between the second and third images, wherein the pairs of corresponding feature points of the second and third images comprise a respective one of the feature points from each of the second and third images.

10. The method of claim 8, wherein the first and third camera comprise a stereoscopic pair of cameras.

11. The method of claim 1, further comprising receiving a fourth image from a fourth camera, wherein the fourth camera has an orientation that is approximately orthogonal to a plane defined by the first and second cameras.

12. The method of claim 11, further comprising:

determining one or more pairs of corresponding feature points located within a region of overlap between the merged image and the fourth image, wherein the pairs of corresponding feature points comprise a respective one of the feature points from each of the merged image and the fourth image; and applying a radial warp around a center of the fourth image, such the center of the fourth image is fixed.

13. The method of claim 1, wherein the calculation comprises calculating a cost function that is proportional to an absolute value of a spatial offset between each pair of corresponding feature points.

14. The method of claim 1, wherein the calculation comprises calculating a cost function that is proportional to a rotational offset between each pair of corresponding feature points along one or more axes of rotation.

15. The method of claim 1, wherein the second orientation is different from the first orientation, and wherein each image is captured during a same period of time.

16. The method of claim 1, wherein combining the first and second images comprises:

detecting an edge in the region of overlap; and applying a gradient on the edge.

17. The method of claim 1, wherein the adjustment comprises a rotation or translation of the first or second image.

18. The method of claim 1, wherein the first image, the second image, and the third image have not been combined with any other image prior to combining the first and second images into a merged image.

19. The method of claim 1, further comprising:

accessing a fourth image from a fourth camera, wherein the fourth image is taken by a fourth camera having a different orientation than the third camera and the same orientation as either the first or the second camera;

detecting a second plurality of feature points within the third and fourth images;

determining one or more second pairs of corresponding feature points located within a region of overlap between the third and fourth images, wherein the second pairs of corresponding feature points comprise a respective one of the second feature points from each of the third and fourth images;

spatially adjusting the third or fourth image based on a calculated offset between each pair of the corresponding second feature points;

comparing the third and fourth images with either the first image or the second image containing the region of overlap between the third and fourth images; and combining the third and fourth images into a merged image based on the spatial adjustment and on the comparison with the first or second image.

20. One or more non-transitory computer-readable storage media embodying instructions that are operable when executed to:

receive a plurality of images from a plurality of cameras, wherein the plurality of cameras comprise a first camera having a first orientation and a second camera having a second orientation, wherein the plurality of images comprises a first image from the first camera and a second image from the second camera;

detect a plurality of feature points within the first and second images;

determine one or more pairs of corresponding feature points located within a region of overlap between the first and second images, wherein the pairs of corresponding feature points comprise a respective one of the feature points from each of the first and second images;

spatially adjust one or more pixels of the first or second image based on a calculated offset between each pair of the corresponding feature points;

compare, prior to combining the first and second images, a portion of the first or second image containing the spatially adjusted one or more pixels with a third image containing the region of overlap, wherein the third image is taken by a third camera having the same orientation as either the first or the second camera;

either:
spatially adjust, based on the comparison of the portion of the first or second image containing the spatially adjusted one or more pixels with the third image, at least one pixel within the portion; or
confirm, based on the comparison of the portion of the first or second image containing the spatially adjusted one or more pixels with the third image, the accuracy of the spatial adjustment made to the one or more pixels of the first or second image; and
combine the first and second images as spatially adjusted into a merged image.

21. The media of claim 20, wherein the region of overlap between the first and second images is proportional to an overlap in a respective field of view of the first and second cameras.

22. The media of claim 20, wherein the detect the plurality of feature points within the first and second images comprises:
detect one or more features of the first and second images based on a local contrast gradient; and
extract one or more feature points of the detected features.

23. The media of claim 20, wherein the determine the one or more pairs of corresponding feature points located within the region of overlap between the first and second images comprises:
partition the first and second images into a pre-determined number of regions in a pre-determined grid;
compare feature points located within each region along an edge of the first image with a corresponding region along an opposite edge of the second image; and
identify the corresponding pairs of feature points based on a pattern of feature points within each region of the edges.

24. The media of claim 20, wherein:
the third image is captured during a same time period as the first and second images;
the third camera has the first orientation; and
the second camera is located between the first and third cameras.

25. The media of claim 24, wherein the instructions are further operable when executed to:
detect a plurality of feature points within the third image;
determine one or more pairs of corresponding feature points located within the third image and the region of overlap between the first and third images, wherein the pairs of corresponding feature points of the first and third images comprise a respective one of the feature points from each of the first and third images; and
determine one or more pairs of corresponding feature points located within a region of overlap between the second and third images, wherein the pairs of corresponding feature points of the second and third images comprise a respective one of the feature points from each of the second and third images.

26. The media of claim 20, wherein the calculated offset between each pair of corresponding feature points comprises a cost function that is proportional to an absolute value of a spatial offset between each pair of corresponding feature points.

27. An apparatus comprising:
one or more non-transitory computer-readable storage media embodying instructions; and
one or more processors coupled to the storage media and configured to execute the instructions to:
receive a plurality of images from a plurality of cameras, wherein the plurality of cameras comprise a first camera having a first orientation and a second camera having a second orientation, wherein the plurality of images comprises a first image from the first camera and a second image from the second camera;
detect a plurality of feature points within the first and second images;
determine one or more pairs of corresponding feature points located within a region of overlap between the first and second images, wherein the pairs of corresponding feature points comprise a respective one of the feature points from each of the first and second images;
spatially adjust one or more pixels of the first or second image based on a calculated offset between each pair of the corresponding feature points;
compare, prior to combining the first and second images, a portion of the first or second image containing the spatially adjusted one or more pixels with a third image containing the region of overlap, wherein the third image is taken by a third camera having the same orientation as either the first or the second camera;
either:
spatially adjust, based on the comparison of the portion of the first or second image containing the spatially adjusted one or more pixels with the third image, at least one pixel within the portion; or
confirm, based on the comparison of the portion of the first or second image containing the spatially adjusted one or more pixels with the third image, the accuracy of the spatial adjustment made to the one or more pixels of the first or second image; and
combine the first and second images as spatially adjusted into a merged image.

28. The apparatus of claim 27, wherein the region of overlap between the first and second images is proportional to an overlap in a respective field of view of the first and second cameras.

29. The apparatus of claim 27, wherein the detect the plurality of feature points within the first and second images comprises:
detect one or more features of the first and second images based on a local contrast gradient; and
extract one or more feature points of the detected features.

30. The apparatus of claim 27, wherein the determine the one or more pairs of corresponding feature points located within the region of overlap between the first and second images comprises:
partition the first and second images into a pre-determined number of regions in a pre-determined grid;
compare feature points located within each region along an edge of the first image with a corresponding region along an opposite edge of the second image; and identify the corresponding pairs of feature points based on a pattern of feature points within each region of the edges.

31. The apparatus of claim 27, wherein the processors are further configured to execute the instructions to:
detect a plurality of feature points within the third image;
determine one or more pairs of corresponding feature points located within the third image and the region of overlap between the first and third images, wherein the pairs of corresponding feature points of the first and third images comprise a respective one of the feature points from each of the first and third images; and
determine one or more pairs of corresponding feature points located within a region of overlap between the second and third images, wherein the pairs of corresponding feature points of the second and third images comprise a respective one of the feature points from each of the second and third images.

* * * * *